United States Patent [19]

Murray et al.

[11] Patent Number: 5,167,026
[45] Date of Patent: Nov. 24, 1992

[54] SIMULTANEOUSLY OR SEQUENTIALLY DECODING MULTIPLE SPECIFIERS OF A VARIABLE LENGTH PIPELINE INSTRUCTION BASED ON DETECTION OF MODIFIED VALUE OF SPECIFIER REGISTERS

[75] Inventors: John E. Murray, Acton; David B. Fite, Northboro; Mark A. Firstenberg, Maynard; Lawrence O. Herman, Hudson; Ronald M. Salett, Framingham, all of Mass.

[73] Assignee: Digital Equipment Corporation, Maynard, Mass.

[21] Appl. No.: 306,833

[22] Filed: Feb. 3, 1989

[51] Int. Cl.$^5$ .................. G06F 9/30; G06F 9/38
[52] U.S. Cl. ........................ 395/375; 364/DIG. 1; 364/231.8; 364/262.4; 364/247.6; 364/933.5; 364/942.8; 364/948.34
[58] Field of Search ....................... 395/375; 364/200 MS File, 900 MS File

[56] References Cited

U.S. PATENT DOCUMENTS

| Re. 32,493 | 9/1987 | Matsumoto et al. | 364/200 |
|---|---|---|---|
| 4,241,397 | 12/1980 | Strecker | 395/375 |
| 4,305,124 | 12/1981 | Marro et al. | 364/200 |
| 4,454,578 | 6/1984 | Matsumoto et al. | 395/375 |
| 4,476,525 | 10/1984 | Ishii | 364/200 |
| 4,521,851 | 6/1985 | Trubisky et al. | 364/200 |
| 4,530,050 | 7/1985 | Fukunaga et al. | 364/200 |
| 4,789,925 | 12/1988 | Lahti | 395/800 |
| 4,890,218 | 12/1989 | Bram | 364/200 |
| 4,891,753 | 1/1990 | Budde et al. | 395/375 |
| 4,945,511 | 6/1990 | Itomitus et al. | 395/375 |
| 4,991,078 | 2/1991 | Wilhelm et al. | 364/200 |

FOREIGN PATENT DOCUMENTS

| 0193654 | 9/1986 | European Pat. Off. . |
| 0243892 | 4/1987 | European Pat. Off. . |
| 0269980 | 6/1988 | European Pat. Off. . |
| 2016753 | 9/1979 | United Kingdom . |

OTHER PUBLICATIONS

Fossum et al., "An Overview of the VAX 8600 System," Digital Equipment Technical Journal, No. 1, Aut. 1985, pp. 8-23.

Troiani et al., "The VAX 8600 I Box, A Pipelined Implementation of the VAX Architecture," Digital Technical Journal, No. 1, Aug. 1985, pp. 24-42.

VAX Architecture Handbook, Digital Equipment Corporation, 1981, pp. 51-90.

(List continued on next page.)

Primary Examiner—Lawrence E. Anderson
Assistant Examiner—Krisna Lim
Attorney, Agent, or Firm—Arnold, White & Durkee

[57] ABSTRACT

In a pipeline processor, simultaneous decoding of multiple specifiers in a variable-length instruction causes a peculiar problem of an intra-instruction read conflict that occurs whenever an instruction includes an autoincrement or an autodecrement specifier which references either directly or indirectly a register specified by a previously occurring specifier for the current instruction. To avoid stalls during the preprocessing of instructions by the instruction unit, register pointers rather than register data are usually passed to the excellent unit because register data is not always available at the time of instruction decoding. If an intra-instruction read conflict exists, however, the operand value specified by the conflicting register specifier is the initial value of the register being incremented or decremented, and this initial value will have been changed by the time that the execution unit executes the instruction. Preferably, the proper initial value is obtained prior to the incrementing or decrementing of the conflicting register by putting the instruction decoder into a special IRC mode in which only one specifier is decoded per cycle, and if a specifier being decoded is a register specifier, the content of the specified register is transmitted to the execution unit. Circuitry for detecting an intra-instruction read conflict is disclosed as well as an efficient method for handling interrupts, exceptions and flushes that may occur during the processing of an instruction having an intra-instruction read conflict.

8 Claims, 45 Drawing Sheets

OTHER PUBLICATIONS

Acosta et al., "An Instruction Issuing Approach to Enhancing Performance in Multiple Functional Unit Processors," IEEE Trans. on Computers, vol. C-35, No. 9 (Sep. 1986), pp. 815-828.

Fossum et al., "New VAX Squeezes Mainframe Power Into Mini Package", Computer Design, vol. 24, No. 3 (Mar. 1985), Littleton, Mass., pp. 173-181.

Matsumoto et al., "A High-Performance Architecture for Variable Length Instructions", Systems & Computers in Japan, No. 3 (May 1985), Washington D.C., pp. 19-28.

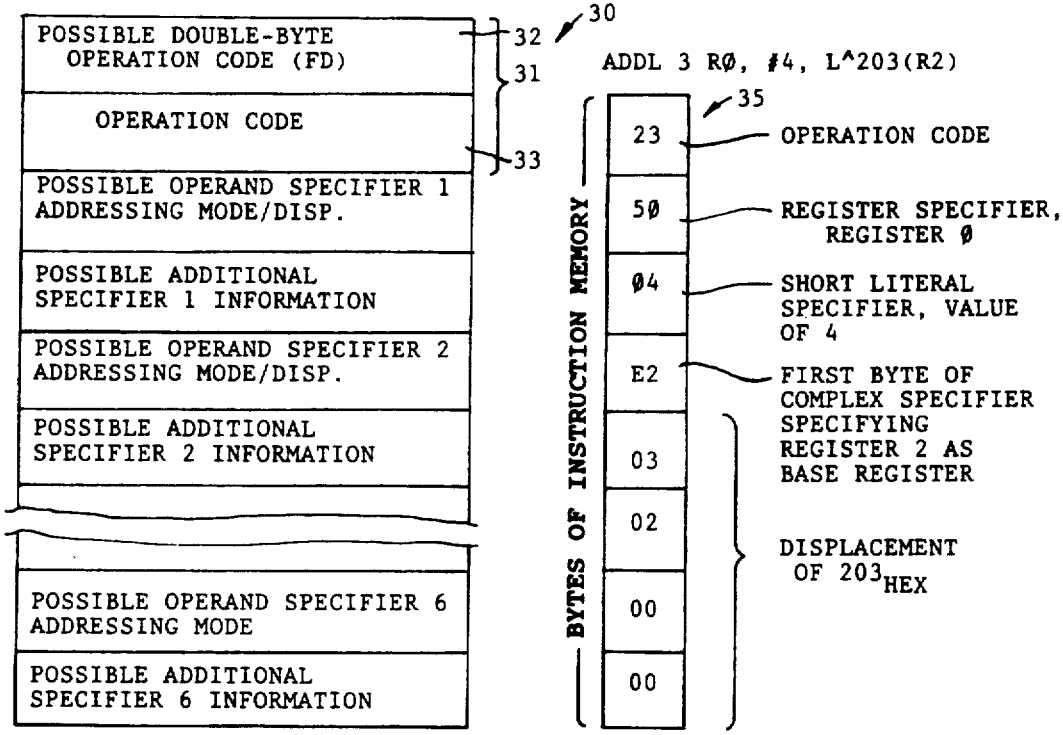

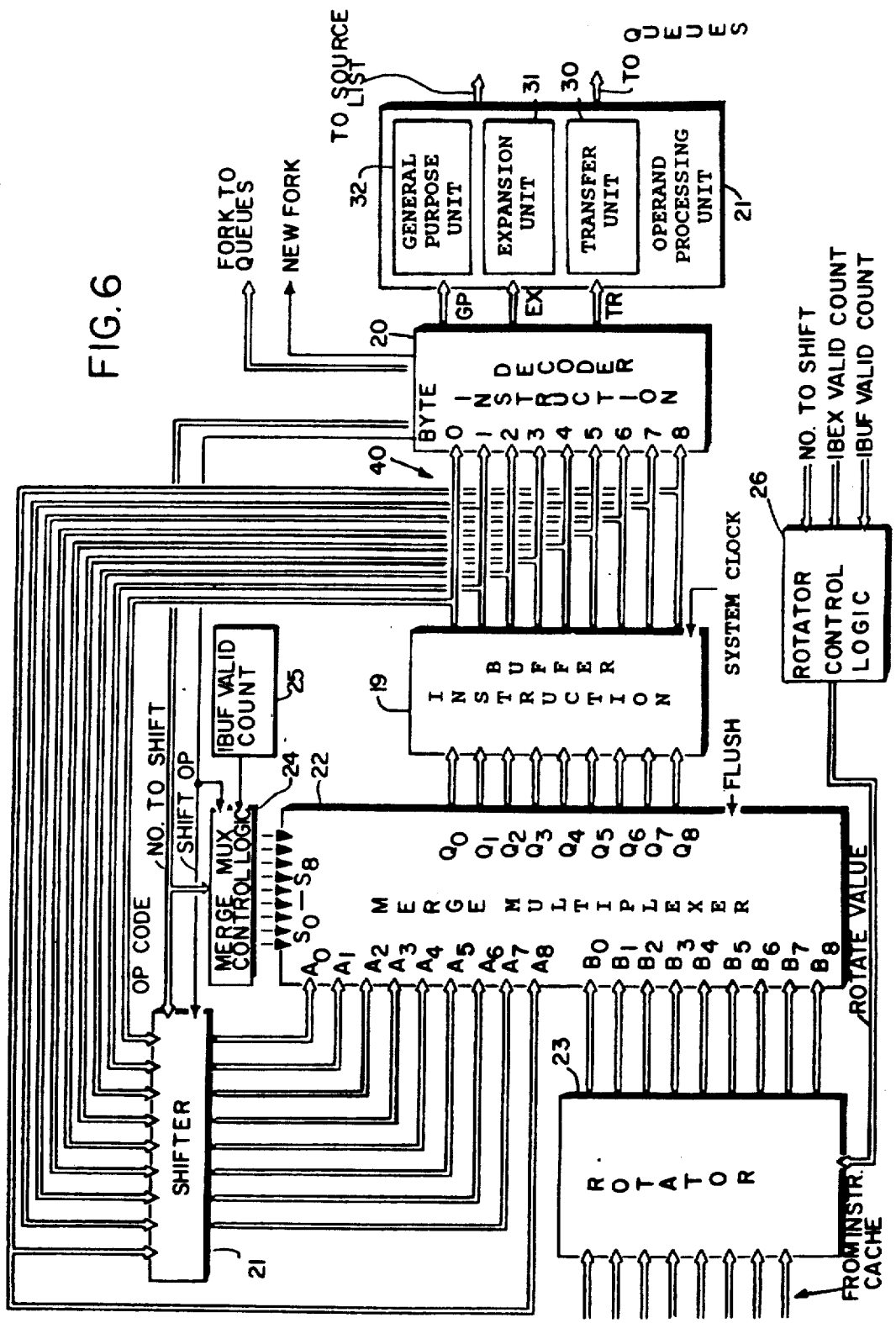

| BYTE 1 | BYTE 2 | BYTE 3 | CASE | BASE POSITION |
|---|---|---|---|---|
| SL REG | SL REG INDEX | NOT INDEX | 0 0 | BYTE 3 |
| SL REG INDEX | NOT(SL REG INDEX) | DON'T CARE | 0 1 | BYTE 2 |
| SL REG | SL REG | INDEX | 1 0 | BYTE 4 |
| NOT(SL REG INDEX) | DON'T CARE | DON'T CARE | 1 1 | BYTE 1 |

CASE DECODING LOGIC

| NO. OF SPECIFIERS INITIALLY BEING DECODED (N') | | | | | |
|---|---|---|---|---|---|
| CASE \ LEVEL | CASE 00 INDEX(2) =0 | =1 | CASE 01 INDEX(1) =0 | =1 | CASE 10 | CASE 11 |
| 1 | 01 | 01 | 01 | | 01 | 01 |
| 1A | | | | | | 10 |
| 1B | | | | | | 11 |
| 2 | 10 | | 10 | 01 | 10 | |
| 2A | | | 11 | 10 | | |
| 2B | | | | 11 | | |
| 3 | 11 | 10 | | | | |
| 3IA | | 11 | | | | |
| 4I | | | | | 11 | |

FIG. 24

GPS TREE
3 SPECIFIERS GENERAL CASE

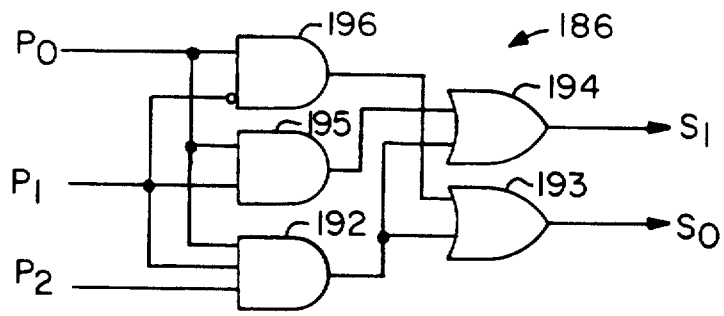
FIG. 26
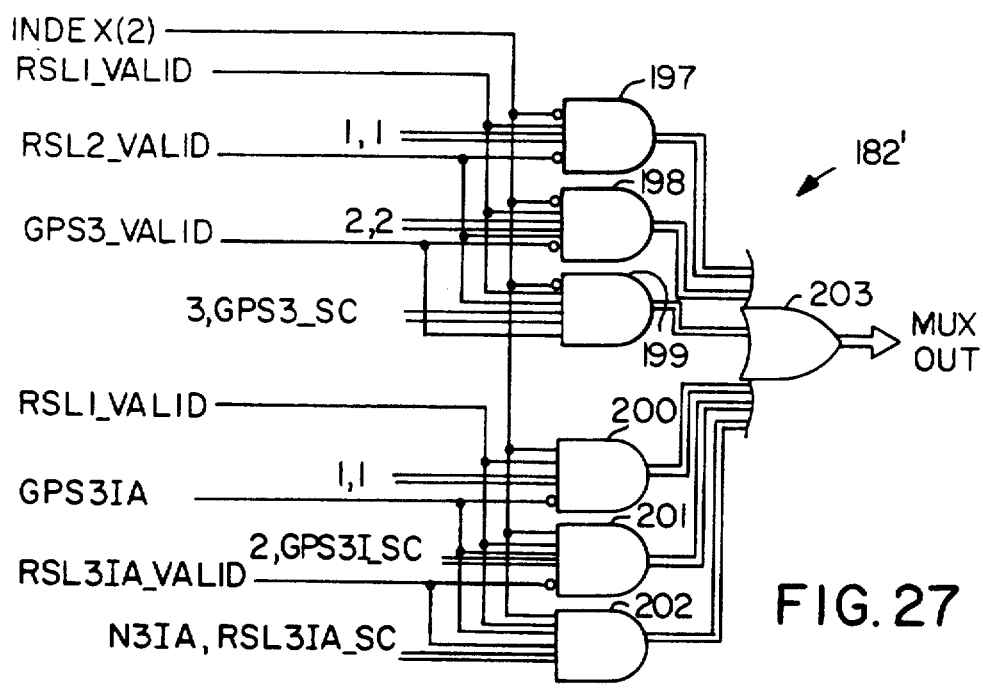
FIG. 27
| SPECIFIER NOs - NOT IMM. OR ABS. | | | | | |
|---|---|---|---|---|---|
| N1A (I) (O) | N1B (I) (O) | N2A (I) (O) | N2IA (I) (O) | N2IB (I) (O) | N3IA (I) (O) |
| 1 0 | 1 1 | 1 1 | 1 0 | 1 1 | 1 1 |
FIG. 28

FIG. 29

| GPS MODE (NOT INDEX, IMM. OR ABS.) | MODE (1) D7 D6 D5 | GPS1_SC (3)(2)(1)(0) | RSL1A_SC (3)(2)(1)(0) | RSL1B_SC (3)(2)(1)(0) |
|---|---|---|---|---|
| REG., DEFERRED/AUTO DEC. | 0 X X | 0 0 0 1 | 0 0 1 0 | 0 0 1 1 |
| AUTO INC./DEFERRED | 1 0 0 | 0 0 0 1 | 0 0 1 0 | 0 0 1 1 |
| BYTE DISP./DEFERRED | 1 0 1 | 0 0 1 0 | 0 0 1 1 | 0 1 0 0 |
| WORD DISP./DEFERRED | 1 1 0 | 0 0 1 1 | 0 1 0 0 | 0 1 0 1 |
| LONGWORD DISP./DEF. | 1 1 1 | 0 1 0 1 | 0 1 1 0 | 0 1 1 1 |

*SAME AS GPS2I_SC

FIG. 30

| GPS MODE (NOT INDEX, IMM. OR ABS.) | MODE (2) D7 D6 D5 | GPS2_SC* (3)(2)(1)(0) | RSL2A_SC≠ (3)(2)(1)(0) | RSL2BI_SC (3)(2)(1)(0) |
|---|---|---|---|---|
| REG., DEFERRED/AUTO DEC. | 0 X X | 0 0 1 0 | 0 0 1 1 | 0 1 0 0 |
| AUTO INC./DEFERRED | 1 0 0 | 0 0 1 0 | 0 0 1 1 | 0 1 0 0 |
| BYTE DISP./DEFERRED | 1 0 1 | 0 0 1 1 | 0 1 0 0 | 0 1 0 1 |
| WORD DISP./DEFERRED | 1 1 0 | 0 1 0 0 | 0 1 0 1 | 0 1 1 0 |
| LONGWORD DISP./DEF. | 1 1 1 | 0 1 1 0 | 0 1 1 1 | 1 0 0 0 |

≠SAME AS RSL2AI_SC

FIG. 31

| GPS MODE (NOT INDEX, IMM. OR ABS.) | MODE (3) $D_7$ $D_6$ $D_5$ | GPS3_SC* (3)(2)(1)(0) | RLS3IA_SC (3)(2)(1)(0) |
|---|---|---|---|
| REG., DEFERRED/AUTO DEC. | 0 X X | 0 0 1 1 | 0 1 0 0 |
| AUTO INC./DEFERRED | 1 0 0 | 0 0 1 1 | 0 1 0 0 |
| BYTE DISP./DEFERRED | 1 0 1 | 0 1 0 0 | 0 1 0 1 |
| WORD DISP./DEFERRED | 1 1 0 | 0 1 0 1 | 0 1 1 0 |
| LONGWORD DISP./DEF. | 1 1 1 | 0 1 1 1 | 1 0 0 0 |

*SAME AS GPS3I_SC

FIG. 32

| GPS MODE (NOT INDEX, IMM. OR ABS.) | MODE (4) $D_7$ $D_6$ $D_5$ | GPS4I_SC (3)(2)(1)(0) |
|---|---|---|
| REG., DEFERRED/AUTO DEC. | 0 X X | 0 1 0 0 |
| AUTO INC./DEFERRED | 1 0 0 | 0 1 0 0 |
| BYTE DISP./DEFERRED | 1 0 1 | 0 1 0 1 |
| WORD DISP./DEFERRED | 1 1 0 | 0 1 1 0 |
| LONGWORD DISP./DEF. | 1 1 1 | 1 0 0 0 |

| GPS' MODE (IMM. OR ABS.) | MODE (1) $D_4$(1) | DATA TYPE 1 (2)(1)(0) | GPS1' SC (3)(2)(1)(0) | RSL1A' SC (3)(2)(1)(0) | RSL1B' SC (3)(2)(1)(0) | NIA' (1)(0) | NIB' (1)(0) |
|---|---|---|---|---|---|---|---|
| IMMEDIATE-BYTE | 0 | 1 0 0 | 0 0 1 0 | 0 0 1 1 | 0 1 0 0 | 1 0 | 1 1 |
| IMMEIDATE-WORD | 0 | 0 0 1 | 0 0 1 1 | 0 1 0 0 | 0 1 0 1 | 1 0 | 1 1 |
| IMMEDIATE-LONG | 0 | 0 0 0 | 0 1 0 1 | 0 1 1 0 | 0 1 1 1 | 1 0 | 1 1 |
| IMMEDIATE-QUAD | 0 | 0 1 0 | 0 1 0 1 | 0 1 0 1 | 0 1 0 1 | 0 1 | 0 1 |
| IMMEDIATE-OCTA | 0 | 1 1 0 | 0 1 0 1 | 0 1 0 1 | 0 1 0 1 | 0 1 | 0 1 |
| ABSOLUTE | 1 | X X X | 0 1 0 1 | 0 1 1 0 | 0 1 1 1 | 1 0 | 1 1 |

FIG. 33

| GPS' MODE (IMM. OR ABS.) | MODE (2) $D_4$(2) | DATA TYPE 2 (2)(1)(0) | GPS2' SC (3)(2)(1)(0) | RSL2A' SC (3)(2)(1)(0) | N2A' (1)(0) |
|---|---|---|---|---|---|
| IMMEDIATE-BYTE | 0 | 1 0 0 | 0 0 1 1 | 0 1 0 0 | 1 1 |
| IMMEIDATE-WORD | 0 | 0 0 1 | 0 1 0 0 | 0 1 0 1 | 1 1 |
| IMMEDIATE-LONG | 0 | 0 0 0 | 0 1 1 0 | 0 1 1 1 | 1 1 |
| IMMEDIATE-QUAD | 0 | 0 1 0 | 0 1 1 0 | 0 1 1 0 | 1 0 |
| IMMEDIATE-OCTA | 0 | 1 1 0 | 0 1 1 0 | 0 1 1 0 | 1 0 |
| ABSOLUTE | 1 | X X X | 0 1 1 0 | 0 1 1 1 | 1 1 |

FIG. 34

| GPS' MODE (IMM. OR ABS.) | MODE (2) $D_4$ (2) | DATA TYPE 1 (2)(1)(0) | GPS2I' SC (3)(2)(1)(0) | RSL2IA' SC (3)(2)(1)(0) | RSL2IB' SC (3)(2)(1)(0) | N2IA' (1)(0) | N2IB' (1)(0) |
|---|---|---|---|---|---|---|---|
| IMMEDIATE-BYTE | 0 | 1 0 0 | 0 0 1 1 | 0 1 0 0 | 0 1 0 1 | 1 0 | 1 1 |
| IMMEDIATE-WORD | 0 | 0 0 1 | 0 1 0 0 | 0 1 0 1 | 0 1 1 0 | 1 0 | 1 1 |
| IMMEDIATE-LONG | 0 | 0 0 0 | 0 1 1 0 | 0 1 1 1 | 1 0 0 0 | 1 0 | 1 1 |
| IMMEDIATE-QUAD | 0 | 0 1 0 | 0 1 1 0 | 0 1 1 0 | 0 1 1 0 | 0 1 | 0 1 |
| IMMEDIATE-OCTA | 0 | 1 1 0 | 0 1 1 0 | 0 1 1 0 | 0 1 1 0 | 0 1 | 0 1 |
| ABSOLUTE | 1 | X X X | 0 1 1 0 | 0 1 1 1 | 1 0 0 0 | 1 0 | 1 1 |

FIG. 35

| GPS' MODE (IMM. OR ABS.) | MODE (3) $D_4$ (3) | DATA TYPE 2 (2)(1)(0) | GPS3I' SC (3)(2)(1)(0) | RSL3IA' SC (3)(2)(1)(0) | N3IA' (1)(0) |
|---|---|---|---|---|---|
| IMMEDIATE-BYTE | 0 | 1 0 0 | 0 1 0 0 | 0 1 0 1 | 1 1 |
| IMMEDIATE-WORD | 0 | 0 0 1 | 0 1 0 1 | 0 1 1 0 | 1 1 |
| IMMEDIATE-LONG | 0 | 0 0 0 | 0 1 1 1 | 1 0 0 0 | 1 1 |
| IMMEDIATE-QUAD | 0 | 0 1 0 | 0 1 1 1 | 0 1 1 1 | 1 0 |
| IMMEDIATE-OCTA | 0 | 1 1 0 | 0 1 1 1 | 0 1 1 1 | 1 0 |
| ABSOLUTE | 1 | X X X | 0 1 1 1 | 1 0 0 0 | 1 1 |

| GPS' MODE (IMM. OR ABS.) | MODE (3) $D_4$ (3) | DATA TYPE 3 (2)(1)(0) | GPS3' SC (3)(2)(1)(0) |
|---|---|---|---|
| IMMEDIATE-BYTE | 0 | 1 0 0 | 0 1 0 0 |
| IMMEDIATE-WORD | 0 | 0 0 1 | 0 1 0 1 |
| IMMEDIATE-LONG | 0 | 0 0 0 | 0 1 1 0 |
| IMMEDIATE-QUAD | 0 | 0 1 0 | 0 1 1 0 |
| IMMEDIATE-OCTA | 0 | 1 1 0 | 0 1 1 0 |
| ABSOLUTE | 1 | X X X | 0 1 1 0 |

| GPS' MODE (IMM. OR ABS.) | MODE (4) $D_4$ (4) | DATA TYPE (3) (2)(1)(0) | GPS4I' SC (3)(2)(1)(0) |
|---|---|---|---|
| IMMEDIATE-BYTE | 0 | 1 0 0 | 0 1 0 1 |
| IMMEDIATE-WORD | 0 | 0 0 1 | 0 1 1 0 |
| IMMEDIATE-LONG | 0 | 0 0 0 | 0 1 1 1 |
| IMMEDIATE-QUAD | 0 | 0 1 0 | 0 1 1 1 |
| IMMEDIATE-OCTA | 0 | 1 1 0 | 0 1 1 1 |
| ABSOLUTE | 1 | X X X | 0 1 1 1 |

FIG. 38

RI TREE     FIG. 48

FIG. 50 R2R TREE

FIG. 53
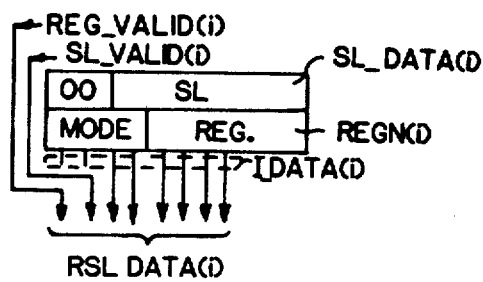
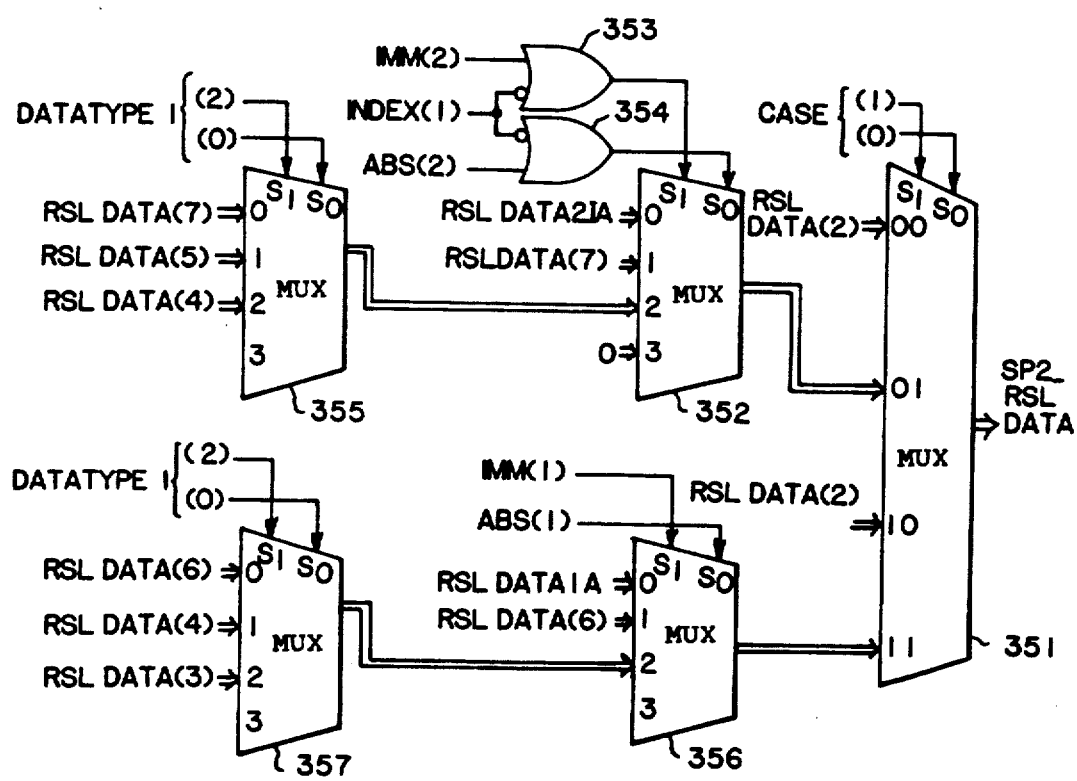
FIG. 54

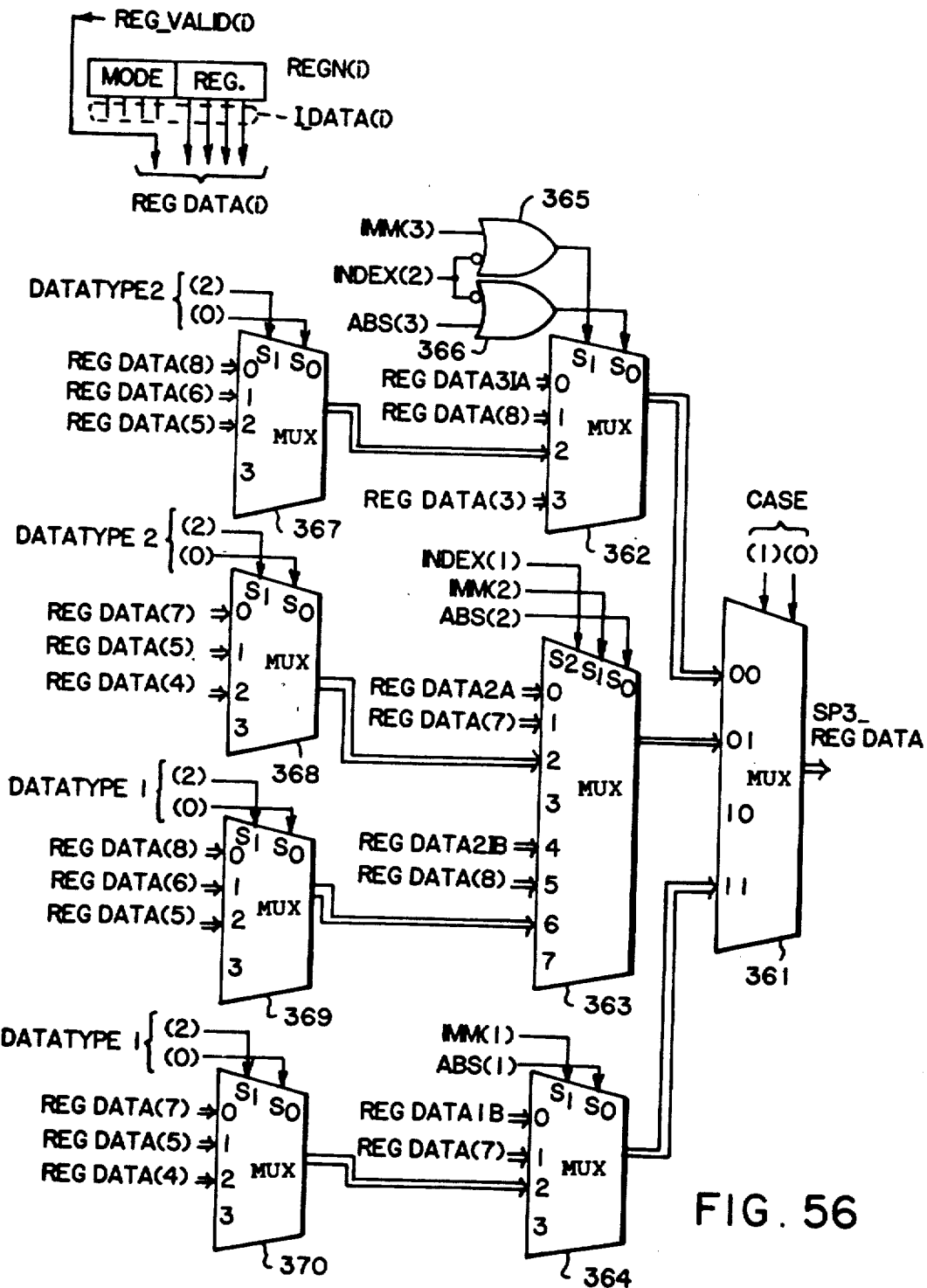

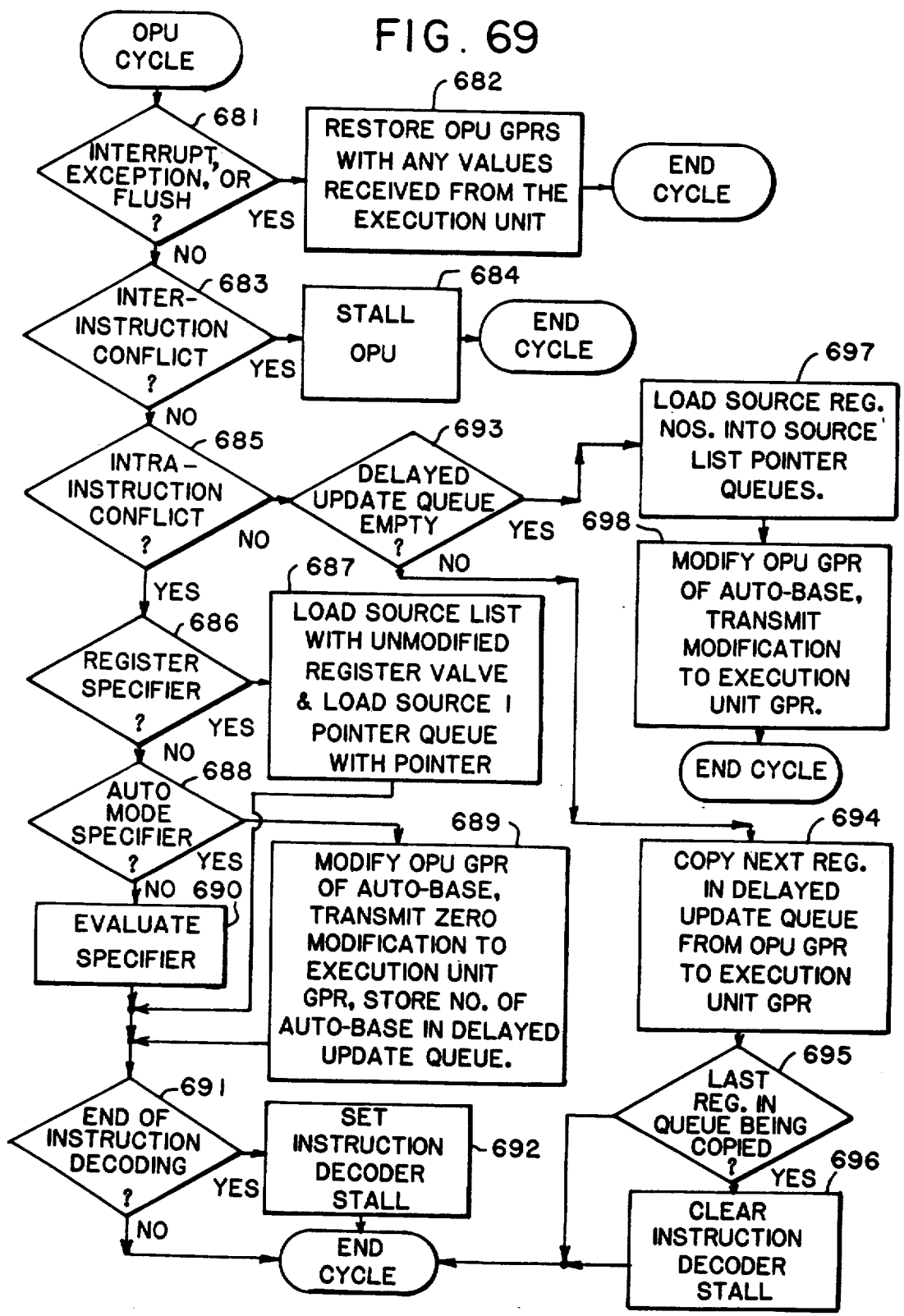

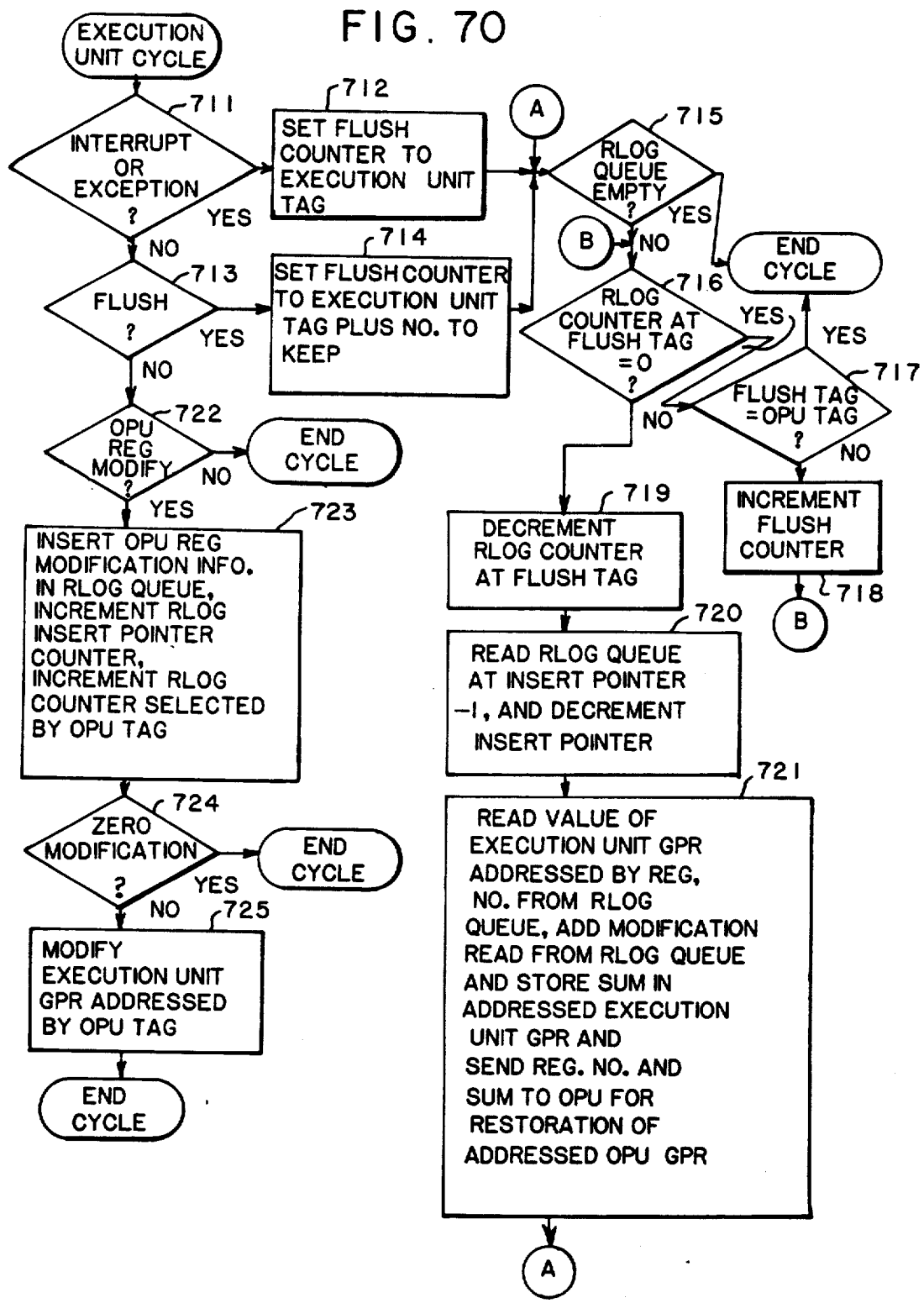

SIMULTANEOUSLY OR SEQUENTIALLY DECODING MULTIPLE SPECIFIERS OF A VARIABLE LENGTH PIPELINE INSTRUCTION BASED ON DETECTION OF MODIFIED VALUE OF SPECIFIER REGISTERS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

The present application discloses certain aspects of a computing system that is further described in the following U.S. patent applications filed concurrently with the present application: Evans et al., AN INTERFACE BETWEEN A SYSTEM CONTROL UNIT AND A SERVICE PROCESSING UNIT OF A DIGITAL COMPUTER, U.S. patent Ser. No. 07/306,837 filed Feb. 3, 1989; Arnold et al., METHOD AND APPARATUS FOR INTERFACING A SYSTEM CONTROL UNIT FOR A MULTIPROCESSOR SYSTEM WITH THE CENTRAL PROCESSING UNITS, U.S. patent Ser. No. 07/306,837 filed Feb. 3, 1989 abandoned, continued in U.S. patent Ser. No. 07/833,806 filed Feb. 10, 1992; Gagliardo et al., METHOD AND MEANS FOR INTERFACING A SYSTEM CONTROL UNIT FOR A MULTI-PROCESSOR SYSTEM WITH THE SYSTEM MAIN MEMORY, U.S. patent Ser. No. 07/306,326 filed Feb. 3, 1989, abandoned, continued in U.S. patent Ser. No. 07/646,522 filed Jan. 28, 1991; D. Fite et al., METHOD AND APPARATUS FOR RESOLVING A VARIABLE NUMBER OF POTENTIAL MEMORY ACCESS CONFLICTS IN A PIPELINED COMPUTER SYSTEM, U.S. patent Ser. No. 07/306,767 filed Feb. 3, 1989; D. Fite et al., DECODING MULTIPLE SPECIFIERS IN A VARIABLE LENGTH INSTRUCTION ARCHITECTURE, U.S. patent Ser. No. 07/307,347 filed Feb. 3, 1989 and issued on May 12, 1992 as U.S. Pat. No. 5,113,515; D. Fite et al., VIRTUAL INSTRUCTION CACHE REFILL ALGORITHM, U.S. patent Ser. No. 07/306,831 filed Feb. 3, 1989; Murray et al., MULTIPLE INSTRUCTION PREPROCESSING SYSTEM WITH DATA DEPENDENCY RESOLUTION FOR DIGITAL COMPUTERS, U.S. patent Ser. No. 07/306,773 filed Feb. 3, 1989; Murray et al., PREPROCESSING IMPLIED SPECIFIERS IN A PIPELINED PROCESSOR, U.S. patent Ser. No. 07/306,846 filed Feb. 3, 1989; D. Fite et al., BRANCH PREDICTION, U.S. patent Ser. No. 07/306,760 filed Feb. 3, 1989; Fossum et al., PIPELINED FLOATING POINT ADDER FOR DIGITAL COMPUTER, U.S. patent Ser. No. 07/306,343 filed Feb. 3, 1989, and issued as U.S. patent Ser. No. 4,994,996 on Feb. 19, 1991; Grundmann et al., SELF TIMED REGISTER FILE, U.S. patent Ser. No. 07/306,445 filed Feb. 3, 1989 and issued on Apr. 21, 1992 as U.S. Pat. No. 5,107,462; Beaven et al., METHOD AND APPARATUS FOR DETECTING AND CORRECTING ERRORS IN A PIPELINED COMPUTER SYSTEM, U.S. patent Ser. No. 07/306,828 filed Feb. 3, 1989 and issued as U.S. Pat. No. 4,982,402 on Jan. 1, 1991; Flynn et al., METHOD AND MEANS FOR ARBITRATING COMMUNICATION REQUESTS USING A SYSTEM CONTROL UNIT IN A MULTI-PROCESSOR SYSTEM, U.S. patent Ser. No. 07/306,871 filed Feb. 3, 1989; E. Fite et al., CONTROL OF MULTIPLE FUNCTION UNITS WITH PARALLEL OPERATION IN A MICROCODED EXECUTION UNIT, U.S. patent Ser. No. 07/306,832 filed Feb. 3, 1989, and issued on Nov. 19, 1991 as U.S. Pat. No. 5,067,069; Webb, Jr. et al., PROCESSING OF MEMORY ACCESS EXCEPTIONS WITH PRE-FETCHED INSTRUCTIONS WITHIN THE INSTRUCTION PIPELINE OF A VIRTUAL MEMORY SYSTEM-BASED DIGITAL COMPUTER, U.S. patent Ser. No. 07/306,866 filed Feb. 3, 1989, and issued as U.S. Pat. No. 4,985,825 on Jan. 15, 1991; Hetherington et al., METHOD AND APPARATUS FOR CONTROLLING THE CONVERSION OF VIRTUAL TO PHYSICAL MEMORY ADDRESSES IN A DIGITAL COMPUTER SYSTEM, U.S. patent Ser. No. 07/306,544 filed Feb. 3, 1989, now abandoned, and continued in U.S. patent Ser. No. 07/746,007 filed Aug. 9, 1991; Hetherington et al., WRITE BACK BUFFER WITH ERROR CORRECTING CAPABILITIES, U.S. patent Ser. No. 07/306,703 filed Feb. 3, 1989, and issued as U.S. Pat. No. 4,995,041 on Feb. 19, 1991; Chinnaswamy et al., MODULAR CROSSBAR INTERCONNECTION NETWORK FOR DATA TRANSACTIONS BETWEEN SYSTEM UNITS IN A MULTI-PROCESSOR SYSTEM, U.S. patent Ser. No. 07/306,336 filed Feb. 3, 1989, and issued as U.S. Pat. No. 4,968,977 on Nov. 6, 1990; Polzin et al., METHOD AND APPARATUS FOR INTERFACING A SYSTEM CONTROL UNIT FOR A MULTI-PROCESSOR SYSTEM WITH INPUT/OUTPUT UNITS, U.S. patent Ser. No. 07/306,862 filed Feb. 3, 1989, and issued as U.S. Pat. No. 4,965,793 on Oct. 23, 1990; Gagliardo et al., MEMORY CONFIGURATION FOR USE WITHIN MEANS FOR INTERFACING A SYSTEM CONTROL UNIT FOR A MULTI-PROCESSOR SYSTEM WITH THE SYSTEM MAIN MEMORY, U.S. patent Ser. No. 07/306,404 filed Feb. 3, 1989 and issued as U.S. Pat. No. 5,043,874 on Aug. 27, 1991; and Gagliardo et al., METHOD AND MEANS FOR ERROR CHECKING OF DRAM-CONTROL SIGNALS BETWEEN SYSTEM MODULES, U.S. patent Ser. No. 07/306,836 filed Feb. 3, 1989, abandoned, continued in U.S. patent Ser. No. 07/582,493 filed Sep. 14, 1990.

TECHNICAL FIELD

The present invention relates generally to digital computers, and more particularly to a pipelined central processing unit. The invention relates specifically to an instruction decoder for decoding variable length instructions having operation codes defining operations upon operands and operand specifiers for providing information for locating the operands.

DESCRIPTION OF RELATED ART

Pipelining is a proven method for enhancing the performance of the central processing unit (CPU) in a digital computer. In a pipelined CPU, multiple functional units concurrently execute the elementary operations for a plurality of instructions. In the pipeline, data is shifted from each stage to the next at the same time for all of the stages. At the time of the shift, it is desirable for each stage to have completed its elementary operation. If an intermediate stage cannot complete its assigned task at the time of the shift, at least the preceding stages must be stalled, or their results temporarily stored, until the intermediate stage is ready to receive more data. As a consequence, an efficient pipeline design is balanced so that the overall task is broken down into elementary operations having both about the same minimum processing time as well as about the same frequency of causing stalls. In other words, no one operation should dominate the processing time while others are relatively insignificant.

In a conventional digital computer, however, the elementary operations are to some extent dictated by the "fetch-execute" cycle and its separate steps of instruction fetching, instruction decoding, operand fetching, execution, and result store. As a result of the fetch-execute cycle, each step concerns data for a respective instruction, and it is desirable for each step to be completed in the typical case in the single clock cycle used for a memory access operation. Consequently, in a pipelined central processing unit, it is desirable to process instructions at a rate of one instruction per clock cycle.

For computer architectures permitting a variety of "variable length" instructions, the instruction decoding stage of a pipelined central processor has required more than one clock cycle to decode a typical instruction. Such a "variable length" instruction preferably has operand specifiers for specifying addressing modes independent from an operation code specifying the operation to be performed on the operands.

The goal of processing instructions at a rate of one instruction per clock cycle has been a major factor in defining recent computer architectures having a "reduced instruction set" in which the instruction formats and operand selections are restricted. For new systems and applications it is possible to freely select or change the computer architecture, but for existing systems and applications it is desirable to provide improved processors capable of processing variable length instructions of existing architectures at a rate of one per clock cycle.

SUMMARY OF THE INVENTION

Simultaneous decoding of multiple specifiers in variable-length instructions causes a peculiar problem of an intra-instruction read conflict (IRC) that occurs whenever an instruction includes an autoincrement or an autodecrement specifier which references either directly or indirectly a register specified by a previously occurring specifier for the current instruction. An example of such an intra-instruction conflict is:

ADDL R0,(R0)+,R1

In this case it is assumed that the addition specified by the ADDL opcode will result in the register R1 containing the sum of the initial value of the register R0, and the contents of the memory location pointed to by the value of R0, used as a memory address, and the final value of R0 will be four plus its initial value due to the auto increment mode of the (R0)+specifier. In other words, it is assumed that the operands are evaluated sequentially.

To avoid stalls during the preprocessing of instructions by the instruction unit, register pointers rather than register data are usually passed to the execution unit because register data is not always available at the time of instruction decoding. If an intra-instruction read conflict (IRC) exists, however, the operand value specified by the conflicting register specifier is the initial value of the register being incremented or decremented, and this initial value will have been changed by the time that the execution unit executes the instruction.

Preferably, the proper initial value is obtained prior to the incrementing or decrementing of the conflicting register by putting the instruction decoder into a special IRC mode in which only one specifier is decoded per cycle, and if a specifier being decoded is a register specifier, the content of the specified register is transmitted to the execution unit.

Preferably the general purpose registers are in the execution unit and a duplicate set of the general purpose registers are included in the instruction unit. When the execution unit modifies a register the new data is sent to both sets of registers. Similarly when the instruction decode unit evaluates a register modifying specifier both sets of registers are updated.

In the event of an exception or interrupt, the queues 23 must be flushed of information about instructions which have been decoded but not yet executed. If any of these decoded but not yet executed instructions contain a specifier having an autoincrement or autodecrement mode, the register having been modified must be returned to its original state. Preferably this is done by storing in a queue (the RLOG queue) information about the changes having been made to the general purpose registers when the registers have been modified by an autoincrement or autodecrement.

The restoration of the general purpose registers, however, is complicated by the need to handle intra-instruction read conflicts. According to the preferred method, once an intra-instruction read conflict is detected, the autoincrement and autodecrement specifiers modify only the instruction unit general purpose registers 651 and the register specifiers are passed as data, instead of pointers, to the execution unit. The instruction unit general purpose registers 651, but not the execution unit general purpose registers 652, are modified during evaluation of the autoincrement and autodecrement specifiers. When the instruction having the intra-instruction register conflict is fully decoded, decoding of the next instruction is temporarily inhibited until the current instruction is retired and the execution unit general purpose registers 652 are updated.

BRIEF DESCRIPTION OF THE DRAWINGS

Other objects and advantages of the invention will become apparent upon reading the following detailed description and upon reference to the drawings in which:

FIG. 3 is a diagram showing the preferred format of a variable length instruction;

FIG. 4 is a diagram of a particular variable length instruction for performing an addition between longwords;

FIG. 5 is a table showing the decoding of the mode information in the first byte of a specifier;

FIG. 6 is a schematic diagram showing an instruction buffer and operand unit connected to an instruction decoder capable of simultaneously decoding multiple specifiers;

FIG. 24 is a table illustrating how the number of specifiers being decoded can be determined for the four primary cases;

FIG. 26 is a schematic diagram of a three input priority encoder used in the shift count logic of FIG. 25;

FIG. 27 is a schematic diagram of a multiplexer incorporation priority logic;

FIG. 28 is a table showing values of the number of specifiers actually decoded when decoding to various levels when neither an immediate nor an absolute addressing mode is employed;

FIGS. 29, 30, 31, and 32 are truth tables showing how the shift count is determined when decoding to various levels when neither an immediate nor an absolute addressing mode is employed;

FIGS. 33, 34, 35, 36, 37 and 38 are truth tables showing how the number of specifiers actually decoded and the shift count are determined when decoding to various levels when an immediate or absolute addressing mode is employed;

FIG. 53 shows how a register valid signal, a short literal valid signal, and short literal data or a register number are combined together to obtain eight bits of register or short literal data;

FIG. 54 is a schematic diagram of a circuit for obtaining the register or short literal data associated with a second specifier being decoded;

FIG. 55 is a diagram showing how a register valid signal and a register number are combined to obtain register data;

FIG. 56 is a schematic diagram of a circuit for obtaining the register data associated with a third specifier being decoded;

FIG. 69 is a flowchart defining the control logic shown in FIG. 68 for the operand processing unit; and FIG. 70 is a flowchart defining the control logic in FIG. 68 for the execution unit.

Figure 1:
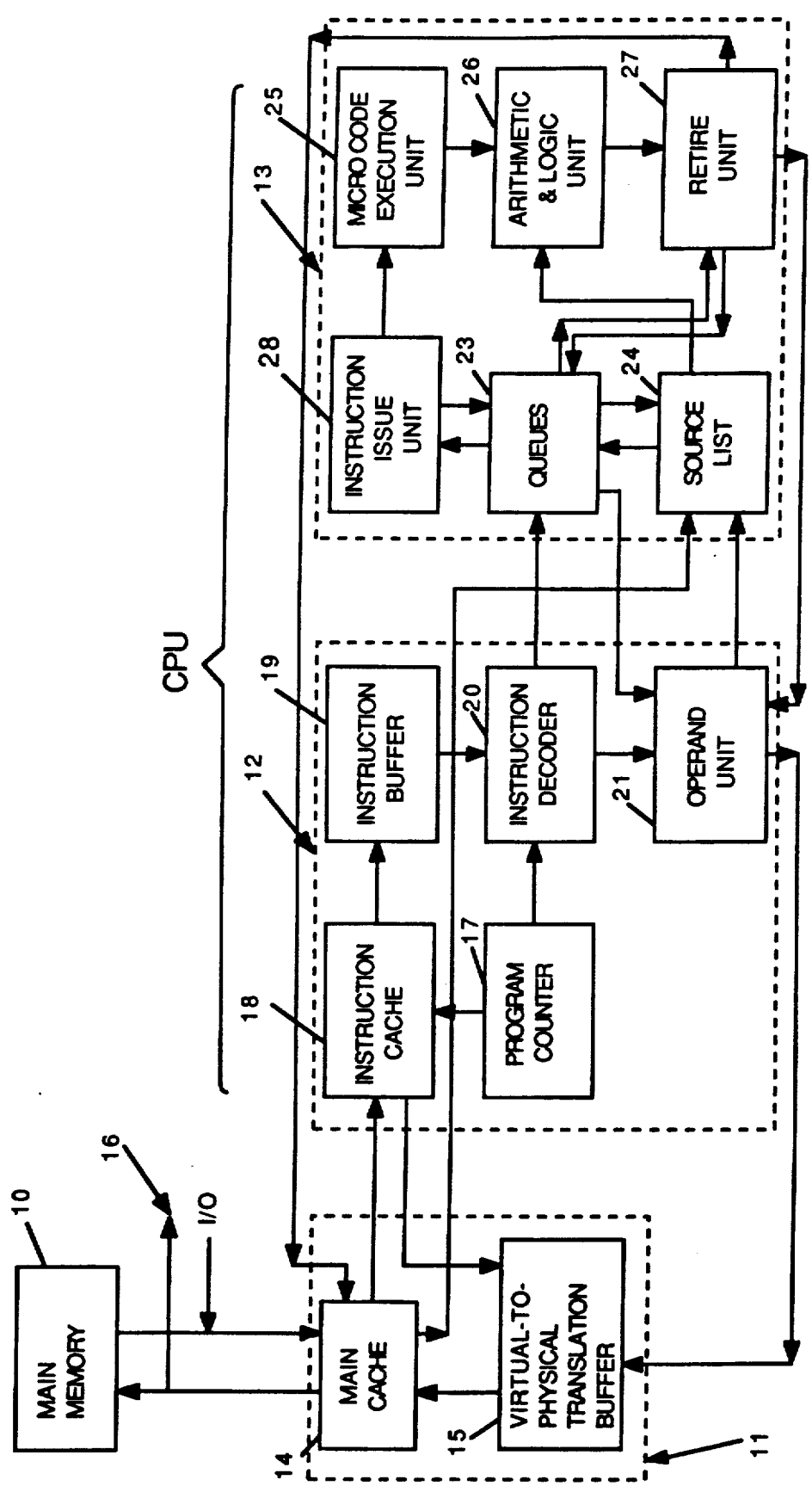
FIG. 1 is a block diagram of a digital computer system having a central pipelined processing unit which employs the present invention.

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Turning now to the drawings and referring first to FIG. 1, there is shown a portion of a digital computer system which includes a main memory 10, a memory-CPU interface unit 11, and at least one CPU comprising an instruction unit 12 and an execution unit 13. It should be understood that additional CPUs could be used in such a system by sharing the main memory 10.

Both data and instructions for processing the data are stored in addressable storage locations within the main memory 10. An instruction includes an operation code (opcode) that specifies, in coded form, an operation to be performed by the CPU, and operand specifiers that provide information for locating operands. The execution of an individual instruction is broken down into multiple smaller tasks. These tasks are performed by dedicated, separate, independent functional units that are optimized for that purpose.

Although each instruction ultimately performs a different operation, many of the smaller tasks into which each instruction is broken are common to all instructions. Generally, the following steps are performed during the execution of an instruction: instruction fetch, instruction decode, operand fetch, execution, and result store. Thus, by the use of dedicated hardware stages, the steps can be overlapped in a pipelined operation, thereby increasing the total instruction throughput.

The data path through the pipeline includes a respective set of registers for transferring the results of each pipeline stage to the next pipeline stage. These transfer registers are clocked in response to a common system clock. For example, during a first clock cycle, the first instruction is fetched by hardware dedicated to instruction fetch. During the second clock cycle, the fetched instruction is transferred and decoded by instruction decode hardware, but, at the same time, the next instruction is fetched by the instruction fetch hardware. During the third clock cycle, each instruction is shifted to the next stage of the pipeline and a new instruction is fetched. Thus, after the pipeline is filled, an instruction will be completely executed at the end of each clock cycle.

This process is analogous to an assembly line in a manufacturing environment. Each worker is dedicated to performing a single task on every product that passes through his or her work stage. As each task is performed the product comes closer to completion. At the final stage, each time the worker performs his assigned task a completed product rolls off the assembly line.

In the particular system illustrated in FIG. 1, the interface unit 11 includes a main cache 14 which on an average basis enables the instruction and execution units 12 and 13 to process data at a faster rate than the access time of the main memory 10. This cache 14 includes means for storing selected predefined blocks of data elements, means for receiving requests from the instruction unit 12 via a translation buffer 15 to access a specified data element, means for checking whether the data element is in a block stored in the cache, and means operative when data for the block including the specified data element is not so stored for reading the specified block of data from the main memory 10 and storing that block of data in the cache 14. In other words, the cache provides a "window" into the main memory, and contains data likely to be needed by the instruction and execution units. In general, since the cache 14 will be accessed at a much higher rate than the main memory 10, the main memory can have a proportionally slower access time than the cache without substantially degrading the average performance of the data processing system. Therefore, the main memory 10 can be comprised of slower and less expensive memory elements.

The translation buffer 15 is a high speed associative memory which stores the most recently used virtual-to-physical address translations. In a virtual memory system, a reference to a single virtual address can cause several memory references before the desired information is made available. However, where the translation buffer 15 is used, translation is reduced to simply finding a "hit" in the translation buffer 15.

An I/O bus 16 is connected to the main memory 10 and the main cache 14 for transmitting commands and input data to the system and receiving output data from the system.

The instruction unit 12 includes a program counter 17 and an instruction cache 18 for fetching instructions from the main cache 14. The program counter 17 preferably addresses virtual memory locations rather than the physical memory locations of the main memory 10 and the cache 14. Thus, the virtual address of the program counter 17 must be translated into the physical address of the main memory 10 before instructions can be retrieved. Accordingly, the contents of the program counter 17 are transferred to the interface unit 11 where the translation buffer 15 performs the address conversion. The instruction is retrieved from its physical memory location in the cache 14 using the converted address. The cache 14 delivers the instruction over data return lines to the instruction cache 18. The organization and operation of the cache 14 and the translation buffer 15 are further described in Chapter 11 of Levy and Eckhouse, Jr., Computer Programming and Architecture, The VAX-11, Digital Equipment Corporation, pp. 351-368 (1980).

Most of the time, the instruction cache has prestored in it instructions at the addresses specified by the program counter 17, and the addressed instructions are available immediately for transfer into an instruction buffer 19. From the buffer 19, the addressed instructions are fed to an instruction decoder 20 which decodes both the op-codes and the specifiers. An operand processing unit (OPU) 21 fetches the specified operands and supplies them to the execution unit 13.

The OPU 21 also produces virtual addresses. In particular, the OPU 21 produces virtual addresses for memory source (read) and destination (write) operands. For the memory read operands, the OPU 21 delivers these virtual addresses to the interface unit 11 where they are translated to physical addresses. The physical memory locations of the cache 14 are then accessed to fetch the operands for the memory source operands.

In each instruction, the first byte contains the opcode, and the following bytes are the operand specifiers to be decoded. The first byte of each specifier indicates the addressing mode for that specifier. This byte is usually broken in halves, with one half specifying the addressing mode and the other half specifying a register to be used for addressing. The instructions preferably have a variable length, and various types of specifiers can be used with the same opcode, as disclosed in Strecker et al., U.S. Pat. No. 4,241,397 issued Dec. 23, 1980.

The first step in processing the instructions is to decode the "opcode" portion of the instruction. The first portion of each instruction consists of its opcode which specifies the operation to be performed in the instruction, and the number and type of specifiers to be used. Decoding is done using a table-look-up technique in the instruction decoder 20, to find the data context (byte, word, etc.), data type (address, integer, etc.) and accessing mode (read, write, modify, etc.) for each specifier. Also, the decoder determines where source-operand and destination-operand specifiers occur in the instruction and passes these specifiers to the OPU 21 for preprocessing prior to execution of the instruction. Later the execution unit performs the specified operation by executing prestored microcode, beginning a starting address obtained from a "fork RAM" that is addressed with the instruction opcode.

After an instruction has been decoded, the OPU 21 parses the operand specifiers and computes their effective addresses; this process involves reading generals purpose registers (GPRs) and possibly modifying the GPR contents by autoincrementing or autodecrementing. The operands are then fetched from those effective addresses and passed on to the execution unit 13, which executes the instruction and writes the result into the destination identified by the destination pointer for that instruction.

Each time an instruction is passed to the execution unit, the instruction unit sends a microcode dispatch address and a set of pointers for (1) the locations in the execution-unit register file where the source operands can be found, and (2) the location where the results are to be stored. Within the execution unit, a set of queues 23 includes a fork queue for storing the microcode dispatch address, a source pointer queue for storing the source-operand locations, and a destination pointer queue for storing the destination location. Each of these queues is a FIFO buffer capable of holding the data for multiple instructions.

The execution unit 13 also includes a source list 24, which is stored in a multi-ported register file that also contains a copy of the GPRs. Thus entries in the source pointer queue will either point to GPR locations for register operands, or point to the source list for memory and literal operands. Both the interface unit 11 and the instruction unit 12 write entries in the source list 24, and the execution unit 13 reads operands out of the source list as needed to execute the instructions. For executing instructions, the execution unit 13 includes an instruction issue unit 28, a microcode execution unit 25, an arithmetic and logic unit (ALU) 26, and a retire unit 27.

Figure 2:
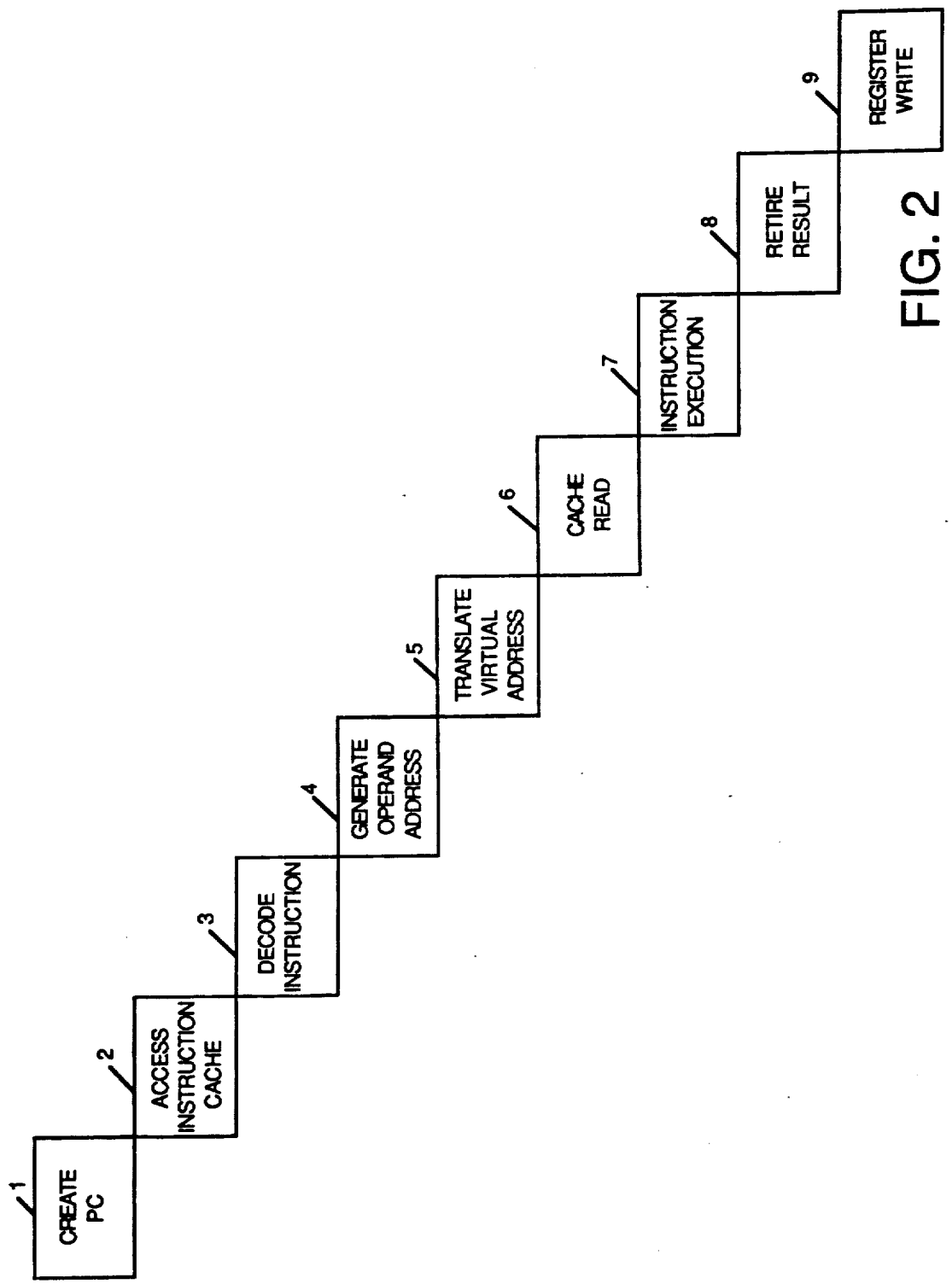
FIG. 2 is a diagram showing various steps performed to process an instruction and which may be performed in parallel for different instructions by a pipelined instruction processor according to FIG. 1.

The present invention is particularly useful with pipelined processors. As discussed above, in a pipelined processor the processor's instruction fetch hardware may be fetching one instruction while other hardware is decoding the operation code of a second instruction, fetching the operands of a third instruction, executing a fourth instruction, and storing the processed data of a fifth instruction. FIG. 2 illustrates a pipeline for a typical instruction such as:

ADDL3 R0, B 12(R1),R2.

This is a longword addition using the displacement mode of addressing.

In the first stage of the pipelined execution of this instruction, the program count (PC) of the instruction is created; this is usually accomplished either by incrementing the program counter from the previous instruction, or by using the target address of a branch instruction. The PC is then used to access the instruction cache 18 in the second stage of the pipeline.

In the third stage of the pipeline, the instruction data is available from the cache 18 for use by the instruction decoder 20, or to be loaded into the instruction buffer 19. The instruction decoder 20 decodes the opcode and the three specifiers in a single cycle, as will be described in more detail below. The R0 and R2 numbers are passed to the ALU unit 27, and the R1 number along with the byte displacement is sent to the OPU 21 at the end of the decode cycle.

In stage 4, the operand unit 21 reads the contents of its GPR register file at location R1, adds that value to the specified displacement (12), and sends the resulting address to the translation buffer 15 in the interface unit 11, along with an OP READ request, at the end of the address generation stage.

In stage 5, the interface unit 11 selects the address generated in stage 4 for execution. Using the translation buffer 15, the interface unit 11 translates the virtual address to a physical address during the address translation stage. The physical address is then used to address the cache 14, which is read in stage 6 of the pipeline.

In stage 7 of the pipeline, the instruction is issued to the ALU 26 which adds the two operands and sends the result to the retire unit 27. During stage 4, the register numbers for R1 and R2, and a pointer to the source list location for the memory data, were sent to the execution unit and stored in the pointer queues. Then during the cache read stage, the execution unit started to look for the two source operands in the source list. In this particular example it finds only the register data in R0, but at the end of this stage the memory data arrives and is substituted for the invalidated read-out of the register file. Thus both operands are available in the instruction execution stage.

In the retire stage 8 of the pipeline, the result data is paired with the next entry in the retire queue. Although several functional execution units can be busy at the same time, only one instruction can be retired in a single cycle.

In the last stage 9 of the illustrative pipeline, the data is written into the GPR portion of the register files in both the execution unit 13 and the instruction unit 12.

FIG. 3 depicts a typical instruction 30 that can be processed by the central processing unit (CPU) shown in FIG. 1. This instruction corresponds to the VAX variable-length instruction architecture as described in Levy & Eckhouse, Jr. cited above. The instruction 30 includes an operation code 31 consisting of either one or two bytes. If the first byte 32 has a value of FD hexadecimal, then it is recognized as a double-byte operation code. Otherwise, the instruction decoder (20 in FIG. 1) recognizes the operation code as including only a single byte. The instruction 30 may further include up to six specifiers following the operation code.

The operation code indicates how many specifiers are included in the instruction. The specifiers used in connection with any given operation code may have various attributes and different lengths. The attributes of a particular specifier are determined at least in part by an addressing mode in the first byte of the specifier. However, the permissible attributes of the specifier are sometimes limited by the operation code. Further, for a particular kind of addressing mode known as "immediate addressing," the length of the specifier information is determined by a "data type" specified by the specifier.

A specific variable length instruction is shown in FIG. 4. In assembler notation, this instruction is written as "ADDL3 R0, #4,L 203(R2)". In machine code, the instruction includes eight bytes generally designated 35. The first byte is an operation code of 23 hexadecimal which corresponds to the assembler mnemonic "ADDL3." The operation code indicates that a first longword operand is to be added to a second longword operand and the longword result is to be stored at a destination.

Following the operation code is a "register specifier" having a value of 50 hexadecimal. The hexadecimal digit of 5 denotes that the specifier is a register specifier, and the hexadecimal digit 0 indicates that the specified register is the R0 general purpose register in the CPU. The register specifier therefore specifies that the first source operand is the content of the general purpose register R0.

Following the register specifier is a "short literal specifier" having a value of 04 hexadecimal. The short literal specifier specifies a value of four for the second source operand.

Following the short literal specifier is the first byte of a "complex specifier" that specifies the destination of the addition operation. The hexadecimal digit E indicates a "longword displacement" addressing mode in which the following four bytes are to be interpreted as a thirty-two-bit address displacement to be added to the value of the content of a base register to obtain an address specified by the complex specifier. The hexadecimal digit 2 indicates that the general purpose register R2 is to be used as the base register. The complex specifier therefore specifies that the sum or result of the longword addition indicated by the operand code is to be stored in memory at an address computed by adding the value of 203 hexadecimal to the content of the general purpose register R2.

Turning now to FIG. 5, there is shown a decoding table for decoding the first byte of an operand specifier which is not a branch displacement. If the two most significant bits of the first byte of the operand specifier are both zero, then the operand specifier consists of the single first byte, and the six least significant bits of this byte are interpreted or decoded as specifying a six-bit value referred to as a "short literal."

If the first two most significant bits of the first byte of an operand specifier are not zero, and assuming that the byte is not part of a branch displacement, then the byte is decoded as a particular one of twelve possible register addressing modes relating to a specified one of sixteen general purpose registers R0 to R15 in the CPU. The most significant four bits of the byte (constituting a register mode field) are decoded to indicate the addressing mode, and the four least significant bits (constituting a general purpose register address field) are used to address a particular one of the sixteen general purpose registers.

If the register mode field has a hexadecimal value of four, then an "index mode" is specified in which the value of the content of the general purpose register addressed by the register address field is multiplied by the size in bytes of the operand (e.g., by 1, 2, 4, 8 or 16 for respective byte, word, longword, quadword or octaword data types) and the sum is included as a term in the address computation performed for an immediately following complex specifier; the next byte must have a register mode field with a value of 6 to F hexadecimal, and a register address field which addresses a base register for the complex specifier.

If the register mode field has a hexadecimal value of five, then the specifier is a "register specifier" in which the operand value is found in the general purpose register indicated by the register address field or, if the specifier is for the destination of the instruction, then the specifier specifies that the result is to be stored in the general purpose register indicated by the register address field.

For each of register modes 6, 7 and 8, the designated register contains the memory address for the operand. For a source operand, the operand value is read from this memory address, and for a destination operand, the result is written to this memory address. In mode 6 the designated register contains the address of the operand. In register mode 7 the content of the designated general purpose register is first decremented before computation of the address; in mode 8 the content of the designated general purpose register is incremented after the register is used to compute the address. Register mode 9 is similar to register mode 8, except that the content of the designated general purpose register specifies the address in memory at which the operand address will be found rather than the operand itself.

Modes 10 through 15 are various kinds of "displacement modes." In a displacement mode a displacement value, which may comprise a byte, word, or longword in modes 10, 12 and 14 respectively, is added to the content of the designated general purpose register to obtain the operand address. The operand is determined in a similar fashion in modes 11, 13 and 15 except that the sum of the displacement value and the content of the general purpose register identifies a memory address at which the address of the operand can be found.

In modes 8 through 15, the register address field of the first byte of the operand specifier can designate any of the general purpose registers, including register R15 which is the program counter. For modes 8 and 9, if the program counter is addressed, the value of the program counter itself is incremented which causes program execution to jump over operand data or an operand address disposed in the instruction stream. The instruction decoded therefore must recognize these special cases of modes 8 and 9 in which the program counter is addressed. In mode 8, this special case is known as an "immediate" addressing mode, and for mode 9 it is known as an "absolute" addressing mode. Specifically, when modes 8 and 9 are decoded for any of the general purpose registers 0 through 14, the next specifier or the next operation code appears immediately following the byte designating the mode and the general purpose register. For the immediate mode, however, a number of bytes of the immediate data appear and the number of bytes is determined by the specifier's datatype.

Turning now to FIG. 6, the data paths to and from the instruction decoder 20 are shown in greater detail. In order to simultaneously decode a number of operand specifiers, the instruction buffer 19 is linked to the instruction decoder 20 by a data path generally designated 40 for conveying the values of up to nine bytes of an instruction being decoded. Associated with each byte, however, is a parity bit for detecting any single bit errors in the byte, and also a valid data flag (I_VALID) for indicating whether the instruction buffer has in fact been filled with data from the instruction cache (18 in FIG. 1) as requested by the program counter (17 in FIG. 1).

The instruction decoder decodes a variable number of specifiers depending upon the amount of valid data in the instruction buffer 19. Specifically, the instruction decoder inspects the valid data flags to determine the number of specifiers that can be decoded and decodes them in a single cycle. In accordance with the number of specifiers that are actually decoded, the instruction decoder determines the number of bytes that are decoded in order to remove these bytes from the instruction buffer 19.

As shown in FIG. 6, there is associated with the instruction buffer 19 means for shifting a selected number of bytes into and out of the instruction buffer 19. This shifting means includes a shifter 21 which is arranged with a merge multiplexer 22 to either re-circulate or shift data from the instruction buffer 19. The instruction buffer operates as a data latch to receive data in response to clocking by the system clock of the central processing unit. The instruction decoder transmits a number to the shifter 21 to specify the number of bytes to be shifted out of the instruction buffer at the end of each cycle.

The instruction buffer 19 is large enough to hold at least three specifiers of the kind which are typically found in an instruction. The instruction decoder 20 is somewhat simplified if the byte 0 position of the instruction buffer holds the opcode while the other bytes of the instruction are shifted into and out of the instruction buffer 19. In effect, the instruction buffer holds the opcode in byte 0 and functions as a first-in, first-out buffer for byte positions 1 to 8. The instruction decode is also simplified under the assumption that only the specifiers for a single instruction are decoded during each cycle of the system clock. Therefore, at the end of a cycle in which all of the specifiers for an instruction will have been decoded, the instruction decoder transmits a "shift op" signal to the shifter 21 in order to shift the opcode out of the byte 0 position of the instruction buffer so that the next opcode may be received in the byte 0 position.

The instruction cache (18 in FIG. 1) preferably is arranged to receive and transmit instruction data in blocks of multiple bytes of data and the block size is preferably a power of two so that the blocks have memory addresses specified by a certain number of most significant bits in the address provided by the program counter (17 in FIG. 1). Therefore, the address of the operation codes from the instruction buffer will occur at various positions within the block. To load byte 0 of the instruction buffer with the operation code which may occur at any byte position within a block of instruction data from the cache, a rotator 23 is disposed in the data path from the instruction cache 18 to the instruction buffer 19. The rotator 23, as well as the shifter 21, are comprised of cross-bar switches.

In order to load the byte 0 position of the instruction buffer with an opcode in the instruction stream from the instruction cache, the merge multiplexer 22 has a select input for selecting the number of bytes from the rotator 23' to be merged with a select number of bytes from the shifter 21'. In particular, the merge multiplexer has data inputs A0 to A8, and in response to a particular "number to shift" m, the multiplexer 22 enables inputs A0, ... A8−m to receive data from the shifter, and enables inputs B8−m+1, ... , B8 to receive data from the rotator. As shown, this multiplexing function can be provided by a multiplexer 22 having individual select inputs S0–S8 for selecting either the respective A or the respective B input, and by enabling the individual select lines S0–S8 by control logic 24' responsive to the NO. TO SHIFT signal and the number of valid entries (IBUF VALID COUNT) in the instruction buffer 19, as determined by logic 26' responsive to valid data flags in the instruction buffer. The control logic 24 is also responsive to the SHIFT OP signal so that when the SHIFT OP signal is asserted, the total number of bytes to be shifted includes the opcode, and when the SHIFT OP signal is not asserted, the opcode from the instruction buffer is transmitted to the A0 input of the merge multiplexer 22 regardless of the number to shift.

As shown in FIG. 6, the data path from the instruction cache includes eight parallel busses, one bus being provided for each byte of instruction data. The rotator is responsive to a "rotate value" provided by rotator control logic 26'. The rotator control logic 26 is responsive to the NO. TO SHIFT and the IBUF VALID COUNT, which together indicate where the first incoming byte of new instruction data is to be placed in the instruction buffer 19, and a value IBEX VALID COUNT which is supplied by the instruction cache and associated buffering between the cache and the rotator 23' and which indicates from where the first incoming byte of new instruction data is obtained. The preferred construction and operation of the instruction cache and associated buffering, and the control of the rotator and merge multiplexer in that case, is further described in the above referenced D. Fite et al., U.S. patent application Ser. No. 07/306,831, filed Feb. 3, 1989, and issued on May 12, 1992 as U.S. Pat. No. 5,113,515 and entitled "Virtual Instruction Cache Refill Algorithm," which is incorporated herein by reference.

It should be noted that when the instruction buffer is first loaded and at certain times thereafter, it is possible that some of the data received by the rotator 23' is invalid for the purpose of transfer to the instruction buffer 19. In particular, if eight bytes of data are read from the instruction cache and transferred directly to the rotator 23', and an opcode to be loaded appears at a middle byte position within the block, then instruction data at addresses higher than the opcode will be valid for transfer, and addresses lower than the opcode will be invalid for transfer. Therefore, it is possible that the opcode and bytes immediately following it may be valid, and the other bytes may be invalid. As a consequence, a valid data flag indicates whether the byte position associated with it and all lower numbered byte positions, up to the initially loaded opcode, are valid.

Once an opcode has been loaded into the byte 0 position of the instruction buffer 19, the instruction decoder 20 examines it and transmits a corresponding microprogram "fork address" to a fork queue in the queues (23 in FIG. 1). The instruction decoder also examines the other bytes in the instruction buffer to determine whether it is possible to simultaneously decode up to three operand specifiers. The instruction decoder further separates the source operands from the destination operands. In particular, in a single cycle of the system clock, the instruction decoder may decode up to two source operands and one destination operand. Flags indicating whether source operands or a destination operand are decoded for each cycle are transmitted from the instruction decoder 20 to the operand unit 21 over a transfer bus (TR).

The instruction decoder 20 may simultaneously decode up to three register specifiers per cycle. When a register specifier is decoded, its register address is placed on the transfer bus TR and sent to the source list queue (23 in FIG. 1) via a transfer unit 30 in the operand unit 21.

The instruction decoder 20 may decode one short literal specifier per cycle. According to the VAX instruction architecture, the short literal specifier must be a source operand specifier. When the instruction decoder decodes a short literal specifier, the short literal data is transmitted over a bus (EX) to an expansion unit 31 in the operand unit 21. The expansion unit 31 expands the six bits of the short literal to the size required by the data type of the specifier as called for by the instruction opcode, and that expansion is placed in the minimum number of 32-bit long words sufficient to hold the expansion. In other words, one 32-bit longword is needed for a byte, word, longword or single precision floating-point datatype; two 32-bit longwords are needed for a quadword or a double-precision floating point datatype, and four 32-bit longwords are required for an octaword data type. The 32-bit longwords are transmitted to the source list (24 in FIG. 1), and a source list pointer corresponding to the operand is placed in the source list pointer queue (23 in FIG. 1).

The instruction decoder 20 may decode one complex specifier per cycle. The complex specifier data is transmitted by the instruction decoder 20 over a general purpose bus (GP) to a general purpose unit 32 in the operand unit 21. The general purpose unit 32 operates in a similar fashion to a conventional operand unit which shifts the content of the index register by a selected number of binary positions corresponding to the data type of the specifier, and adds the shifted value to the content of the base register and any displacement for the complex specifier. If the specifier has an "address" access type, the computed value is placed in the source list and a corresponding source list pointer is sent to the source list queue (23 in FIG. 1). Otherwise, if the complex specifier specifies a source operand, memory is addressed by the computed value to obtain the source operand, or in the case of the deferred mode, to obtain the address of the source operand. The source operand is then placed in the source list (24 in FIG. I) and a corresponding source list pointer is placed in the source list pointer queue (23 in FIG. 1). If the complex specifier specifies a destination operand, the computed value is placed in the destination queue (23 in FIG. 1).

Once all of the specifiers for the instruction have been decoded, the instruction decoder 20 transmits the "shift op" signal to the shifter 21.

Figure 7:
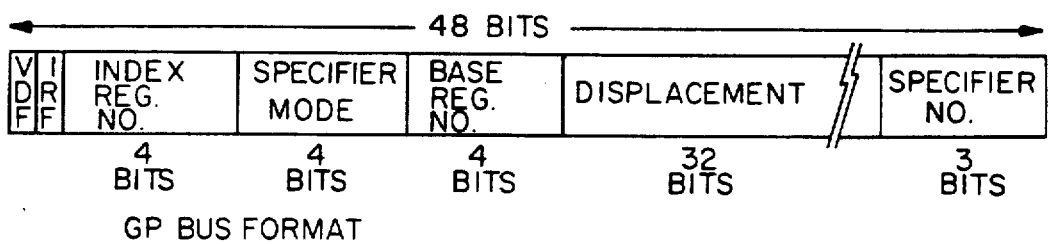
FIG. 7 is a diagram showing the format for a general purpose specifier bus interconnecting the instruction decoder and the operand unit of FIG. 6.

Turning now to FIG. 7, the format for the GP bus is shown in greater detail. The GP bus transmits a single bit "valid data flag" (VDF) to indicate to the general purpose unit 32 whether a complex specifier has been decoded during the previous cycle of the system clock. A single bit "index register flag" (IRF) is also transmitted to indicate whether the complex specifier references an index register. Any referenced index register is designated by a four-bit index register number transmitted over the GP bus. The GP bus also conveys four bits indicating the specifier mode of the complex specifier, four bits indicating the base register number, and thirty-two bits including any displacement specified by the complex specifier.

The GP bus also transmits a three-bit specifier number indicating the position of the complex specifier in the sequence of the specifiers for the current instruction. The specifier number permits the general purpose unit 32 to select access and data type for the specified operand from a decode of the opcode byte. Therefore, it is possible for the general purpose unit 32 to operate somewhat independently of the expansion unit 31 and transfer unit 30 of FIG. 6. In particular, the general purpose unit 32 provides an independent stall signal (OPU_STALL) which indicates whether the general purpose unit 32 requires more than one cycle to determine the operand.

Figure 8:
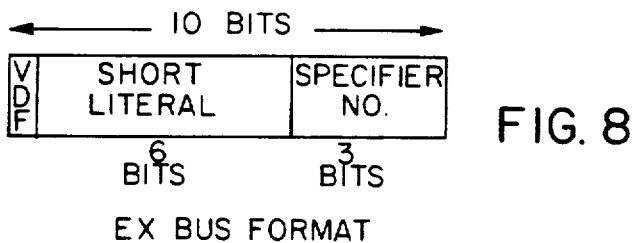
FIG. 8 is a diagram of an expansion bus for transferring short literal information from the instruction decoder to the operand unit of FIG. 6.

Turning now to FIG. 8, there is shown the format for the expansion bus (EX). The expansion bus conveys a single bit valid data flag, the six bits of the short literal data, and a three-bit specifier number. The specifier number indicates the position of the short literal specifier in the sequence of specifiers following the current instruction, and is used by the expansion unit 31 to select the relevant datatype from a decode of the opcode byte. Therefore, the expansion unit 31 may also operate rather independently and provides a respective stall signal (SL_STALL) which indicates whether the expansion unit requires more than one cycle to process a short literal specifier.

Figure 9:
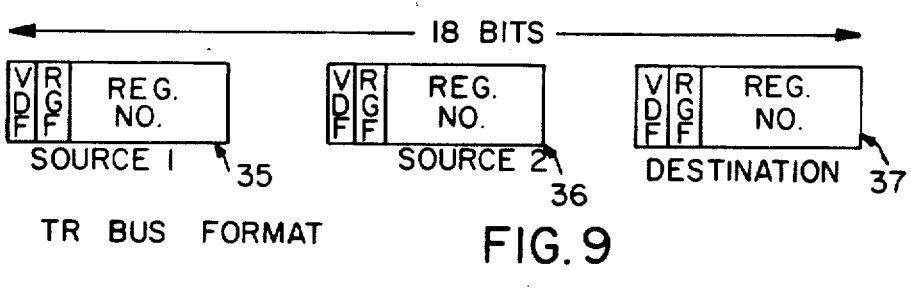
FIG. 9 is a diagram of the format for a transfer bus for transferring register and other operand information from the instruction decoder to the operand unit of FIG. 6.

Turning now to FIG. 9, there is shown the format for the transfer bus (TR). The TR bus includes a first source bus 35, a second source bus 36 and a destination bus 37, each of which conveys a respective valid data flag (VDF), a register flag (RGF) and a register number. The register flag is set when a corresponding register specifier has been decoded. Also, whenever a complex or short literal specifier is decoded, then a respective one of the valid data flags in the first source, second source or destination buses is set and the associated register flag is cleared in order to reserve a space in the data path to the source list point queue or the destination queue for the source or destination operand.

Figure 10:
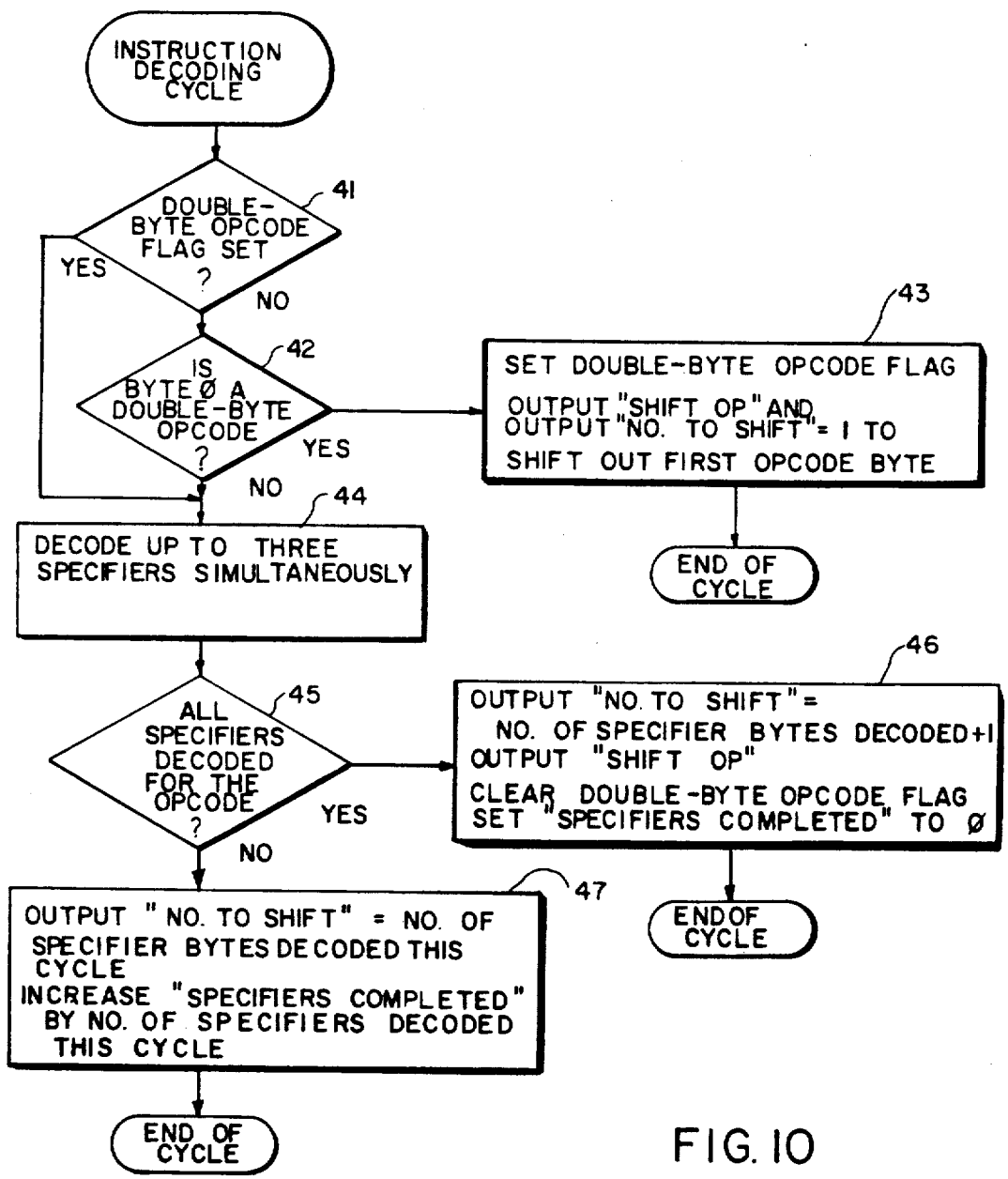
FIG. 10 is a flowchart of the preferred procedure performed by the instruction decoder of FIG. 6 to decode a variable length instruction in the format of FIG. 3.

Turning now to FIG. 10, there is shown a flowchart of the operations performed during a single cycle of the system clock for decoding an instruction. In a first step 41, a double-byte opcode flag is inspected to determine whether the first byte of a double-byte operation code was detected during the previous cycle. If not, then in step 42 the instruction decoder checks whether the byte 0 position of the instruction buffer includes the first byte of a double-byte opcode. For a VAX instruction, the first byte of a double-byte opcode has a value of FD hexadecimal. If this value is detected, then in step 43 the double-byte opcode flag is set for the benefit of the next cycle and the SHIFT OP signal is sent to the shifter (21 of FIG. 6) with a NO. TO SHIFT equal to one to shift the first opcode byte out of the instruction buffer and to receive the second byte of the opcode in the byte 0 position.

When byte 0 does not indicate a double-byte opcode, then in step 44 up to three specifiers are decoded simultaneously. The preferred method of simultaneous decoding is described further below in connection with FIG. 11. After decoding the specifiers, in step 45 the decoder determines whether all of the specifiers for the opcode have been decoded. For this purpose, the decoder has a register which stores the total number of specifiers that were decoded in previous cycles for the current operation code. The value in this register is referred to as the "specifiers completed." Therefore, in step 45 the decoder determines whether all of the specifiers are decoded for the operation code by comparing the number of specifiers for the operation code (referred to as the specifier count) to the sum of the "specifiers completed" and the number of specifiers having been decoded in step 44.

If all of the specifiers are decoded for the operation code, then in step 46 the decoder determines the number of bytes to shift as equal to one plus the specifier bytes decoded in step 44. The additional one is for shifting a new operation code into the instruction buffer. To do this, the instruction decoder asserts the "shift op" signal. The double-byte opcode flag is cleared at this time and also the "specifiers completed" is set to zero to begin decoding of the next instruction during the next cycle.

If in step 45 it was determined that there are additional specifiers to be decoded for the operation code, then in step 47 the shifter (21 in FIG. 6) is sent a "number to shift" equal to the number of specifier bytes having been decoded in step 44. Also, the "specifiers completed" is increased by the number of specifiers having been decoded in step 44. This completes the decoding during the present cycle.

Figure 11:
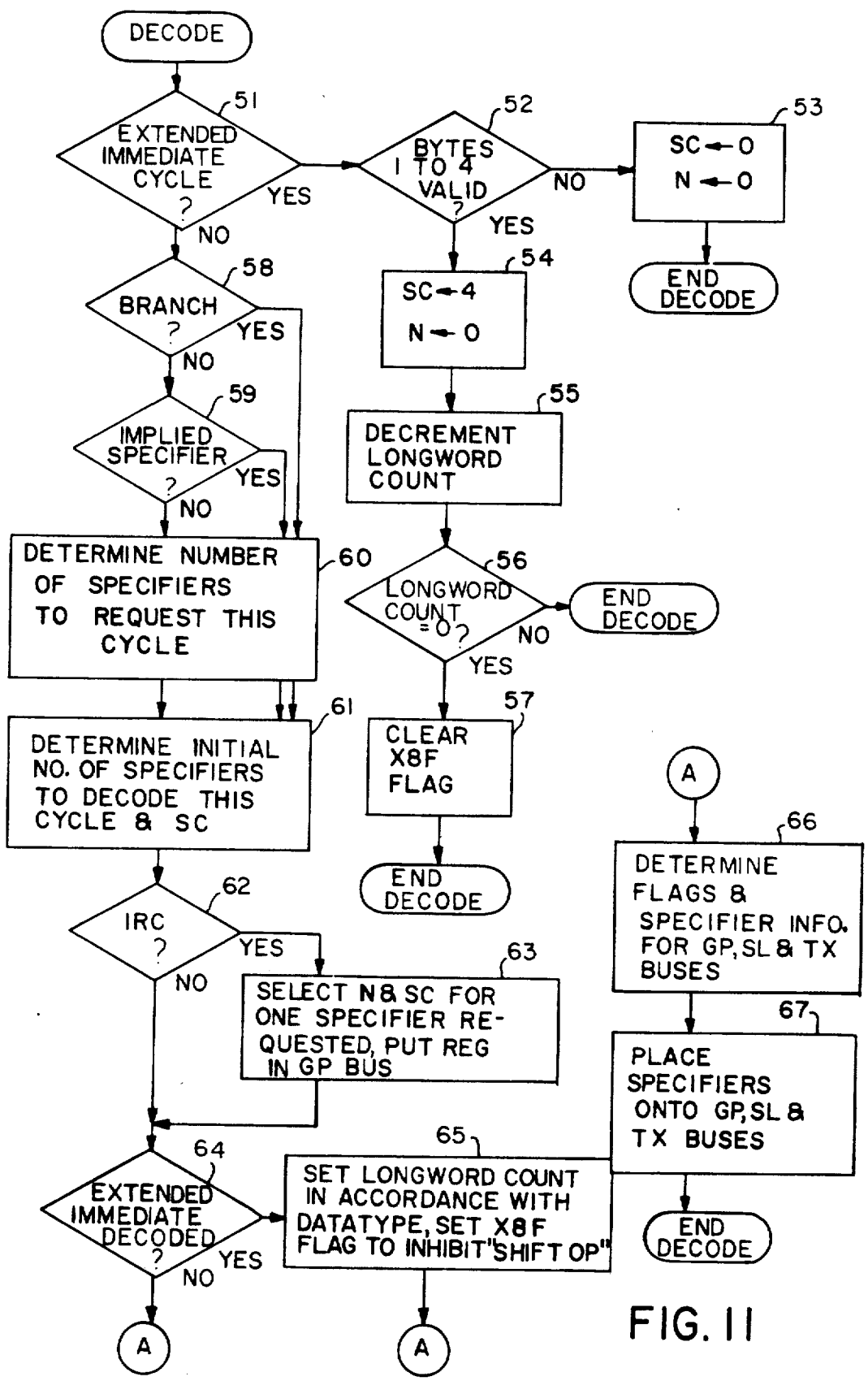
FIG. 11 is a flowchart of the procedure performed by the instruction decoder of FIG. 6 to decode up to three specifiers simultaneously.

Turning now to FIG. 11, there is shown a flowchart of a method of decoding up to three specifiers simultaneously. In a first step 51, the decoder determines whether an "extended immediate" addressing mode was detected during a previous cycle so that the next four bytes in the instruction buffer are properly interpreted as extended immediate data. This decision is critical because there is no restriction on the values that the extended immediate data may assume, so that they could possibly assume values that are characteristic of register or short literal specifiers or various other addressing modes. If the instruction buffer may contain such extended immediate data, then in step 52 the decoder determines whether bytes 1 to 4 contain valid data. If not, then in step 53 the instruction decoder determines a shift count (SC) and a number of the specifiers decoded (N) indicating respectively the number of specifier bytes and the number of specifiers decoded this cycle. Since these parameters are set to zero, the instruction decoder in effect stalls during the current cycle.

If in step 52 it was determined that bytes 1 to 4 are valid, then they can be decoded. In step 54, the shift count (SC) for the specifier bytes is set equal to four and the number of specifiers decoded (N) is set equal to zero. Then, in step 55 the longword count is decremented to indicate that a longword of extended immediate data has been decoded. In step 56, the longword count is compared to zero to determine whether additional longwords of extended immediate data need to be decoded. If so, decoding is finished for the present cycle. Otherwise, in step 57 the decoding of the extended immediate specifier is finished, and an extended immediate flag (X8F) is cleared. This flag, for example, inhibits the SHIFT OP signal when extended immediate data is being decoded; this is done as a matter of convenience so that the value of the number of specifiers decoded (N) need not be adjusted when the extended immediate mode is first detected.

Returning to step 51, if the decoder is not expecting extended immediate data, then in step 58 the "access type" of the opcode is inspected to determine whether the data in the instruction buffer is to be interpreted as a branch displacement. In step 59 the instruction decoder checks the access type of the next specifier to determine whether it is an "implied" specifier.

Since the instruction decoder has the capability of decoding multiple specifiers, it is very advantageous for it to create operands for implied specifiers, rather than having the execution unit execute microcode sequences to implement the implied specifiers. This is particularly advantageous when the stack pointer is an implied specifier that must be incremented or decremented. In this case, a base register number of E hexadecimal and a specifier mode of seven or eight is asserted on the GP bus to cause the stack pointer to be automatically incremented or decremented by the general purpose unit (32 in FIG. 6). Stack operations (e.g., PUSH) can be implemented using an implied stack pointer operand, and they become similar to a move instruction and can be executed in a single cycle. A complete list of VAX instructions having such stack register implied operands is included in Appendix I. For these instructions, it is preferable for the stack pointer to be asserted on the GP bus rather than have the execution unit cause the incrementing and decrementing of the stack pointer.

In step 60 the instruction decoder determines the maximum number of specifiers, up to three, that should be decoded during the present cycle assuming that valid data is present in the instruction buffer. Once the number of specifiers to request has been determined, in step 61 the instruction decoder determines an initial number of specifiers to decode and a shift count for the present cycle. These initial values are used by an "intra-instruction read conflict" detector which may change the initial values if such a conflict is detected.

An intra-instruction read conflict occurs whenever an instruction includes an autoincrement or an autodecrement specifier which references either directly or indirectly a register specified by a previously occurring specifier for the current instruction. To avoid stalls during the preprocessing of instructions by the instruction unit (12 in FIG. 1), register pointers rather than register data are usually passed to the execution unit because register data is not always available at the time of instruction decoding. This also permits up to three register numbers to be passed simultaneously over twelve data lines rather than ninety-six lines that would be required for passing the contents of the three registers. If an intra-instruction read conflict exists, however, the operand value specified by the conflicting register specifier is the initial value of the register being incremented or decremented, and this initial value will have been changed by the time that the execution unit executes the instruction. Preferably, the proper initial value is obtained prior to the incrementing or decrementing of the conflicting register by putting the instruction decoder into a special IRC mode in which only one specifier is decoded per cycle, and if a specifier being decoded is a register specifier, the content of the specified register is transmitted over the GP bus to the general purpose unit in order to obtain the content of the specified register and transmit it to the execution unit.

As shown in the flowchart of FIG. 11, the intra-instruction read conflict is detected in step 62 taking into consideration the initial number of specifiers that could be decoded during the present cycle. If an intra-instruction read conflict would exist for the initial number of specifiers determined in step 61, then in step 63 the number (N) of specifiers being decoded this cycle and the shift count (SC) are selected under the assumption that only one specifier should be requested. Also, if a register specifier is decoded, the register specifier is transmitted over the GP bus to the general purpose unit (32 in FIG. 6) instead of being transmitted as a register number over the TR bus to the transfer unit (30 in FIG. 6).

If an intra-instruction read conflict is not detected in step 62 or has been resolved in step 63, then in step 64 the instruction decoder determines whether any specifier being decoded has an "extended immediate" mode. If so, then in step 65 the "longword count" used above in steps 55 and 56 is set in accordance with the data type of the extended immediate specifier. If the data type is a quadword, then the first four bytes of the extended immediate data quadword will be decoded during the present cycle, and the last four bytes of quadword data need to be decoded during a subsequent cycle. Therefore, the longword count is set to one to indicate that one additional longword of extended immediate data needs to be decoded. If the data type of the extended immediate specifier is an octaword, then the longword count is set to three to indicate that three additional longwords of extended immediate data need to be decoded during subsequent cycles. Also, in step 65 the "shift op" signal is inhibited. So that the number of specifiers N to decode need not be changed when the extended immediate mode is detected in step 64, the "shift op" signal is inhibited until the last longword of extended immediate data is decoded. Otherwise, the operation code for the present instruction would be shifted out of the instruction buffer if the extended immediate specifier were the last specifier for the current instruction.

Once the number of specifiers to decode and the shift count have been determined, then in step 66 the flags and the specifier information for the GP, SL and TR buses (FIGS. 7 to 9) are determined. Finally, in step 67 the specifier information is placed onto the GP, SL and TR buses. This completes the decoding procedure for the current cycle.

Figure 12:
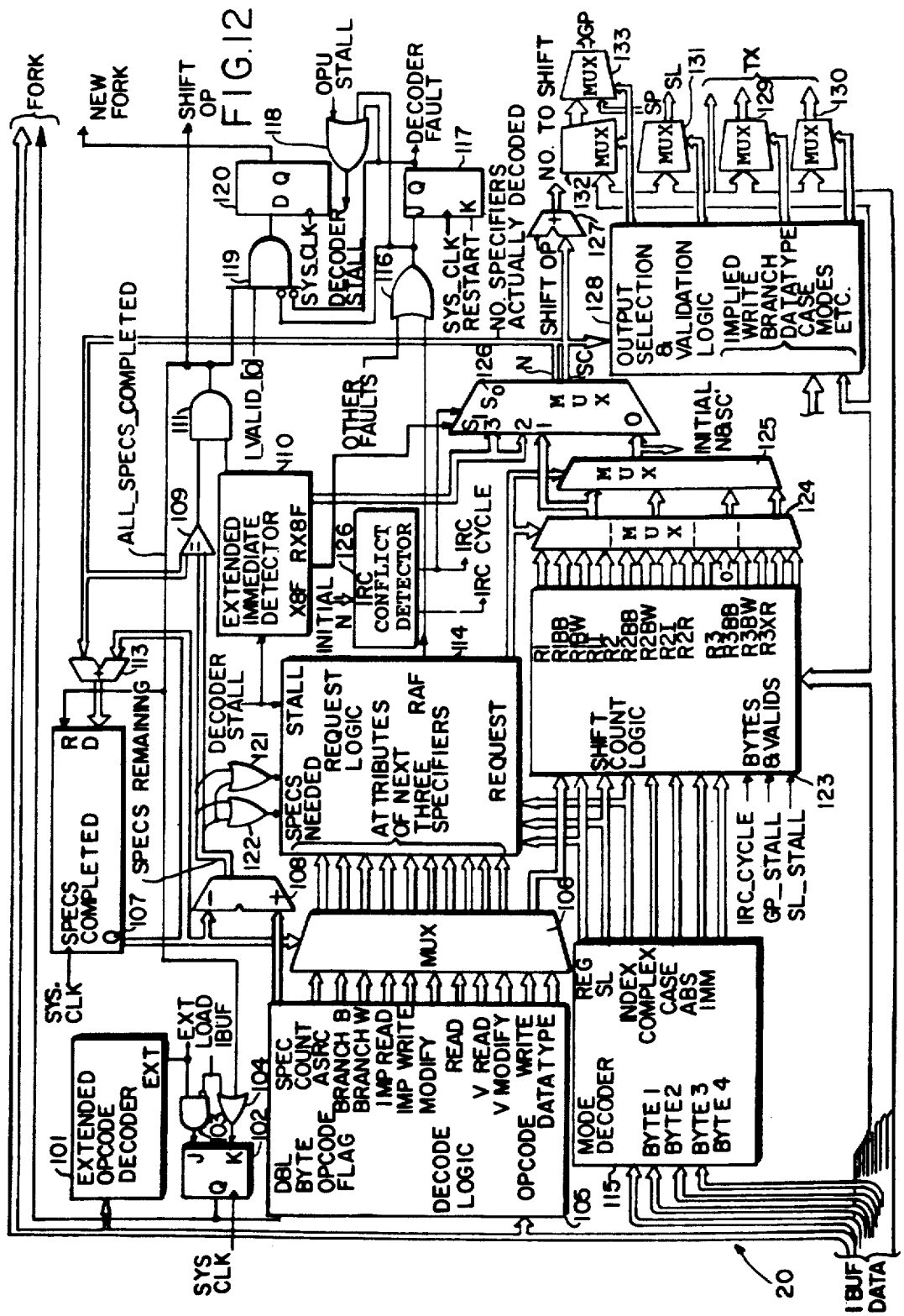
FIG. 12 is a block diagram of the instruction decoder of FIG. 6.

Turning now to FIG. 12, there is shown a block diagram of a preferred embodiment of the instruction decoder 20. In order to detect a double-byte opcode, there is provided an extended opcode decoder 101 which asserts an EXT signal when byte 0 in the instruction buffer has a value of FD hexadecimal. The EXT signal is used to set the double-byte opcode flag which is indicated by a flip-flop 102. Gates 103 and 104 are provided to initially clear the double-byte opcode flag when all of the specifiers for the instruction have been decoded and also when the instruction buffer is initially loaded.

To decode the operation code, combinational logic 105 receives the double-byte opcode flag and the content of byte 0 of the instruction buffer. For each operation code, the decode logic generates a "spec count" indicating the number of specifiers following the operation code, and the access type and data type for each specifier. Since the decoder 20 can decode up to three specifiers, only the access and data type for the next three specifiers to be decoded are pertinent. In order to select the pertinent access and data type information, there is provided a multiplexer 106 receiving the access and data type for each of the six possible specifiers for each operation code and selecting the information for the next three specifiers. The positions to select is controlled by the number of specifiers completed which is indicated by a register 107.

The "spec count" or number of specifiers in the current opcode is sent from the decode logic 105 to a three-bit binary subtractor 108 which subtracts the number of specifiers completed from the spec count to determine the number of specifiers remaining to be decoded. The number of specifiers remaining to be decoded is compared in a comparator 109 to the number N of specifiers actually decoded to determine whether all of the specifiers for the current instruction will be decoded by the end of the current cycle. However, if the last specifier has an extended immediate mode, the comparator 109 will assert an active signal even though the extended immediate specifier has only been partially decoded. The extended immediate mode is detected by an extended immediate detector 110 which generates a signal for inhibiting the "shift op" signal. This inhibiting signal is combined with the output from the comparator 109 in an AND gate 111 to generate a signal which causes the "shift op" signal to be asserted and which also clears the double-byte flag. So that the register 107 will indicate the proper number of specifiers completed at the beginning of the next cycle, it has a data input receiving the output of a three-bit binary adder 113 which receives the data output of the register 107 and combines it with the number of specifiers actually decoded during the current cycle.

In order to determine the number of specifiers to request during the current cycle, the instruction decoder 20 includes request logic 114 which receives from the multiplexer 106 the attributes of the next three specifiers and also receives information from a mode decoder 115 which decodes the modes of the first four bytes following the operation code in the instruction buffer. The mode decoder performs a simple decode of bytes 1 to 4 of the instruction decoder according to the table shown in FIG. 5, and provides respective binary outputs indicating whether each of bytes 1 to 4 could possibly be a register specifier, a short literal specifier, an index register, a complex specifier, a complex specifier having an absolute addressing mode (i.e., the byte has a value of 9F hexadecimal), or a complex specifier having an immediate mode (i.e., the respective byte has a value of 8F hexadecimal). The mode decoder 115 also recognizes the sequence of bytes 1 to 4 as belonging to a particular one of four primary cases. These cases are further shown and described below in connection with FIG. 21.

In addition to determining the number of specifiers which may possibly be decoded during the present cycle, the request logic determines whether the first three bytes in the instruction buffer represent a permissible sequence of specifier modes. If the sequence is impermissible, the request logic generates an addressing fault signal which is combined in an OR gate 116 with other fault signals such as parity error signals in order to stall the instruction decoder. The output of the OR gate is fed to a flip-flop 117 to provide a decoder fault signal which may interrupt the execution of the current program when the fault is recognized by the execution unit. The decoder remains stalled by the flip-flop 117 until the flip-flop is cleared by a RESTART signal. Another OR gate 118 combines the decoder fault signal with the output of the OR gate 116 and any stall signal (OPU_STALL) from the operand unit 21 to provide a signal for stalling the instruction decoder. The output of the OR gate 116 and the decoder fault signal are also used to inhibit an AND gate 119 which determines whether an instruction has been completely decoded. The output of the AND gate 119 is latched in a register 120 to provide a signal indicating the transmission of a new valid fork address to the fork queue (in the queues 23 in FIG. 1) for transmission to the instruction issue unit and microcode execution unit (25 and 28 in FIG. 1).

The request logic 114 generates the addressing fault signal, for example, when it detects a byte having an index mode which is immediately followed in the instruction buffer by a byte having a register mode, a short literal mode or an index mode. In other words, an addressing fault is generated whenever a byte having an index mode is not followed by a complex specifier. An addressing fault also occurs when a specifier to be decoded has a "write" access type but the specifier also has a short literal mode.

The request logic encodes information about the architecture of the instructions being decoded in order to select predetermined decoding cases that depend in a complex way upon the attributes of the next three specifiers and the possible modes of bytes 1 to 3 in the instruction decoder. The request logic 114 also limits the number of specifiers requested to the number of specifiers needed when the number of specifiers remaining is less than three, and further selects zero specifiers when there is a decoder stall. The number of specifiers needed is obtained from the number of specifiers remaining by two OR gates 121, 122. The request logic also requests zero specifiers whenever there is an addressing fault.

Shown in Appendix II is a truth table of the request logic for decoding VAX instructions. The table includes the following rows: N (the number of specifiers needed); SP3, SP2, SP1 (the access types of the next three specifiers for the instruction as defined on page 371 of Levy & Eckhouse, Jr., cited above, and further including implied read and implied write specifiers); R4, S4, I4, R3, S3, I3, R2, S2, I2, R1, S1, I1 (designating whether the respective bytes 1 to 4 in the instruction buffer have a register, short literal or index mode); REQ. (the case to request); and RAF (indicating an addressing fault).

The initial number of specifiers to decode (N') and the initial number of specifier bytes to decode (SC') are determined by shift count logic 123 which receives the mode information, an IRC_CYCLE signal, the GP and SL stall signals, the bytes and valid flags from the instruction buffer, and the data types of the next three specifiers. The shift count logic consists of a number of logic trees for the various cases. These cases include cases for requesting one, two or three specifiers for a branch byte (R1BB, R2BB, R3BB) or a branch word instruction (R1BW, R2BW, R3BW). The shift count logic further includes a case for requesting one specifier of an instruction having an implied specifier (R11), and requesting two specifiers for an instruction having an implied specifier (R21). The shift count logic further includes five cases for requesting from one to three specifiers which are not branch displacements or implied specifiers. These cases include a single case (R1) for requesting one specifier, two cases (R2, R2R) for requesting two specifiers, and two cases (R3, R3XR) for requesting three specifiers.

The R2R tree is requested only when the first byte is neither a register specifier nor a short literal, and the second specifier should not be a short literal. This special case is provided to permit the request logic to generate an addressing fault signal (RAF) during the next cycle when the short literal appears in the first byte. In other words, the request logic selects the R2R tree when two specifiers are needed and the second specifier has a write or modify access type. This simplifies the request logic since it permits the request logic which generates the addressing fault signal to only look at the mode of the first byte. In a similar fashion, the R3XR tree will decode three specifiers only when the last specifier is a register. When three specifiers are needed, the request logic requests the R3 tree only when the first two bytes are register or short literal specifiers, and otherwise selects the R3XR tree.

Each of these logic trees generates an initial number of specifiers decoded (N') and a shift count of the specifier bytes decoded (SC'). The request logic 114 operates multiplexers 124 and 125 to select N' and SC' from the requested logic tree. N' is used by an intra-instruction read conflict detector 126 to determine whether such an intra-instruction read conflict would occur. If so, a signal IRC is asserted. The IRC signal and an X8F signal operate a third multiplexer 126' to select the N and SC indicating the number of specifiers and specifier bytes actually decoded. The extended immediate signal X8F has priority, in which case N is zero and SC is either zero or four in order to decode four bytes of extended immediate data. The IRC signal has second priority, in which case N and SC will be selected from the logic trees for decoding at most one specifier. In other words, when an intra-instruction read conflict is detected, only one specifier is decoded for each cycle of the system clock. If the tree initially selected requests three specifiers for a byte branch instruction, for example, then when an intra-instruction read conflict is detected, the R1 tree is selected, then the R1 tree is again selected, and finally the R1BB tree is selected, instead of the R3BB tree.

The actual number of bytes to be shifted by the shifter (21 in FIG. 6) is obtained by selectively adding one to the specifier byte shift count SC in an adder 127.

The final steps in the decoding procedure are performed by output selection and validation logic 128 which determines the locations in the instruction buffer of the data for the specifiers being decoded in the current cycle. For the TR bus, the information for the first source operand is obtained from byte 1 of the instruction buffer. A multiplexer 129 obtains information for a second source specifier from the instruction buffer, and similarly a multiplexer 130 obtains information for any destination specifier. In a similar fashion, a multiplexer 131 obtains any short literal data from the instruction buffer. Information about a general purpose specifier is obtained by a shifter 132 from successive bytes in the instruction buffer. In order to pre-process implied specifiers, a final multiplexer 133 selects the stack pointer (SP) as the base register and in addition selects either a mode of eight or a mode of nine for an implied read or an implied write, respectively.

Figure 13:
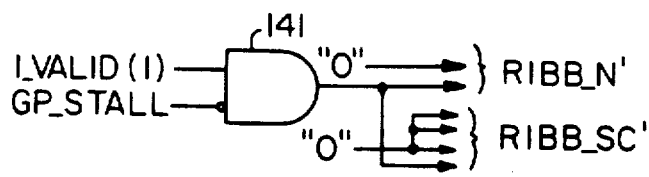
FIG. 13 is a schematic diagram of shift count logic that is used to determine the number of specifiers and the number of bytes decoded when a maximum of one operand should be decoded for a branch instruction having a byte displacement.

Turning now to FIG. 13, there is shown a schematic diagram of the shift count logic for the R1BB tree. This logic tree is selected, for example, to decode the byte displacement of a branch instruction (such as the BRB instruction in the VAX architecture). A gate 141 asserts that N' and SC' are both equal to one when byte 1 in the instruction decoder is valid, and otherwise both N' and SC' are zero. Byte 1 in the instruction buffer is valid when its valid data flag (I_VALID[1]) is set and the general purpose unit (32 in FIG. 6) is not stalled.

Figure 14:
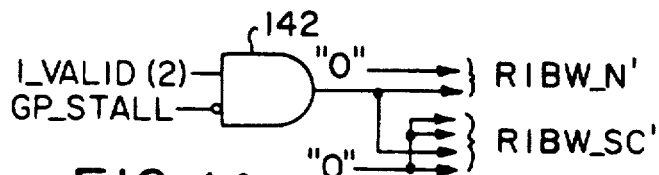
FIG. 14 is a schematic diagram of shift count logic that is used when at most one specifier should be decoded for a branch instruction having a word displacement.

Turning now to FIG. 14, there is shown a schematic diagram of the R1BW logic tree. This logic tree is selected to decode the word displacement of a branch instruction (such as the BRW instruction in the VAX architecture). N' is one and SC' is two if byte 2 in the instruction buffer is valid, and otherwise both N' and SC' are zero. The validity of byte 2 in the instruction buffer is determined by a gate 142 in accordance with the valid data flag (I_VALID[2]) and the GP_STALL signal.

Figure 15:
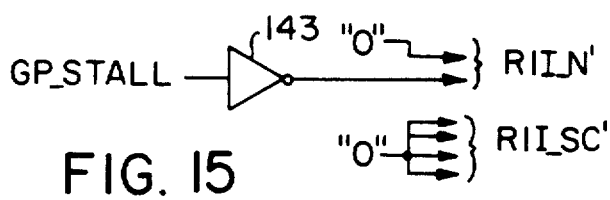
FIG. 15 is a schematic diagram of shift count logic that is used when at most one specifier should be decoded, and that specifier is to be implied from the access type of the instruction and pre-processed.

Turning now to FIG. 15, there is shown a schematic diagram of the shift count logic for the R1I tree for decoding one implied specifier. This tree is selected, for example, when decoding a return from subroutine instruction. The shift count is zero because there are no explicit specifiers in the instruction buffer to decode. The number of specifiers decoded N' is zero if the general purpose unit is stalled, and otherwise N' is one. Therefore, the R1I logic tree includes a single inverter 143 which inverts the GP_STALL signal.

Figure 16:
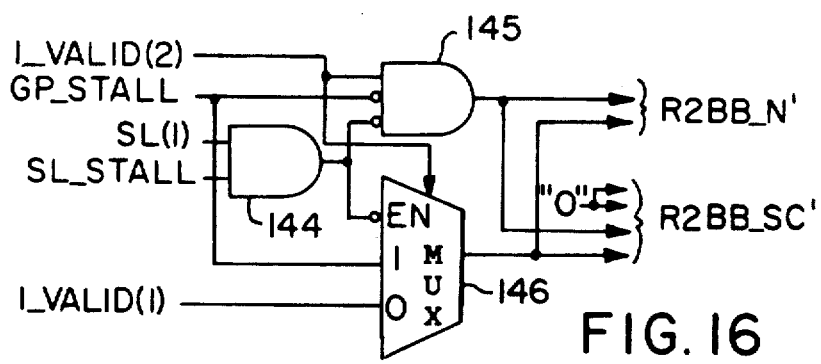
FIG. 16 is a schematic diagram of shift count logic that is used when at most two specifiers should be decoded for a branch instruction having a byte displacement.

Turning now to FIG. 16, there is shown a schematic diagram of the R2BB logic tree which is selected when a second specifier to decode is a byte displacement for a branch instruction. When this logic tree is selected, byte 1 must be a register or short literal, and byte 2 is the displacement. Neither of these bytes can be decoded if byte 1 is a short literal and there is a short literal stall. Otherwise, both of the bytes can be decoded if byte 2 is valid and there is no stall. If only the general purpose unit is stalled and the first byte is valid, then only the first byte can be decoded. These decisions are made by two gates 144 and 145, and a multiplexer 146.

Figure 17:
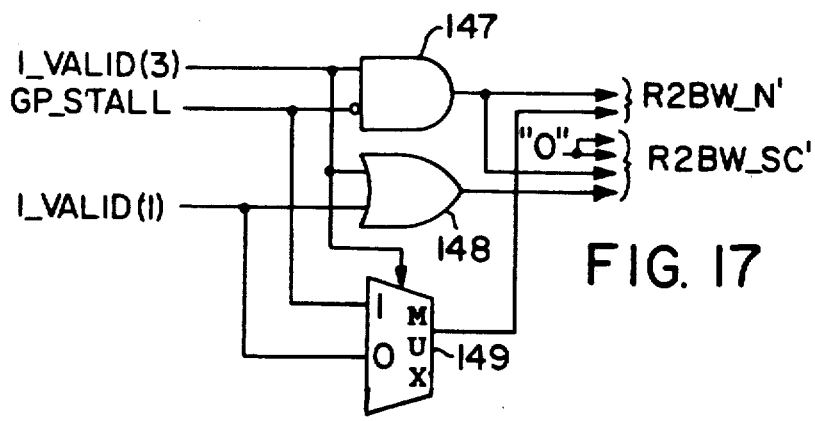
FIG. 17 is a schematic diagram of shift count logic that is used when at most two operands should be decoded for a branch instruction having a word displacement.

Turning now to FIG. 17, there is shown a schematic diagram of the R2BW logic tree which is used for decoding two specifiers, the first of which must be a register specifier and the second of which is a word displacement. All three of the bytes are decoded if the third byte is valid and the general purpose unit is not stalled, as detected by a gate 147. Otherwise, the register specifier can be decoded if it is valid. An OR gate 148 and a multiplexer 149 are provided to give the correct values of N' and SC' in these instances.

Figure 18:
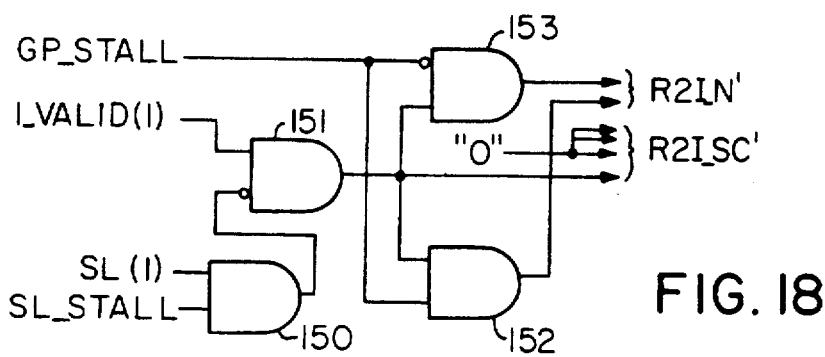
FIG. 18 is a diagram of shift count logic that is used for decoding at most two specifiers, and the second specifier is to be implied from the access type of the instruction and pre-processed.

Turning now to FIG. 18, there is shown a schematic diagram of the R2I logic tree. This tree is selected when the first byte is a register or short literal specifier, and a second specifier is to be implied. N' and SC' are both zero if the first byte cannot be decoded, as detected by gates 150 and 151. Otherwise, SC' is one and N' is at least one. N' is two when the implied specifier can be sent to the general purpose unit; in other words, when the GP_STALL signal is not asserted. The correct value of N in these instances is determined by gates 152 and 153.

Figure 19:
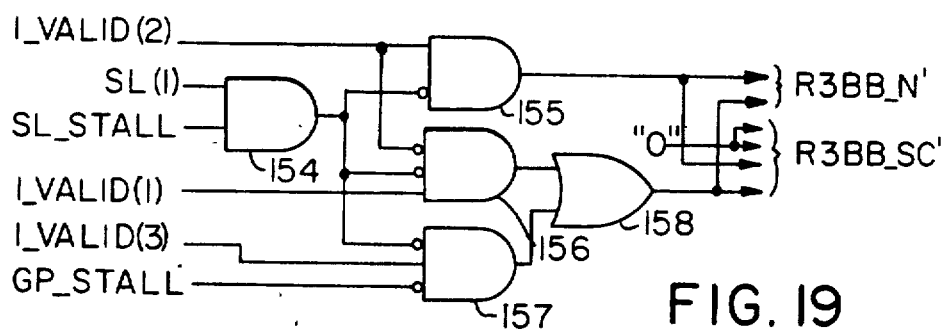
FIG. 19 is a schematic diagram of shift count logic that is used for simultaneously decoding at most three specifiers for a branch instruction having a byte displacement.

Turning now to FIG. 19, there is shown a schematic diagram of the R3BB logic tree which is used when byte 1 is a register or short literal specifier, byte 2 is a register specifier, and byte 3 is a byte displacement. Since all of the specifiers are one byte in length, N' is equal to SC'. N' is equal to three only if the third byte is valid and the general purpose unit is not stalled. Otherwise, N' equals two if the second byte is valid and it is not true that byte 1 is a short literal and the expansion unit (31 in FIG. 6) is stalled. The values of N' and SC' in these instances are determined by gates 154, 155, 156, 157 and 158.

Figure 20:
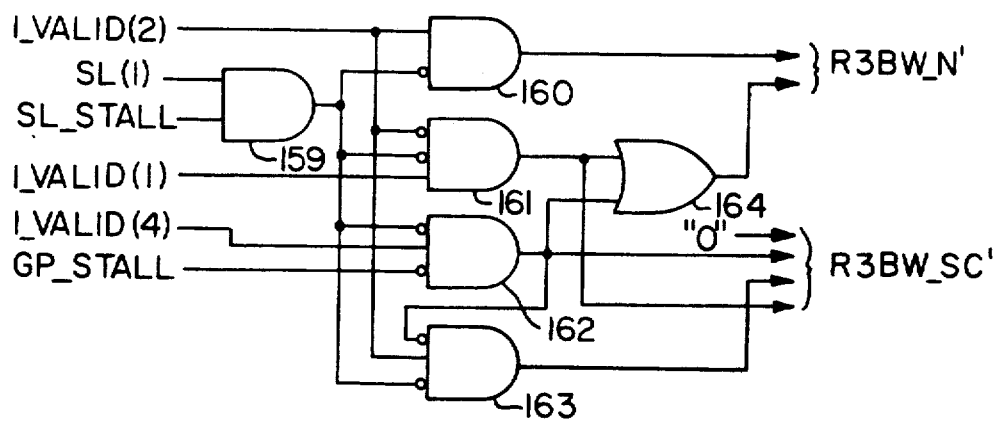
FIG. 20 is a schematic diagram of shift count logic that is used for simultaneously decoding at most three specifiers for a branch instruction having a word displacement.

Turning now to FIG. 20, there is shown a schematic diagram of the R3BW logic tree which is used when byte 1 is a register or short literal, byte 2 is a register, and bytes 3 and 4 are a word displacement. Under these circumstances, N' and SC' are zero if and only if byte 1 is a short literal and the expansion unit is stalled, or if byte 1 is invalid. (Recall that if byte 1 is invalid, so is byte 2 and byte 4.) N' equals three and SC' equals four if bytes 1, 2 and 4 are all valid and there are no stalls.

Otherwise, N' equals two and SC' equals two if byte 4 is invalid or if the general purpose unit is stalled; N' and SC' are both equal to one if byte 2 is valid. The values of N' and SC' in these instances is determined by gates 159, 160, 161, 162, 163 and 164.

Figure 21:
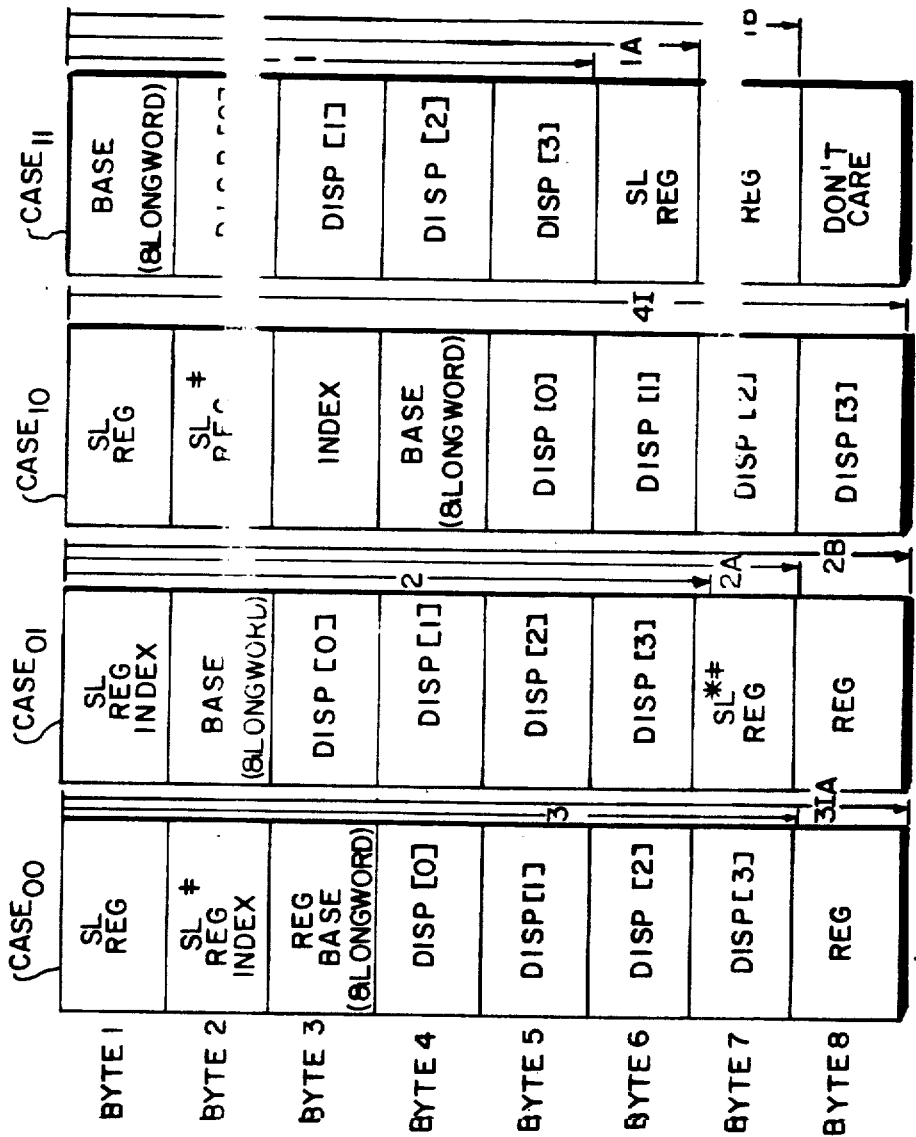
FIG. 21 is a diagram depicting four primary sequences or cases in which specifiers are ordered or arranged in the instruction buffer during simultaneous decoding of up to three specifiers disposed at various levels in the primary sequences.

The request logic (114 in FIG. 12) and the extended immediate detector (110 in FIG. 12) dispose of the cases where branch displacements or extended immediate data occur in the instruction buffer. Aside from these cases, it has been found that legal sequences of three specifiers in the instruction buffer beginning in byte 1, where at most one of the specifiers is a complex specifier, will fall into one of four primary cases as shown in FIG. 21. For the purpose of illustration, complex specifiers having a longword displacement are shown.

The four primary cases are identified by binary subscripts which indicate the binary values of a CASE selection signal generated by the mode decoder (115 in FIG. 12). In $CASE_{11}$ the complex specifier base register begins in byte 1, in $CASE_{01}$ the complex specifier base register begins in byte 2, in $CASE_{00}$ the complex specifier base register begins in byte 3, and in $CASE_{10}$ the complex specifier base register begins in byte 4. It is possible, however, that all three specifiers are register specifiers, or one specifier is a short literal and the other is a register specifier, which fall into $CASE_{00}$. It should be noted that in any case, three specifiers cannot be simultaneously decoded when the third specifier is a short literal. Whenever three specifiers are simultaneously decoded, the third specifier is a destination specifier. Also, at most one short literal and at most one complex specifier can be decoded per cycle, due to the fact that any short literal specifier must be processed by the expansion unit and any complex specifier must be processed by the general purpose unit, and each of these units can process only one such specifier per cycle.

The four primary cases shown in FIG. 21 can be distinguished based upon whether bytes 1, 2 and 3 have short literal, register or index modes. This is illustrated by the truth table in FIG. 22. In $CASE_{00}$, byte 1 has a short literal or register mode, byte 2 has a short literal, register or index mode, and byte 3 does not have an index mode. In $CASE_{01}$, byte 1 has a short literal, register or index mode, byte 2 has neither a short literal, register nor index mode, and byte 3 can have any mode. In $CASE_{10}$, byte 1 has a short literal or register mode, byte 2 has a short literal or register mode, and byte 3 has an index mode. In $CASE_{11}$, byte 1 has neither a short literal, register nor index mode, and bytes 2 and 3 can have any modes.

Figures 22, 23:
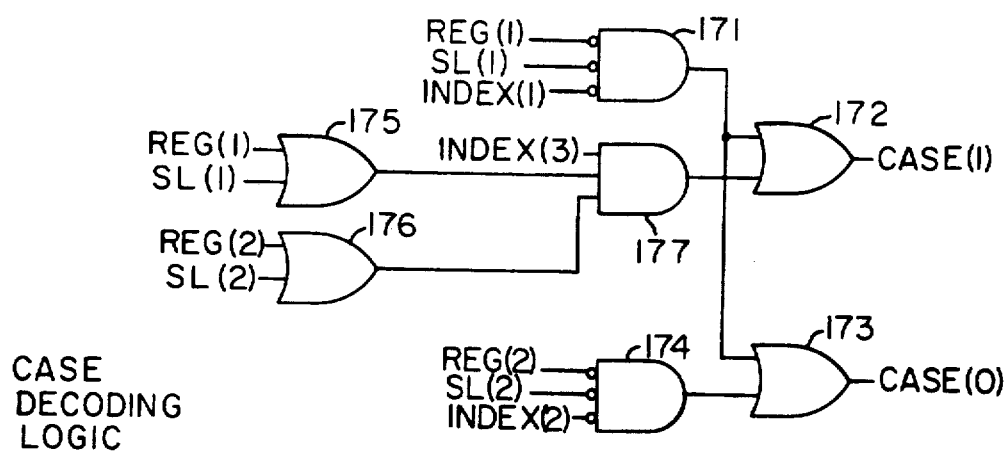
FIG. 22 is a truth table defining the four primary cases.
FIG. 23 is a schematic diagram of combinational logic that has been optimized to detect the four primary cases shown in FIG. 21.

Turning now to FIG. 23, there is shown a schematic diagram of optimized logic for decoding the four cases A three-input NOR gate 171 determines whether byte 1 has neither a short literal, register nor index mode. If so, then OR gates 172 and 173 indicate $CASE_{11}$. Otherwise, CASE[0] is asserted only when byte 2 has neither a short literal, register nor index mode, as detected by a three-input NOR gate 174. Also, CASE[1] is asserted only when byte 1 has a register or a short literal mode as detected by an OR gate 175, byte 2 also has either a register or a short literal mode as detected by an OR gate 176, and byte 3 has an index mode as detected by a three-input AND gate 177.

In order to decode a register or short literal specifier following a complex specifier, it is necessary to decode to variable length levels in the instruction buffer. These levels are identified in FIG. 21 so that signals which appear later in the decoding logic can be identified with the particular levels to which the signals relate. Level 1 refers to the decoding of a complex specifier which begins with a base register in byte 1. The level of a short literal or register specifier immediately following a complex specifier is identified by the suffix A following the level of the complex specifier. Sometimes it is possible to decode two specifiers following a complex specifier when the last specifier is a register specifier. The level of the last is identified by the suffix B following the level of the complex specifier. As shown in FIG. 21, for example, in $CASE_{11}$ a short literal or register specifier could be decoded at level 1A which could occur at any of bytes 2 to 6 depending upon the length of the complex specifier having a base register identified in byte 1. Similarly, a register specifier could possibly be decoded at level 1B which could occur at byte 3 to 7 depending upon the length of the complex specifier.

In $CASE_{01}$, the complex specifier is decoded to level 2. The length of the complex specifier is determined by the mode of the specifier, and if the specifier has an immediate mode, it is also dependent upon the data type associated with the position of the complex specifier in the sequence of specifiers for the instruction being decoded.

A particularly troublesome problem with decoding specifiers following a complex specifier having an immediate mode is that the position of the complex specifier in the sequence of specifiers for the instruction is dependent upon whether an index register is specified in the byte prior to the byte specifying the base register. For $CASE_{01}$, for example, if byte 1 does not have an index mode, then the data type for the complex specifier beginning in byte 2 is the second data type selected by the shifter 106, but if the first byte has an index mode, then the data type for the complex specifier having the base register identified in byte 2 will be the first data type selected by the shifter. Therefore, the length of the complex specifier in $CASE_{01}$, as well as $CASE_{00}$, will be dependent upon whether there is an index designation preceding the base designation. Therefore, the decoding logic must sometimes distinguish whether an index designation precedes the base designation in order to decode to levels 2, 2A or 2B.

When an index register precedes the base, these levels will be identified as 2I, 2IA and 2IB. When a complex specifier does not have an absolute or immediate mode, the information about the specifiers at the 2I, 2IA and 2IB levels will be the same as the information for the specifiers at the 2, 2A and 2B levels.

In $CASE_{00}$, byte 3 may include a register specifier which will be the third specifier in the sequence or could be the base designation for a complex specifier which is also the third specifier if byte 2 does not have an index mode, or is the second specifier if byte 2 does have an index mode. Therefore, byte 3 could be a register specifier when decoding to level 3, but cannot be a register specifier when decoding to level 3I. Also, a register specifier at the 3IA level could be decoded following the complex specifier having its base specified in byte 3.

In $CASE_{10}$, byte 3 always has an index mode so that decoding to level 4I must occur to decode the complex specifier which has the third data type selected by the shifter 106 in FIG. 12.

In summary, the position of each complex specifier for the four primary cases is identified by a number indicating the byte position of its base register designation in the instruction buffer. This number is followed by the suffix I if the complex specifier has associated with it an index register designation. If a short literal or register specifier can possibly be simultaneously decoded immediately following the complex specifier, its position is identified by the level of the preceding complex specifier and the suffix A. If another specifier can possibly be decoded after a complex specifier, its position is identified by the level of the preceding base specifier and the suffix B.

Turning now to FIG. 24, there is a truth table which shows how the number of specifiers initially being decoded (N') is determined for the four primary cases and the various levels of decoding depicted in FIG. 21. $CASE_{00}$ and $CASE_{01}$ are further subdivided into two sub-cases in which an index register is or is not designated for the complex specifier. In order to decode to any particular level for which the number of specifiers is greater than one, it must not be possible to decode to any deeper level that is permitted in the table. In other words, in addition to determining the primary case and taking into consideration whether there is an index register in the subcases, the logic in the instruction decoder decodes as many specifiers as possible (depending for example on the validity of the data in the instruction buffer) up to the requested number, which corresponds to the deepest permitted level in FIG. 24 for the applicable case and subcase. Also, it is apparent that a byte specifying an index register is decoded only if it is possible to further decode the complex specifier following it.

Figure 25:
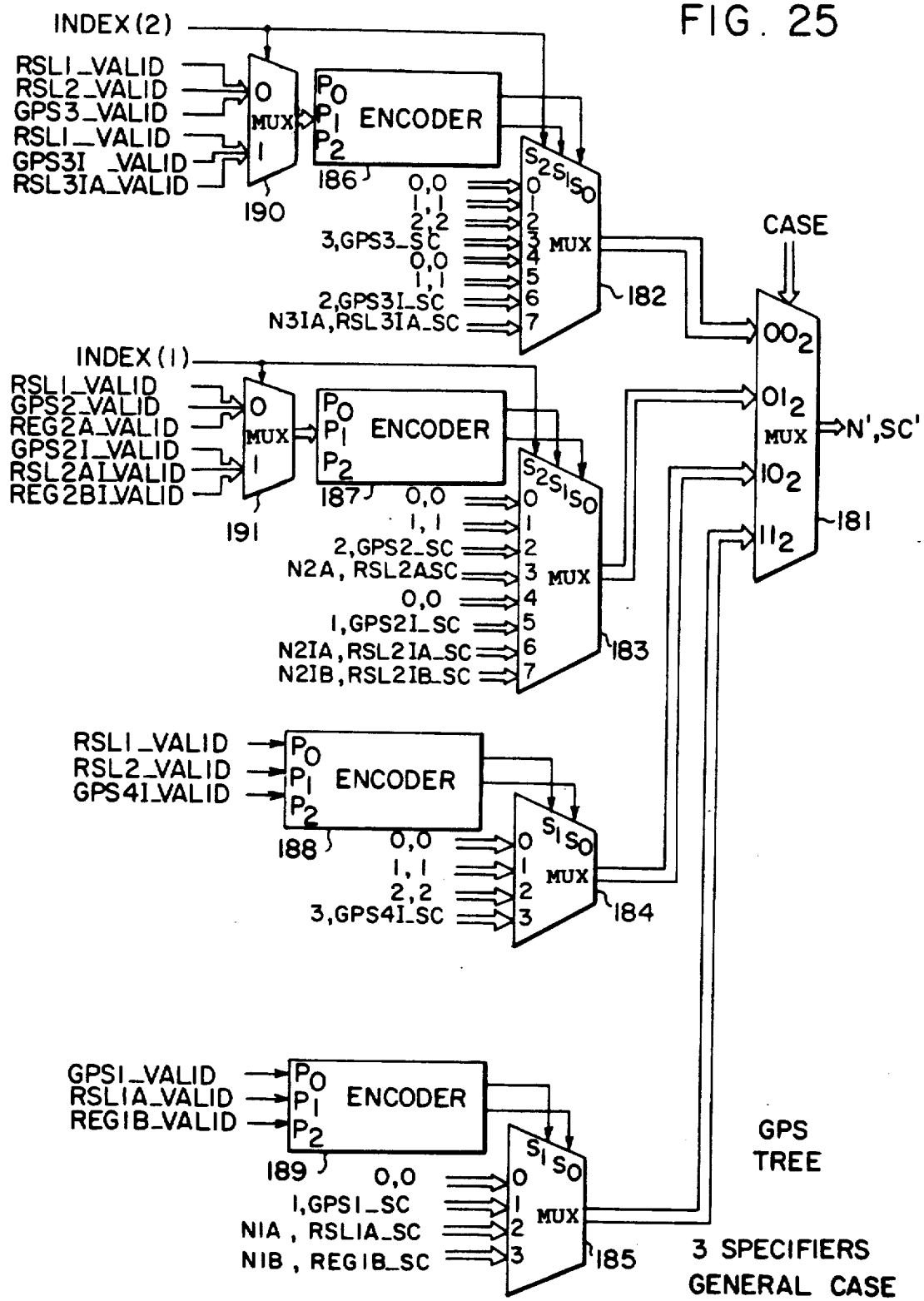
FIG. 25 is a schematic diagram of shift count logic capable of determining the actual number of specifiers and the number of bytes in the instruction decoder that should be simultaneously decoded in a single decoding cycle.

Turning now to FIG. 25, there is shown a schematic diagram of a logic tree for determining the initial N' and SC' for the general case of three specifiers in the absence of implied specifiers and branch displacements in the instruction buffer. The CASE is used to control the select inputs of a multiplexer 181. In addition, for each case there is provided a respective multiplexer 182, 183, 184, 185, which has inputs receiving the value of N' and SC' corresponding to each of the levels permitted for decoding as shown in FIG. 24. The multiplexers 182 to 185 also have a zero input for the case of N' equals zero and SC' equals zero.

For $CASE_{00}$ and $CASE_{01}$, the respective multiplexers 182 and 183 have eight inputs and a most significant select input S2 controlled by INDEX[2] and INDEX[1], respectively, which indicate whether byte 2 and byte 1 in the instruction buffer have an index mode. Therefore, the multiplexers 182 to 185 in combination with the multiplexer 181 decode a total of six different cases and four possible combinations for each case. If the complex specifiers do not have an immediate mode, then the four combinations correspond to either zero, one, two or three specifiers being decoded. In general, however, the number of specifiers being decoded at levels after a complex specifier depends upon whether the complex specifier has an extended immediate mode. This is done to simplify encoding logic which operates the select inputs S0 and S1 of the multiplexers 182 to 185.

If a complex specifier is found to have an extended immediate mode, the encoding logic still believes that it is possible to decode to the levels after the complex specifier, but the number of specifiers to decode N' is set equal to the specifier position of the complex specifier. Similarly, the shift count SC' for the levels after the complex specifier will be set to the value of the shift count for the complex specifier. Therefore, even though the encoding logic selects the level after the complex specifier for decoding, the values of N' and SC' for those deeper levels will be the same as if decoding were not permitted after the complex specifier having the extended immediate mode. Of course, if the complex specifier has an extended immediate mode, the data at the deeper levels represents extended immediate data and cannot be decoded as a register or short literal specifier even though the mode decoder (115 in FIG. 12) may believe that the extended immediate data are short literal or register specifiers. As noted above, extended immediate data, as well as branch displacements, may look like short literal or register specifiers since branch displacements and extended immediate data are not restricted in the values they may assume.

In FIG. 25, the shift counts for the various cases and combinations are prefixed with GPS to designate information about any specifier appearing at the indicated level, RSL to identify information about any register or short literal specifier appearing at the indicated level, and REG to indicate information about any register specifier occurring at the indicated level.

In order to determine the level to which decoding is permitted, pertinent validity data are fed to a respective encoder 186, 187, 188 and 189, which controls the select inputs S1 and S0 of the respective multiplexer. For $CASE_{00}$ and $CASE_{01}$, respective multiplexer 190 and multiplexer 191 controlled by the respective index mode signal INDEX[2] or INDEX[1], selects three respective valid signals for the sub-cases shown in the table of FIG. 24.

Turning now to FIG. 26, there is shown a schematic diagram for the encoder 186. If the inputs P0, P1 and P2 are all active, then both of the select outputs S1 and S0 are active. A three-input AND gate 192 detects the coincidence of all three inputs and OR gates 193 and 194 become active to assert the select signals. If inputs P0 and P1 are both asserted but P2 is inactive, then a two-input AND gate 195 activates only the OR gate 194 so that only the output S1 is asserted. If P0 is asserted but P1 is not, then a gate 196 activates the OR gate 193 and the OR gate 194 is inactive, so that only the output S0 is asserted. If all three inputs P0, P1 and P2 are inactive, then neither of the outputs S1 and S0 are asserted.

In order to eliminate the delay through the encoders 186 to 189 and the multiplexers 190 and 191, the encoding logic should be incorporated into the multiplexers 182 to 185. This is shown in FIG. 27 for $CASE_{00}$. The prioritizing multiplexer 182' corresponding to multiplexer 182 in FIG. 25 includes six gates 197, 198, 199, 200, 201 and 202, and the outputs of these gates are summed by an OR gate 203. It should be noted that each gate in FIG. 27 corresponds to a gate for each bit of each of the output signals N' and SC', and in many cases the gates are eliminated because they have binary inputs which are the binary constants zero or one.

For implementing the logic of FIG. 25, it is also necessary to provide logic which determines the specifier information such as the valid signals, numbers and shift counts defined in FIG. 25 for the various decoding levels. The specifier information for a complex specifier or a specifier decoded at a level after a complex specifier will be dependent upon whether the complex specifier has an absolute or immediate addressing mode. For the sake of defining the specifier information, the absolute and immediate modes will be treated as a special case which will be indicated by an apostrophe after the symbolic notation for the specifier information. Shown in FIG. 28, for example, are the number specifiers decoded in the usual case, i.e., where the respective complex specifier does not have an absolute or immediate addressing mode. In this case, the number of specifiers has a value of two at level 1A and level 2IA, and a value of three at levels 1B, 2A, 2IB and 3IA.

Turning now to FIGS. 29 to 38, there are shown truth tables defining the shift counts and the number of specifiers for the other levels and combinations. FIGS. 29 to 32 provide the information for the usual case when the respective complex specifier has neither an immediate nor absolute mode, and FIGS. 33 to 38 are truth tables for the cases when the respective complex specifier has an immediate or absolute mode. As is well known, logic for implementing the truth tables may consist of two levels of gates, such as a first level performing an AND function and a second level performing an OR function.

Figure 39:
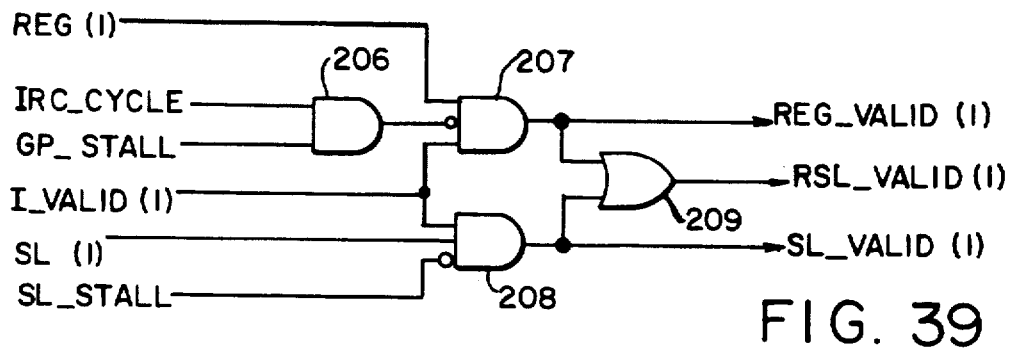
FIGS. 39, 40 and 41 are schematic diagrams of logic for determining register specifier and short literal information for bytes 1 to 8 in the instruction buffer.
Figure 40:
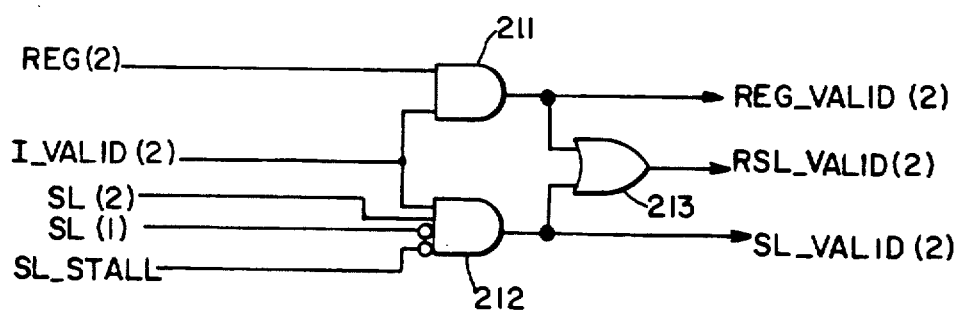
Figure 41:
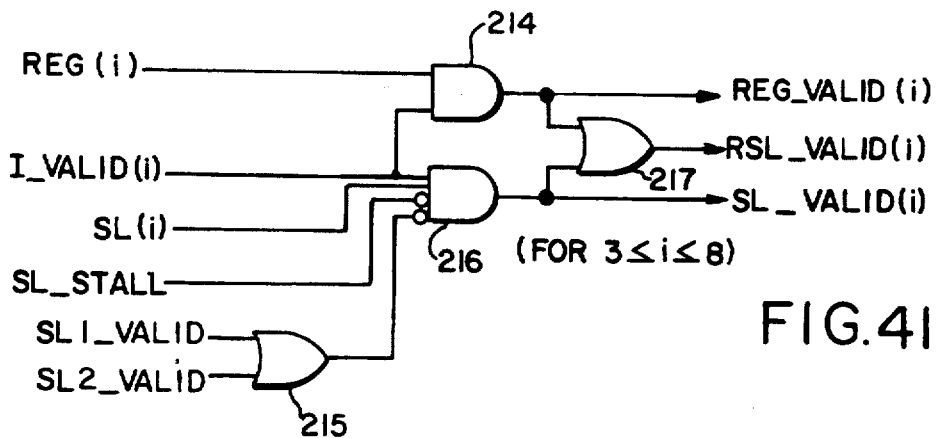
Figure 42:
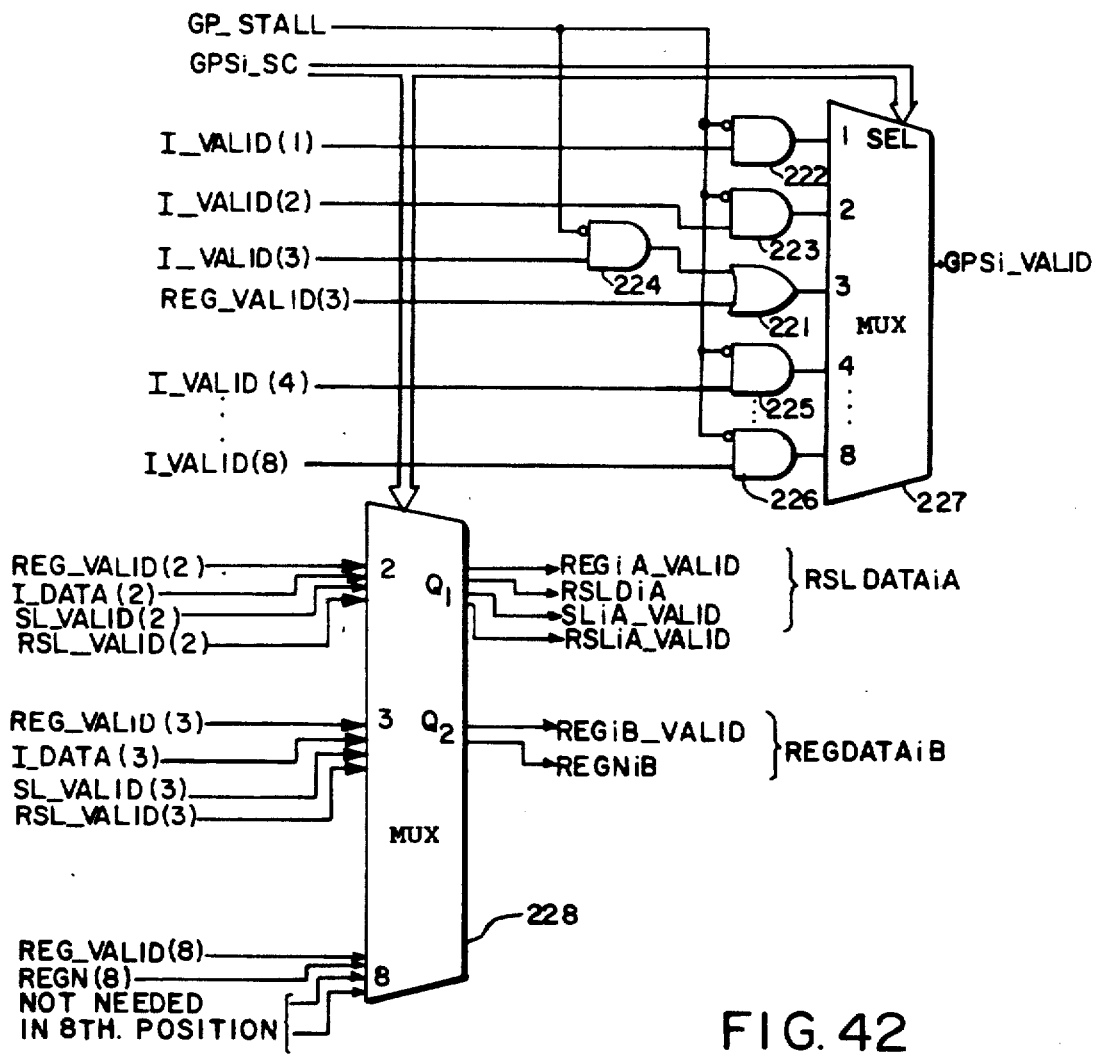
FIG. 42 is a schematic diagram of logic for determining information about specifiers decoded at various levels.

Turning now to FIGS. 39 to 41, there is shown logic for determining valid signals which are used in the logic of FIG. 42 to provide the valid signals to the priority logic of FIG. 25. The signal REG_VALID[i] indicates whether the ith byte of data in the instruction buffer represents a valid register specifier. The signal SL_VALID[i] indicates whether the ith byte of data in the instruction buffer may represent a valid short literal specifier for which decoding is not prohibited by a stall of the expansion unit (30 in FIG. 6). The signal RSL_VALID[i] represents whether the ith byte of data in the instruction buffer can represent a valid register, or a short literal specifier for which decoding is not prohibited by a stall of the expansion unit. The case of i equals one is treated as a special case and the signals are determined with the logic of FIG. 39. The first data byte in the instruction register can be decoded when it has a register mode, when it is a valid byte of data, and so long as the decoder is not operating during a intra-instruction read conflict cycle when the general purpose unit is stalled. As noted above, when an intra-instruction read conflict is detected, a register specifier is processed by the general purpose unit (32 in FIG. 6) instead of the transfer unit (30 in FIG. 6). These logical conditions are determined by gates 206 and 207. If the first byte has a short literal mode, then it is considered valid if its corresponding valid data flag (I_VALID[1]) is active and the expansion unit is not stalled. These conditions are detected by a gate 208. An OR gate 209 provides a signal (RSLI_VALID) indicating whether the first byte is considered either a valid register specifier or a valid short literal specifier.

FIG. 40 shows a schematic diagram of a circuit for determining whether byte 2 in the instruction buffer is considered a valid register or short literal specifier. It is considered a valid register specifier when byte 2 has a register mode and the valid data flag for byte 2 is set. This is detected by a gate 211. Byte 2 in the instruction buffer is considered a valid short literal specifier if its valid data flag is set, it has a short literal mode, byte 1 does not have a short literal mode, and the expansion unit is not stalled. These conditions are detected by a gate 212. An OR gate 213 determines whether byte 2 in the instruction buffer is either a valid register specifier or a valid short literal specifier.

FIG. 41 shows a schematic diagram of logic circuitry for determining whether bytes 3 to 8 in the instruction buffer could possibly be considered valid register or short literal specifiers. (These signals are further qualified by the circuitry in FIG. 42 before being used in the logic tree of FIG. 25.) Byte i in the instruction buffer is possibly a valid register specifier if it has a register mode and the valid data flag corresponding to the byte is set. This is detected by a gate 214. Byte i in the instruction buffer can possibly be a valid short literal specifier so long as the corresponding valid data flag is set, it has a short literal mode, the expansion unit is not stalled, and neither byte I nor byte 2 is a valid short literal specifier. In other words, byte i in the instruction buffer cannot be considered a valid short literal specifier if it is not possible to decode byte i in the current cycle. These conditions are detected by gates 215 and 216. An OR gate 217 determines whether byte i in the instruction buffer can be considered either a valid register specifier or a valid short literal specifier.

Turning now to FIG. 42, there is shown a schematic diagram of a circuit which determines whether a complex specifier is considered valid and also determines whether bytes following a complex specifier can be considered valid register or short literal specifiers. In general, a complex specifier is considered valid if the general purpose unit is not stalled and the last byte of the complex specifier has its corresponding valid data flag set. An exception to this is that the signal for indicating a valid complex specifier at level 3 will also indicate whether byte 3 is a valid register specifier. This is done to decode CASE$_{00}$ when byte 3 is a register specifier. The special case is accounted for by an OR gate 221. Otherwise, the coincidence of the corresponding valid data flag being set and the absence of the general purpose unit being stalled is detected by respective gates 222, 223, 224, 225, etc., 226. In order to determine the validation condition for the last byte in the complex specifier, the shift count (GPSi_SC) for the complex specifier is fed to the select input of a multiplexer 227 which selects the respective one of the gates 222, 223, 221, 225, ..., 226.

In a similar fashion, the shift count for the complex specifier is fed to the select input of a multiplexer 228 functioning as a shifter to select the register validation or short literal validation signal from FIG. 41 corresponding to the byte position following the complex specifier, and also the register validation signal corresponding to the second byte following the complex specifier. The multiplexer 228 also selects the short literal data and register addresses contained in these bytes following the complex specifier to provide data about the register or short literal specifiers which are ultimately fed to the TR and XL buses by the circuits shown in FIGS. 54, 56 and 58, as further described below. The format for the register and short literal data is shown in FIG. 53, and the format of the register addresses is shown in FIG. 55.

Figure 43:
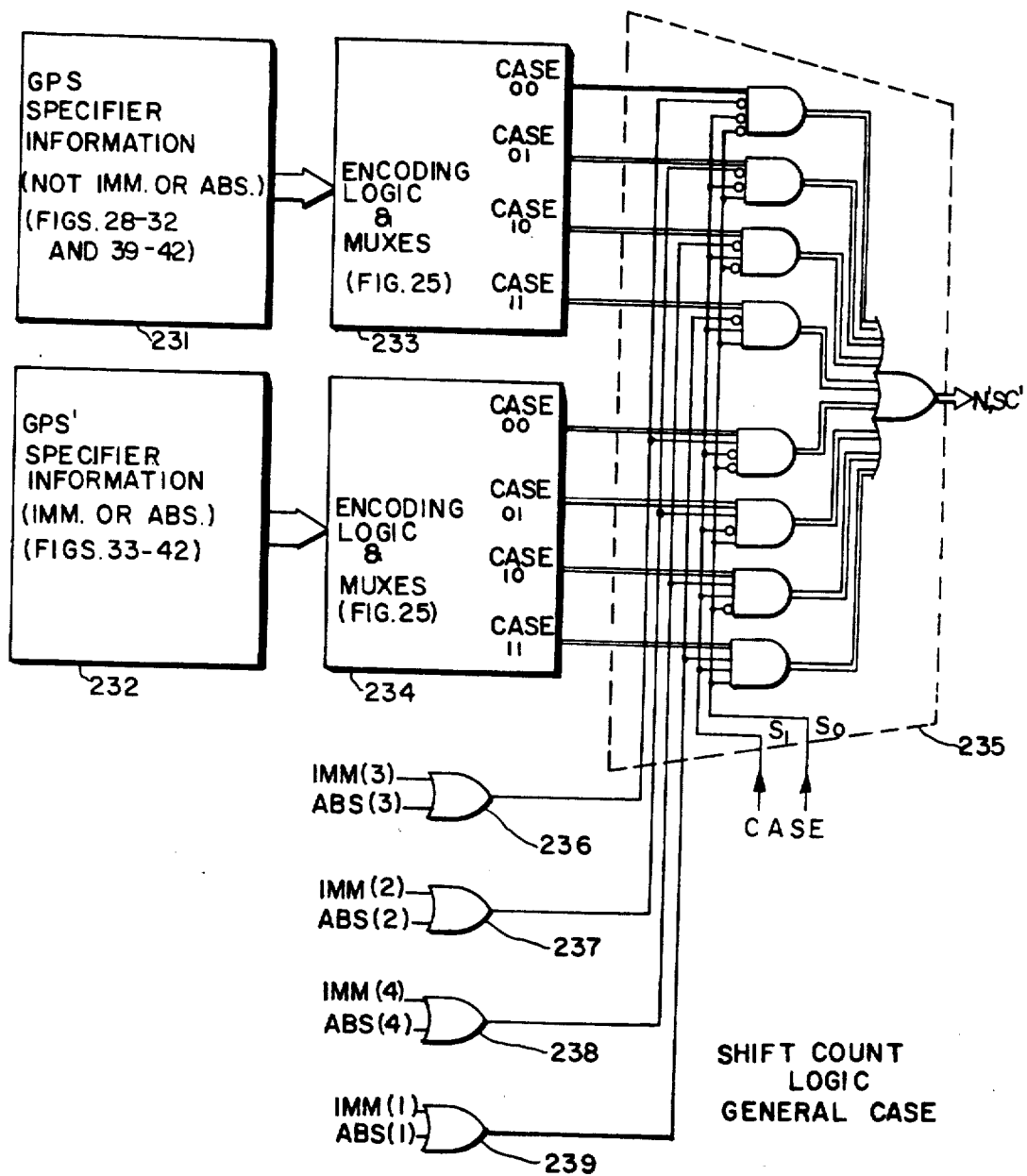
FIG. 43 a schematic diagram of shift count logic in which the logic of FIG. 25 is duplicated for the general addressing modes and for the immediate and absolute addressing modes.

Turning now to FIG. 43, there is shown a schematic diagram of shift count logic that could be used for determining the initial number of specifiers N' and the shift count SC' for simultaneously decoding up to three specifiers in a single cycle, including complex specifiers having an immediate or absolute addressing mode. Logic 231 provides specifier information in the usual case, incorporating the logic of FIGS. 28 to 32 and 39 to 42. Separate logic 232 determines the specifier information for the immediate or absolute case according to FIGS. 33 to 42. The priority logic and multiplexers of FIG. 25 are duplicated to provide logic 233 for determining N' and SC' for each of the four primary cases for the usual situation in which the complex specifier has neither an immediate nor absolute addressing mode, and to provide logic 234 for determining N' and SC' for the four primary cases assuming that the complex specifier has an immediate or absolute addressing mode. A multiplexer 235 is provided to select the particular one of eight possible cases. A primary case is selected in the same manner as before, but the selection of an output from either the logic 233 or the logic 234 is determined by a respective OR gate 236, 237, 238, 239, which determines whether the complex specifier in the particular primary case has an immediate or absolute addressing mode.

Figure 44:
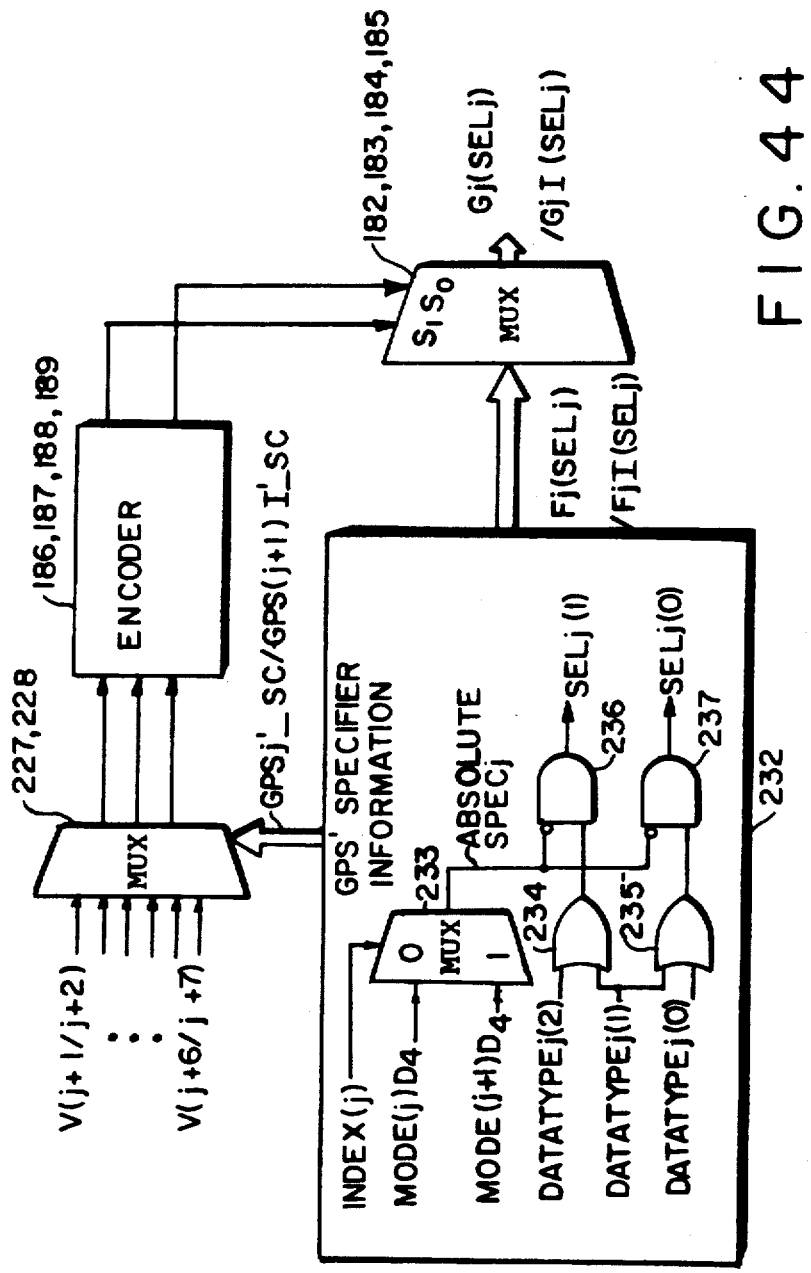
FIG. 44 shows how the specifier information for the immediate and absolute addressing modes is used in accordance with the shift count logic of FIG. 38.

A disadvantage of the VAX architecture is that the specifier information for a complex specifier having an immediate or absolute addressing mode is a function of the data type of the complex specifier. The data type is the last piece of information to be received by the shift count logic of FIG. 43 due to the fact that the delay through the decode logic and multiplexer (105 and 106 in FIG. 12) is much greater than the delay through the mode decoder (115 in FIG. 12). The so-called critical path through the shift count logic of FIG. 43 is therefore determined by the signal path of the data type information. This critical path is illustrated in FIG. 44. In the GPS' specifier information logic 232, the data type determines the shift count for the complex specifier $GPS_j$, which is fed to the control inputs of the multiplexer or shifter 227, 228 to select up to three valid signals V which are fed to a priority encoder 186, 187, 188 or 189 which then controls a respective multiplexer 182, 183, 184 or 185 to select a particular one of four functions $F_j$ to obtain a result $G_j$.

As shown in FIG. 44, the information for a complex specifier having an absolute or immediate mode is dependent upon the position of the complex specifier in the sequence of specifiers for the instruction. The multiplexer (106 in FIG. 12) selects the data types for the next three specifiers to be decoded. In FIG. 44, the index j identifies the particular one of three data types provided by the shifter (106 in FIG. 12) to the GPS' specifier information logic 232. This index j is different from the byte number of the base register designation of the complex specifier in the instruction buffer whenever there is an index specifier associated with the complex specifier.

Compare, for example, FIG. 33 to FIG. 35. The specifier information in FIG. 33 is for the case in which an index register is not specified, and the specifier information in FIG. 35 is for the case in which an index register is specified. The truth tables in FIGS. 33 and 35 are identical except for the fact that in FIG. 33 the mode of the complex specifier is indicated by bit 4 in byte 1 of the instruction buffer, while in FIG. 35 the mode of the complex specifier is indicated by bit 4 of byte 2 in the instruction buffer.

As shown in FIG. 44, the logic for determining the specifier information in the case of a complex specifier having an immediate or absolute mode can be simplified by first determining the mode of the complex specifier in accordance with whether an index register is specified. This selection is performed by a multiplexer 233. Upon further inspection of the truth tables in FIG. 33 and FIG. 35, it is evident that there are only four different combinations of the data types which result in different information for the complex specifier having an immediate or absolute addressing mode. These four different combinations determine whether the displacement following the complex specifier has one, two, four or more bytes of displacement or immediate data following the base register specification. These four combinations can be detected by the gates 234, 235, 236 and 237 shown in FIG. 44.

Figure 45:
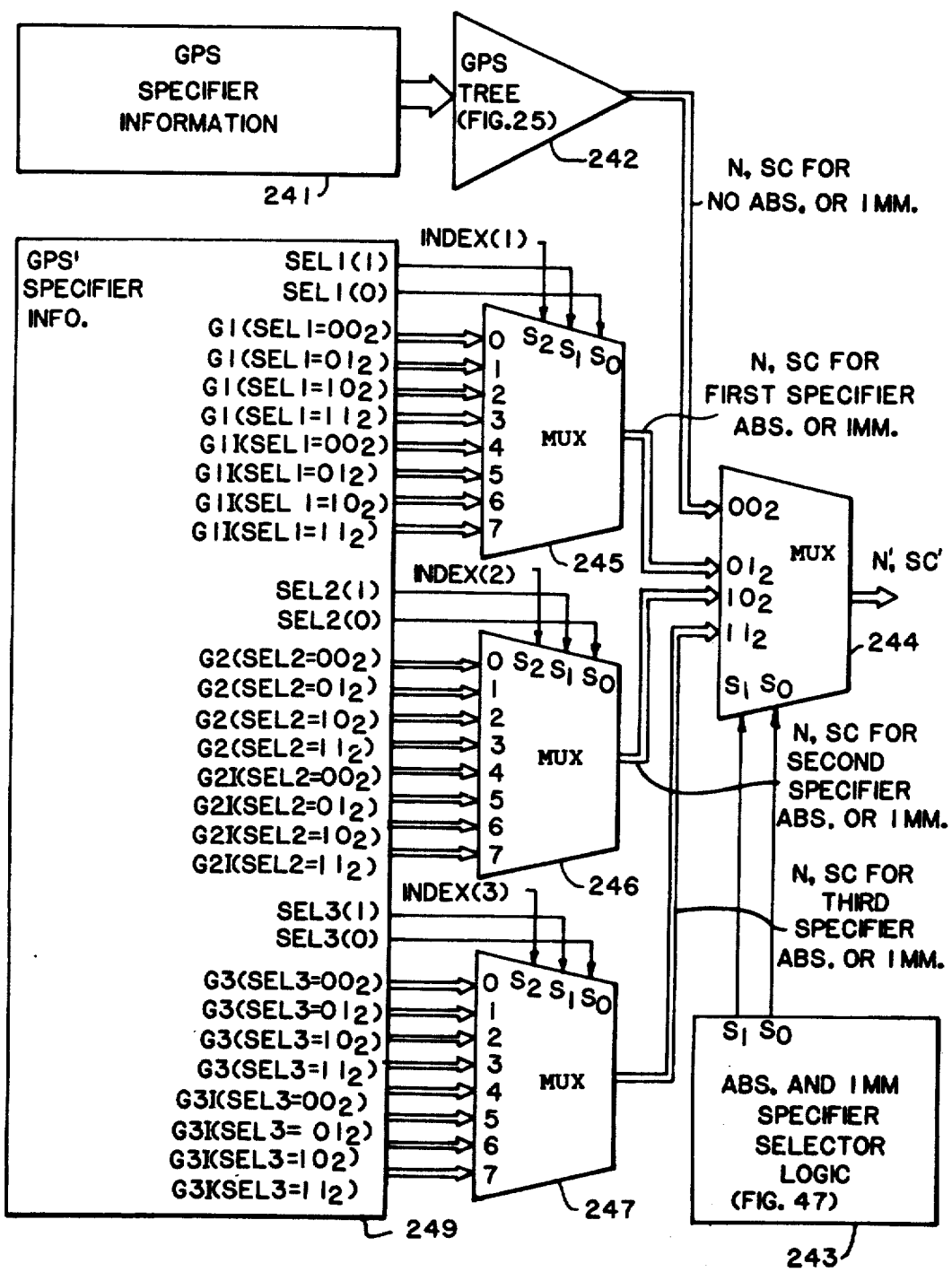
FIG. 45 is a schematic diagram of a modification to the shift count logic of FIG. 43 to reduce the length of the critical path in the instruction decoder of FIG. 12.

Preferably, the circuit of FIG. 43 is modified as shown in FIG. 45 to reduce the critical path of the data type information used in the case of a complex specifier having an immediate or absolute mode. To determine N' and SC' for the case where any complex specifier has neither an absolute nor an immediate addressing mode, there is provided specifier information logic 241 and tree logic 242 corresponding to FIG. 25.

Figure 47:
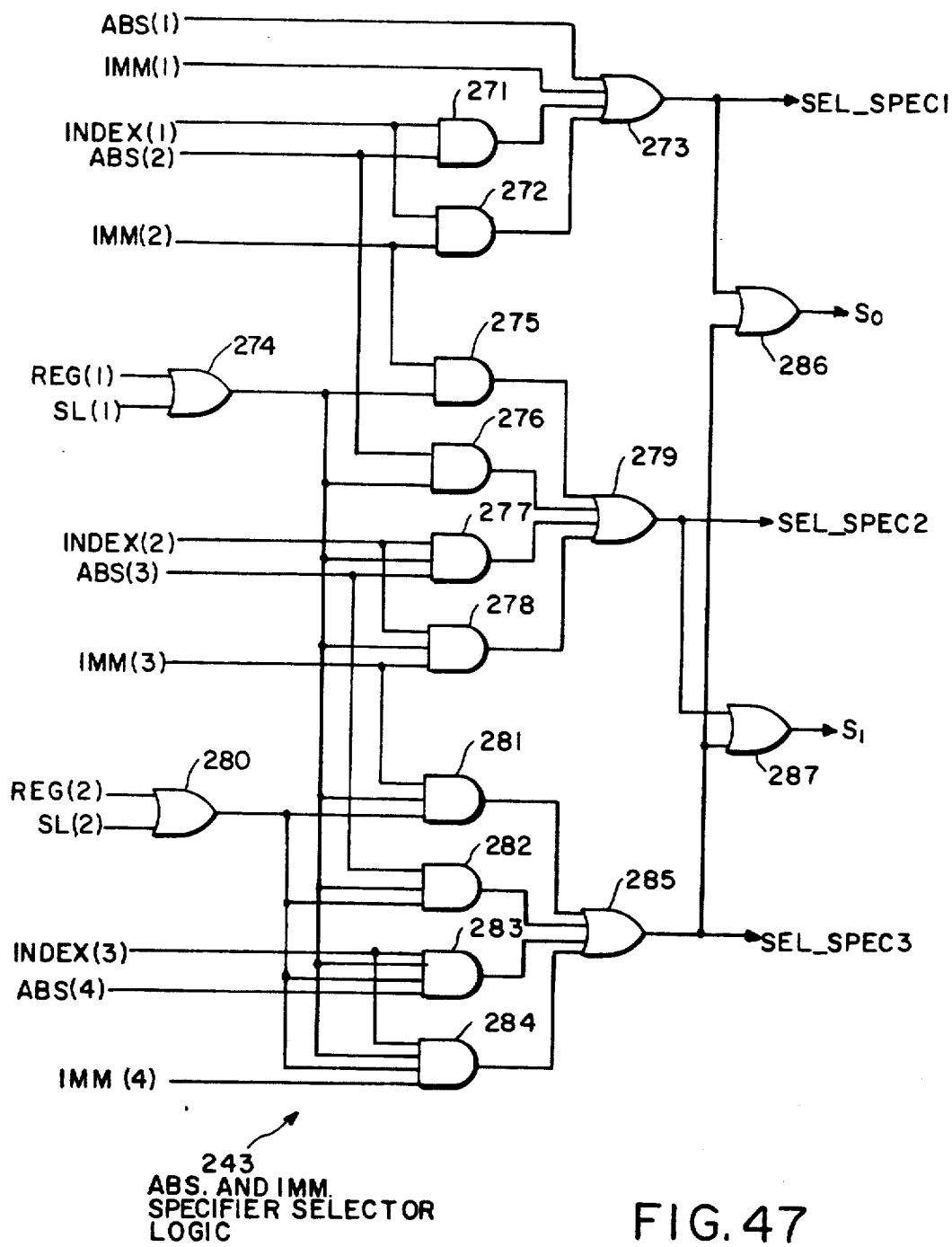
FIG. 47 is a schematic diagram of absolute and immediate specifier selector logic used in FIG. 45 to determine the specifier number associated with an absolute or immediate mode specifier in the instruction buffer.

Specifier selector logic 243, as further described below in FIG. 47, is used to determine whether any of the next three specifiers to be decoded is a complex specifier having an absolute or immediate addressing mode, and to identify the first such specifier. The specifier selector logic controls a multiplexer 244 which selects N' and SC' from the tree logic 242 in the absence of a complex specifier having an absolute or immediate mode, and otherwise selects values of N' and SC' that are determined for the first complex specifier having an absolute or immediate mode. As shown in FIG. 45, for example, the input 00 selects N' and SC' when no specifier has an absolute or immediate mode, input 01 selects N' and SC' computed assuming that the first specifier has an absolute or immediate mode, input 10 receives N' and SC' computed assuming that the second specifier has an absolute or immediate mode, and input 11 selects N' and SC' computed assuming that the third specifier has an absolute or immediate mode.

For each of the possible positions of one complex specifier in a series of three specifiers, there is provided a respective multiplexer 245, 246, 247 that selects values of N' and SC' that are computed for each of the four combinations of mode information and whether or not an index register is designated for the complex specifier.

Figure 46:
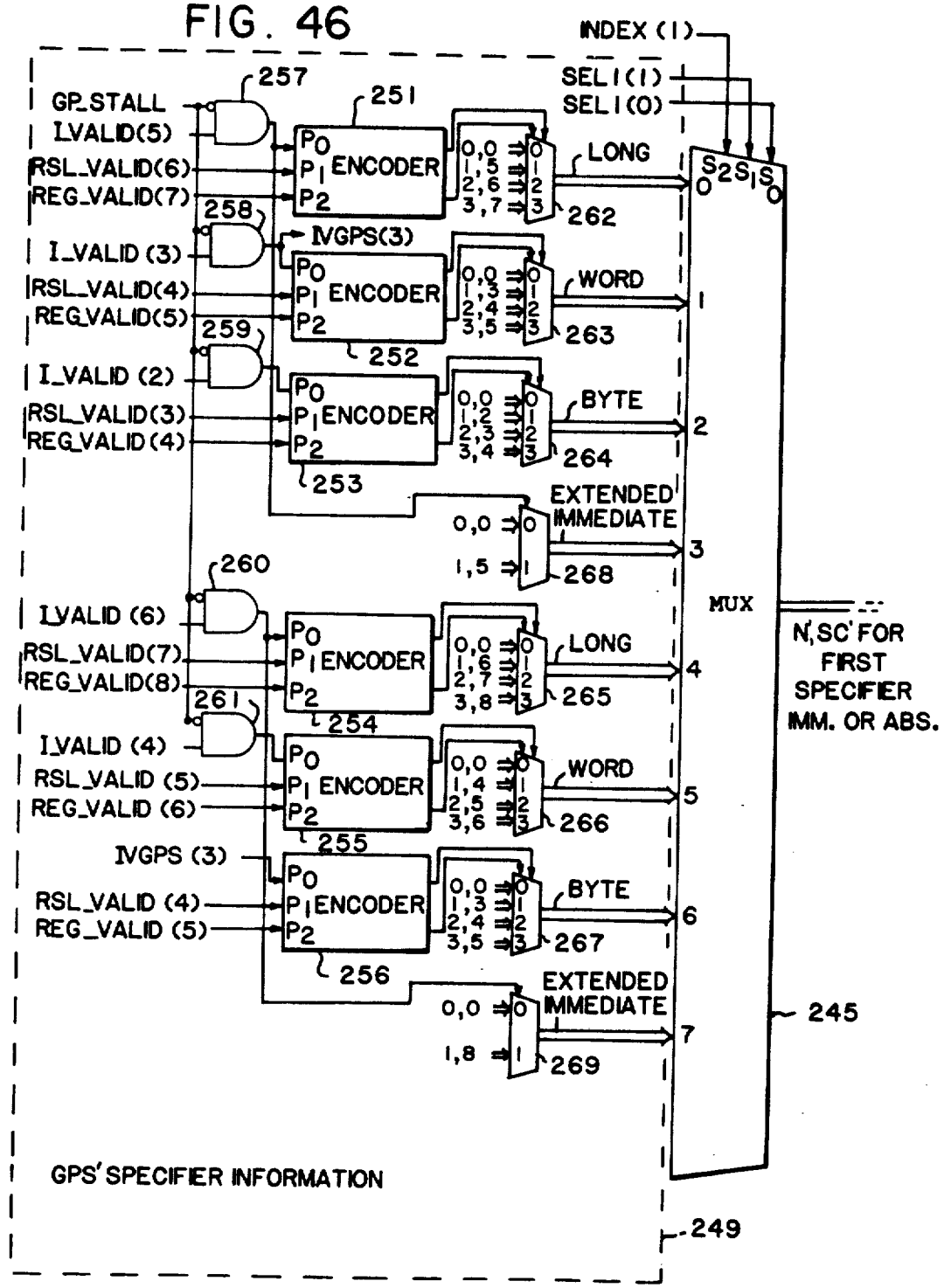
FIG. 46 is a detailed schematic diagram showing the logic used in FIG. 45 for obtaining information about a first specifier that has an immediate or absolute addressing mode.

A comparison of FIG. 44 to FIG. 45 shows that the critical path has been reduced by pushing the encoding logic (186 to 189) in front of the lower level of multiplexers and shifters (227, 228). This is shown more clearly in FIG. 46 which is an expansion of the specifier information logic for the multiplexer 245 in FIG. 45. The GPS' specifier information logic 249 includes a multiplicity of encoders 251 to 256 receiving validity signals corresponding to the signals received by the circuitry in FIG. 25 for the corresponding cases and sub-cases. Also shown in the specifier information logic 249 are respective gates 257 to 261 corresponding to gates 222 to 226 shown in FIG. 42. The encoders 251 to 256 control respective four-input multiplexers 262 to 267 which select N and SC values corresponding to the values in the truth tables of FIG. 33 and FIG. 35, respectively, for the cases of byte, word or longword displacement or immediate data following the base of the complex specifier. Separate two-input multiplexers 268, 269 select the N and SC values for the extended immediate modes.

By using the preferred circuit of FIG. 45, the critical path has been reduced to the delay of the data type information through the gates 234 to 237 shown in FIG. 44 and the two levels of multiplexers shown in FIG. 45. The delay through the gates 234 to 237 in FIG. 44 could be eliminated by using the decode logic (105 in FIG. 12) to provide data type information in encoded form corresponding to the outputs of the OR gates 234 and 235 in FIG. 44, and feeding these two encoded bits to the select inputs $S_1$ and $S_0$ of the respective multiplexers 245, 246, 247.

Turning now to FIG. 47, there is shown the specifier selector logic 243 previously used in FIG. 45. The first specifier is recognized as having an absolute or immediate mode if byte 1 in the instruction buffer has an absolute or immediate mode, or if byte 1 designates an index register and byte 2 has an absolute mode, or if byte 1 designates an index register and byte 2 has an immediate mode. These conditions are detected by gates 271, 272 and 273.

If byte 1 has neither a register mode nor a short literal mode, as detected by gate 274, then it is immaterial whether the second specifier has an absolute or immediate mode, since the first specifier is either invalid or complex and therefore any second complex specifier will not be decoded. Otherwise, specifier information for a second specifier having an absolute or immediate mode is selected when byte 2 has an immediate mode, byte 2 designates an index and byte 3 has an absolute mode, or byte 2 designates an index and byte 3 designates an immediate mode. These conditions are detected by gates 275 to 279. In a similar fashion, it is pertinent that the third specifier has an absolute or immediate mode only if both byte 1 and byte 2 have a register or short literal mode, as detected by gates 274 and 280. Subject to this constraint, the complex or immediate specifier information for the third specifier is selected if byte 3 has an absolute or immediate mode, or byte 3 designates an index and byte 4 has an absolute mode or byte 3 designates an index and byte 4 has an immediate mode. These conditions are detected by gates 281 to 285. For operating the multiplexer 244 in FIG. 45, the logic of FIG. 47 includes two OR gates 286, 287 for encoding the select signals.

As introduced above in connection with FIG. 12, the shift count logic 123 includes a number of trees used for decoding up to one, two or three specifiers. The trees for the general cases R1, R2, R2R, R3 and R3XR are certain sub-sets of the logic shown in FIG. 45 for the general case.

Figure 48:
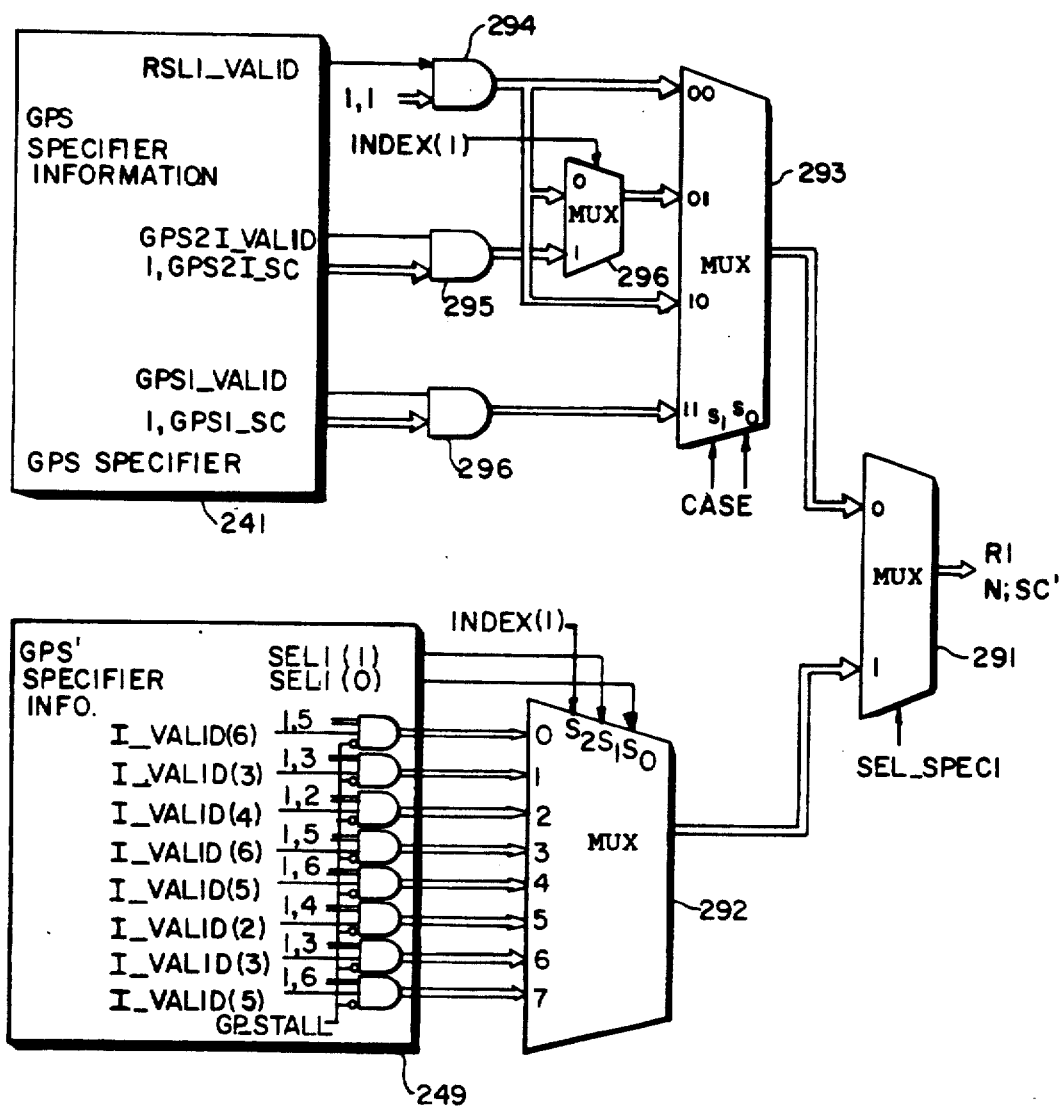
FIG. 48 is a schematic diagram of an R1 tree that is selected when the decoding of one specifier is requested.

Shown in FIG. 48 is the logic for the R1 tree. The general case has been simplified considerably since only the specifier information for the first specifier is pertinent. The pertinent validity information, for example, includes only the fact of whether a register or short literal specifier at level 1 is valid, or if a complex specifier at level 2I or level 1 is valid. There is no need to arbitrate among the priority of these validity signals since the pertinent information is selected by the primary case, and whether byte 1 specifies an index register and whether the first specifier is a complex specifier having an absolute or immediate mode.

The R1 logic tree includes a two-input multiplexer 291 at the top of the tree, an eight-input multiplexer 292 for selecting information about any first complex specifier, and a multiplexer 293 selecting information in accordance with each of the four primary cases. As indicated by a gate 294, when byte 1 is a valid register or short literal specifier, N' is equal to one and SC' is equal to one for $CASE_{00}$, $CASE_{01}$ and $CASE_{10}$. When byte 1 designates an index, then a complex specifier beginning in byte 2 is decoded when it is valid, as detected by a gate 295 and a multiplexer 296. For $CASE_{11}$, a gate 296 selects N equals one and the shift count for a complex specifier beginning in byte 1 when this complex specifier is valid.

Figure 49:
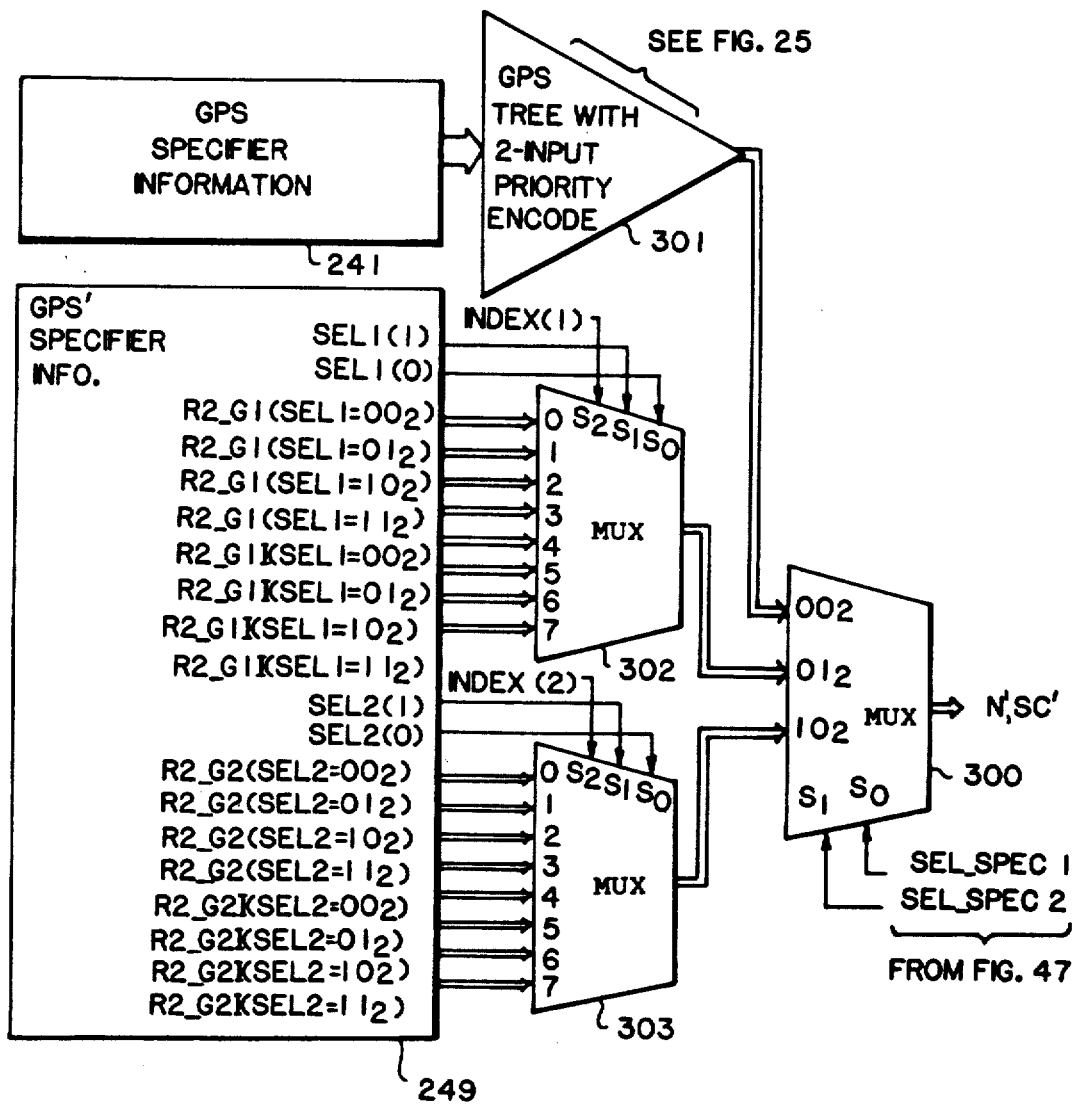
FIG. 49 is a schematic diagram of an R2 tree that is selected when the decoding of two specifiers is requested.

Turning now to FIG. 49, there is shown the shift count logic of the R2 tree. At the top of the tree is a multiplexer 300 which selects a simplified version 301 of the general tree of FIG. 25 when neither the first nor the second specifier is selected as having an absolute or immediate mode, or the output of a multiplexer 302 when the first specifier is found to have a complex or immediate mode, or the output of another multiplexer 303 when the first specifier is either a register or short literal specifier and the second is a complex specifier having an absolute or immediate mode. It should be apparent from comparison of FIG. 49 to FIG. 45 that the R2 tree is merely a simplification of the tree for the general case under the assumption that the encoding logic need only arbitrate the validation signals for the first two specifiers.

Figure 50:
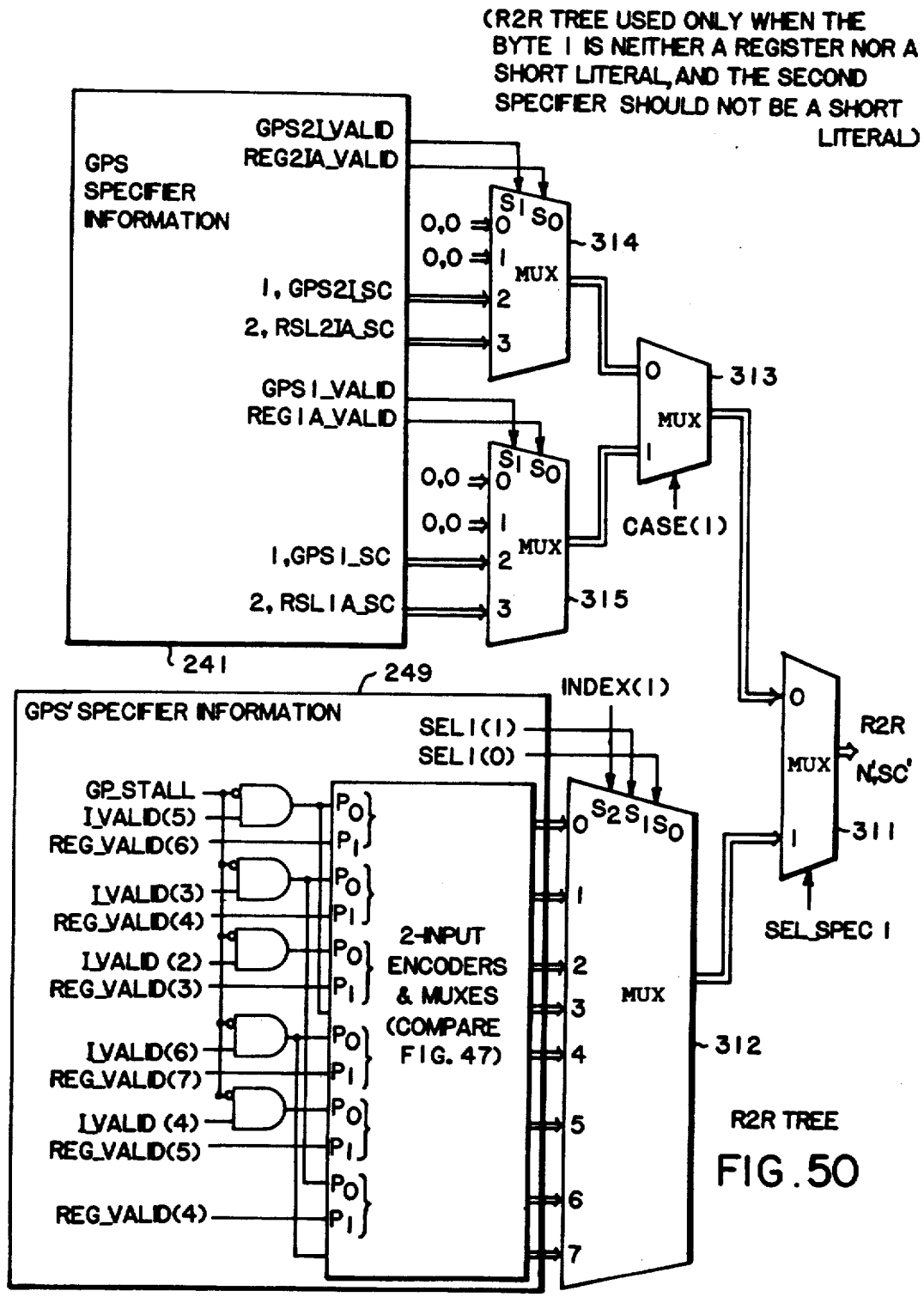
FIG. 50 is a schematic diagram of an R2R tree that is selected when the decoding of two specifiers is requested and only when byte 1 in the instruction buffer is neither a register specifier nor a short literal, and the second specifier should not be a short literal.

Turning to FIG. 50, there is shown a diagram of the R2R tree which is used only when byte 1 is neither a register specifier nor a short literal, and the second specifier is not to be decoded when it is a short literal. The R2R tree, for example, is requested by the request logic (114 in FIG. 12) when the second specifier being requested has a "write" access type, in which case an addressing fault occurs if the second specifier is a short literal specifier. This simplifies the detection of the addressing fault since it can be detected during the next cycle when the short literal specifier will become the first specifier being decoded, and the addressing fault can then be detected based upon the mode of only the first specifier.

Since it is assumed that the first byte is neither a register specifier nor a short literal and only two specifiers are being requested, the R2R tree has a multiplexer 311 at the top of the tree that selects information from a multiplexer 312 when the first specifier has an absolute or immediate mode, and selects the output of another multiplexer 313 when the first specifier does not have an absolute or immediate mode. The GPS' specifier information logic 249 arbitrates between a valid signal for the first specifier and a register valid signal for the byte following the complex specifier. In a similar fashion, a multiplexer 314 has its inputs wired to arbitrate between the valid signal for the specifier decoded at the 2I level and the register valid signal for the following byte at the 2IA level, and another multiplexer 315 is wired to arbitrate the valid signal for the complex specifier at level 1 and a register valid signal for the byte at level 1A.

Figure 51:
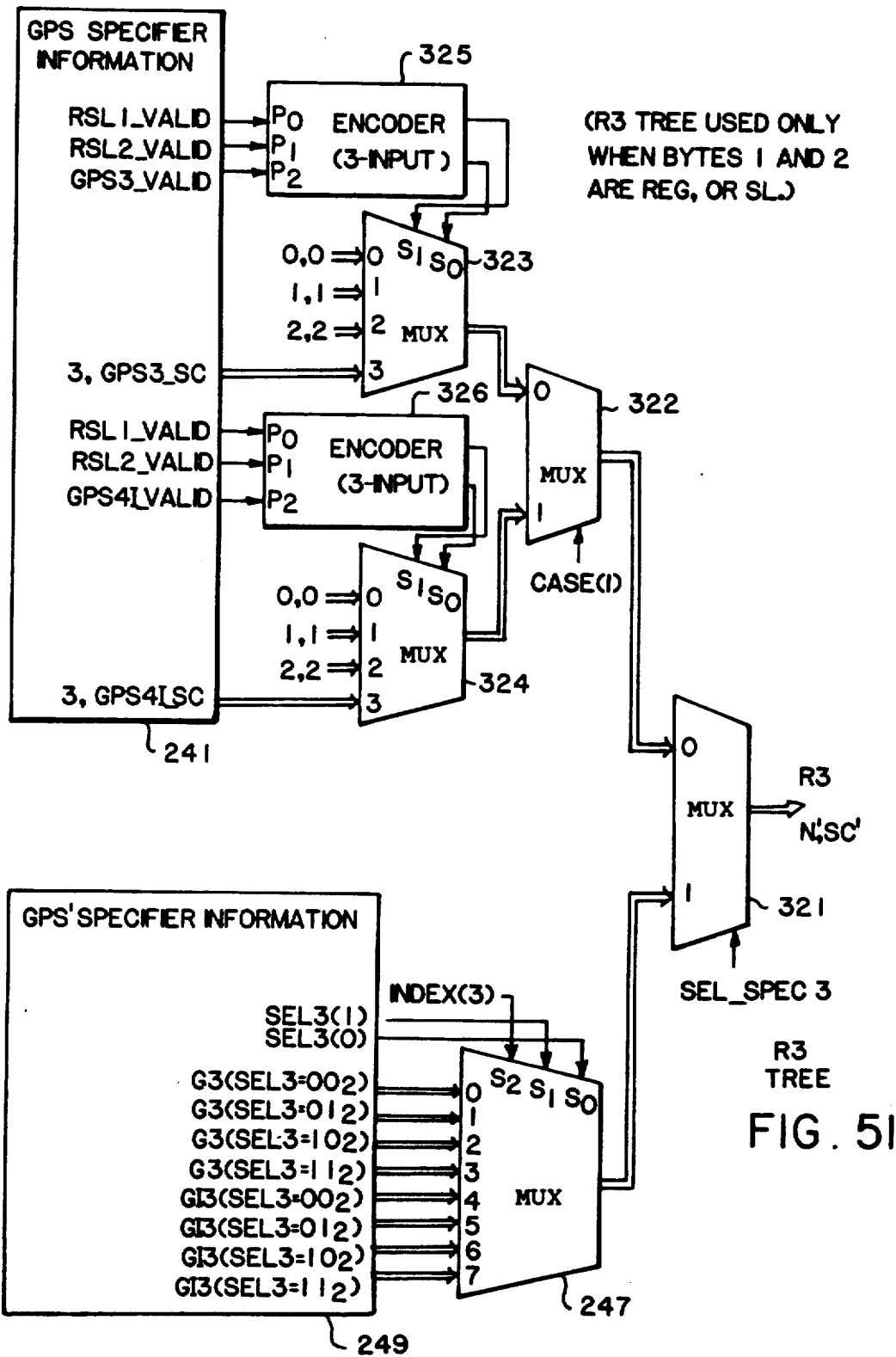
FIG. 51 is a schematic diagram of an R3 tree that is selected the decoding of three specifiers is requested and only when bytes 1 and 2 in the instruction buffer are register or short literal specifiers.

Turning now to FIG. 51, there is shown a schematic diagram for the R3 tree which is used only when the first two bytes are register or short literal specifiers. As will become apparent from FIG. 52, the general case of three specifiers being requested has been broken down into the R3 case in which the third specifier is complex, and the R3XR case in which a third specifier is decoded only when it is a register specifier.

A schematic diagram of the R3 tree is shown in FIG. 51. At the top of the tree there is a multiplexer 321 which is controlled by the SEL_SPEC3 signal indicating whether the third specifier has an absolute or immediate mode. If the third specifier has an absolute or immediate mode, then the multiplexer 321 selects N' and SC' from the multiplexer 247 previously introduced in FIG. 45. Otherwise, N' and SC' are obtained from another multiplexer 322 controlled by the CASE[1] signal. The multiplexer 322 selects N' and SC' from a multiplexer 323 for $CASE_{00}$ or from a multiplexer 324 for $CASE_{10}$. The multiplexer 323 is controlled by an encoder 325, and the multiplexer 324 is controlled by an encoder 326.

Figure 52:
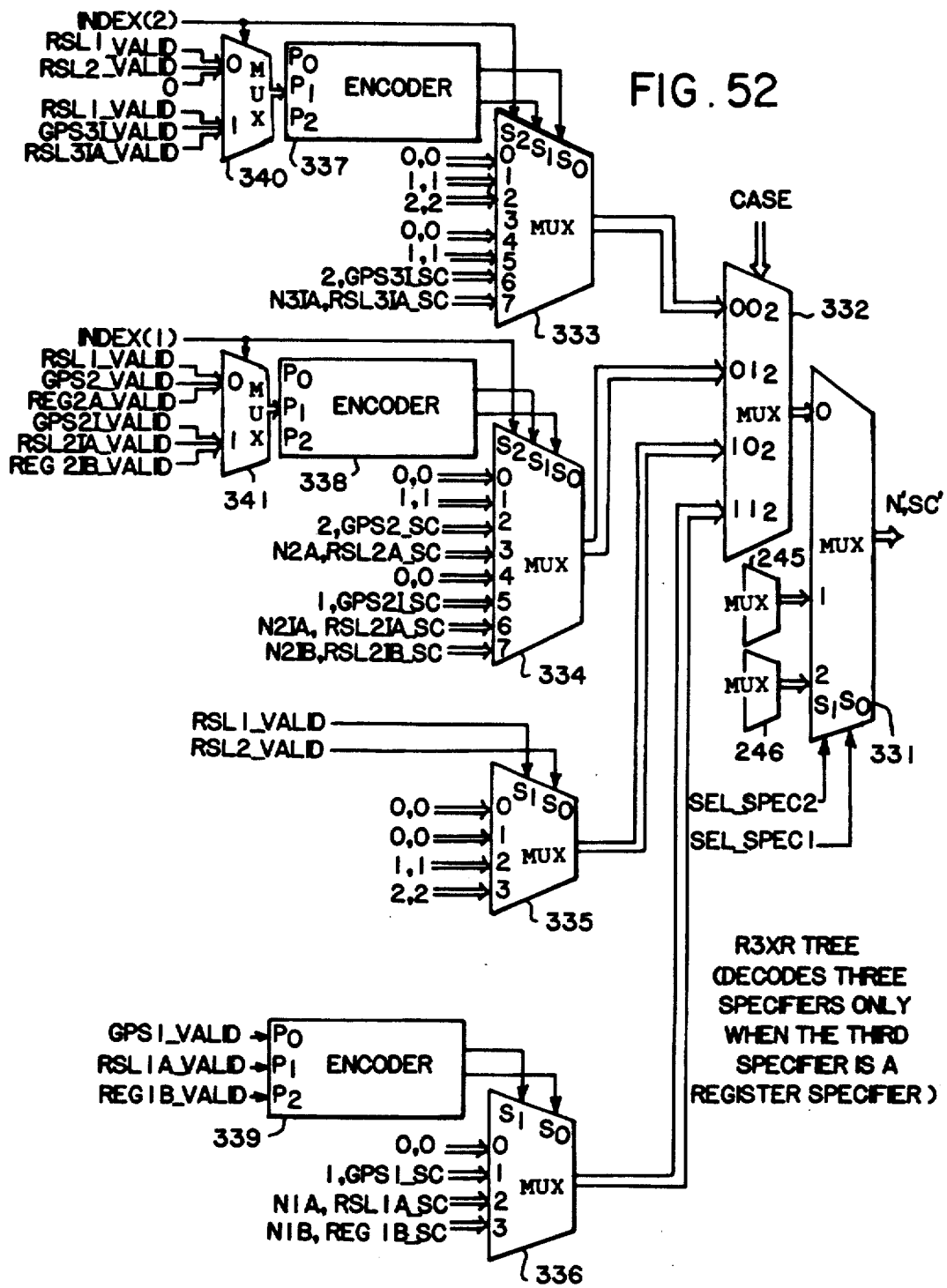
FIG. 52 is a schematic diagram of an R3XR tree that is selected when the decoding of three specifiers is requested and a third specifier is to be decoded only when the third specifier is a register specifier.

Turning now to FIG. 52, there is shown a schematic diagram of the R3XR tree which simultaneously decodes three specifiers only when the third specifier is a register specifier. At the top of the tree is a multiplexer 331 which selects the output of the multiplexer 246 (see FIG. 49) when the second specifier has an absolute or immediate mode, the multiplexer 245 (see FIG. 45) when the first specifier has an output of the immediate or complex mode, and otherwise selects the output of a multiplexer 332 which selects N' and SC' computed for each of the four primary cases with the restriction that the third specifier must be a register specifier in order to be considered valid. The R3XR tree therefore has additional multiplexers 333 to 336 corresponding to multiplexers 182 to 185 of FIG. 25, encoders 337, 338 and 339 corresponding to the encoders 186, 187 and 189 of FIG. 25, and multiplexers 340 and 341 corresponding to multiplexers 190 and 191 of FIG. 25. The multiplexer 335 in FIG. 2 has its select inputs wired so as to arbitrate between the register or short literal valid signals for byte 1 and byte 2 in the instruction buffer.

Once the number of specifiers N being decoded has been selected by the multiplexers 124, 125 and 126 (FIG. 12) from a shift count logic tree, the location in the instruction buffer of the data for the specifiers becomes known, and therefore the specifier data can be selected for transmission to the GP, SL or TR buses. The specifier information for a complex specifier is most readily determined because its position is given by the primary case. For the SL and TR buses, however, it is desirable to determine any register or short literal specifier data associated with the second and third specifiers being decoded. Any register or short literal data for the first specifier, of course, is found in byte 1 in the instruction buffer.

The format of the register or short literal data in a byte in the instruction buffer was introduced in FIG. 5 and is reproduced in FIG. 53 in order to define the various signals that are used for obtaining any register or short literal data associated with any second or third specifiers being decoded. The data about a register or short literal specifier (RSLDATA[i]), for example, comprises eight bits. It will be assumed that the most significant bit of RSLDATA indicates whether byte i in the instruction buffer could be a valid register specifier; in other words, it is the REG_VALID[i] signal. It will be assumed that the second most significant bit of RSLDATA indicates whether byte i could be a valid short literal specifier; in other words, it is the SL_VALID[i] signal. The next two most significant bits are the two most significant bits of any short literal data in the byte. The four least significant bits comprise the rest of the short literal data or the register address (REGN[i]).

Turning now to FIG. 54, there is shown a schematic diagram of the output selection logic (128 in FIG. 12) that selects any register or short literal data in any second specifier being decoded. Referring momentarily back to FIG. 21, in $CASE_{00}$ any such register or short literal data resides in byte 2 in the instruction buffer; in $CASE_{01}$ any such register or short literal data resides at level 2IA; in $CASE_{10}$ any such register or short literal data resides in byte 2; and in $CASE_{11}$ any such register or short literal data resides at level 1A. Returning to FIG. 54, a multiplexer 351 selects the particular case, and in $CASE_{00}$ and $CASE_{10}$ obtains the register or short literal data from byte 2 in the instruction buffer.

For $CASE_{01}$, another multiplexer 352 determines whether the first specifier is a complex specifier having an absolute or immediate mode, and also determines whether the second specifier is a complex specifier. If byte 1 in the instruction buffer does not designate an index register, then a pair of gates 353, 354 provide select inputs to the multiplexer 352 to select data having a value of zero to designate that the second specifier cannot be a valid register or short literal specifier. Otherwise, if byte 1 in the instruction buffer designates an index register, then the register or short literal data is obtained at one of three places depending upon whether the mode of the complex specifier having its base in byte 2 has an immediate or an absolute mode. If it has neither an immediate nor an absolute mode, then the register or short literal data is obtained at the 2IA level. If the complex specifier has an absolute mode, then the register or short literal data is obtained from byte 7 in the instruction buffer. Otherwise, when the complex specifier has an immediate mode, the register or short literal data is obtained at a location selected by a multiplexer 355 depending upon the data type of the complex specifier.

For $CASE_{11}$, the register or short literal data is obtained in a similar fashion by multiplexers 356 and 357, but in $CASE_{11}$ the first specifier is necessarily a complex specifier having its base in byte 1 of the instruction buffer.

Turning now to FIG. 55, there is shown the format for obtaining register data from the instruction buffer. The register data is used by the logic in FIG. 56 to obtain any register data about any third specifier being decoded. A multiplexer 361 selects the data in accordance with the primary case. A second level of multiplexers 362 to 364 and a pair of gates 365 and 366 operate in a similar fashion to the multiplexers 352 and 356 and the gates 353 and 354 (FIG. 54). A third level of multiplexers 367, 368, 369, 370 select the register data in accordance with the data type of the second or first specifier when the register data for the third specifier follows a complex specifier having an immediate or absolute addressing mode.

Figure 57:
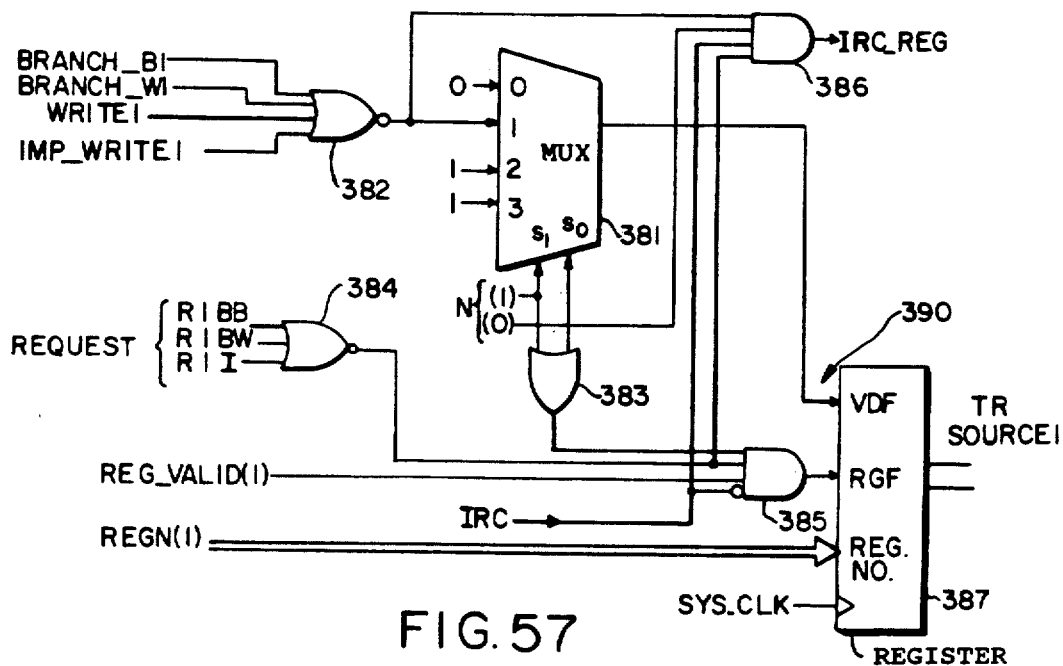
FIG. 57 is a schematic diagram of validation logic for transmitting a first source operand from the instruction decoder to the operand unit.

Turning now to FIG. 57, there is shown the output and selection logic (128 in FIG. 12) associated with the first source specifier transmitted over the TR bus. In order to obtain the valid data flag (VDF) associated with the first source specifier, a multiplexer 381 is controlled by the number N of specifiers decoded in order to clear the flag if no specifiers are decoded, and to set the flag if two or three specifiers are decoded. If only one specifier is decoded, it is possible that it is a destination rather than a source specifier, and a gate 382 clears the valid data flag if the first specifier has an access type of a branch byte, branch word, write or implied write.

The register flag (RGF) for the first source operand is set by a gate 383 if at least one specifier is decoded, and one specifier was not requested for a branch displacement or an implied operand as detected by a gate 384, and byte 1 in the instruction buffer can represent a valid register specifier and an intra-instruction read conflict was not detected, as determined by a gate 385. The gate 384 in particular determines whether byte 1 is a branch displacement or would represent the next opcode in the case of one implied specifier being requested. If byte 1 of the instruction buffer could possibly represent a valid register which is not a destination specifier, then a gate 386 generates a signal (IRC_REG) which insures that the register specifier will be processed by the general purpose unit in the event of an intra-instruction read conflict. The IRC_REG signal is fed to a circuit in FIG. 61, which is further described below. The valid data flag, register flag and also the register number are latched in a latch or register 387 after being transmitted over the a portion 390 of the TR bus to the transfer unit (30 of FIG. 6).

Figure 58:
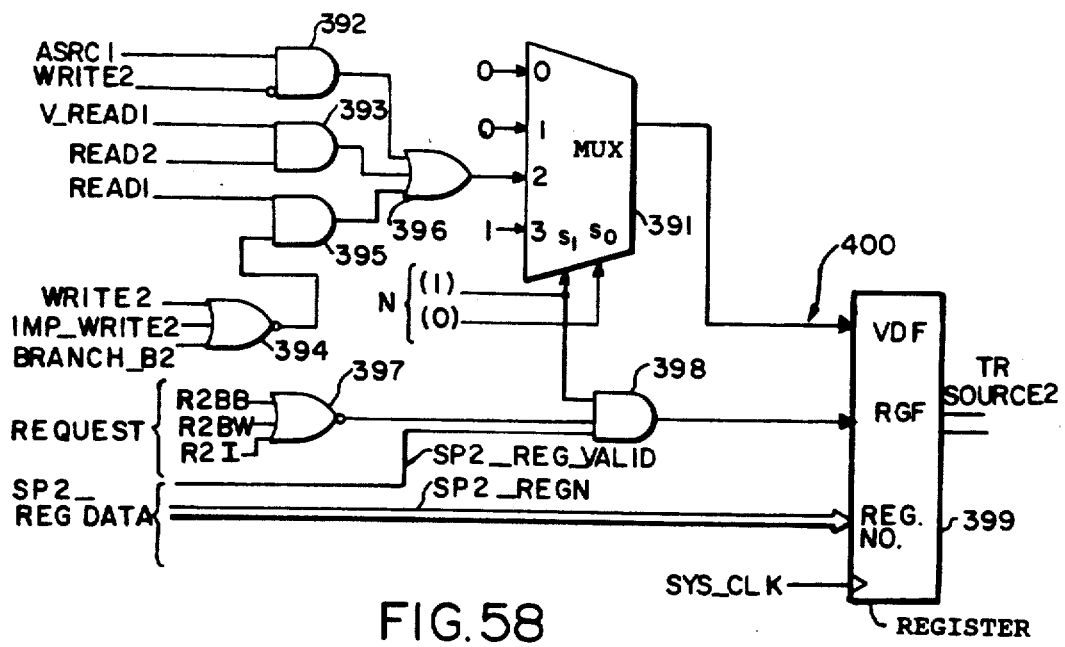
FIG. 58 is a schematic diagram of a validation and selection circuit for obtaining and transmitting a second source operand from the instruction decoder to the operand unit.

Turning now to FIG. 58, there is shown the validation logic for the second source operand which is transmitted over the TR bus. The valid data flag for the second source operand is selected by a multiplexer 391 controlled by the number N of specifiers actually decoded. The valid data flag is cleared if zero or one specifiers are actually decoded and is set if three specifiers are decoded. If two specifiers are decoded, it is possible that the second specifier specifies a destination operand and in this case the valid data flag is cleared. The second specifier is not a destination specifier if the first specifier has an access type of ASRC and the second specifier does not have an access type of WRITE, as detected by a gate 392, the first specifier has an access type of V_READ and the second specifier has an access type of READ, as detected by a gate 393, or the first specifier has an access type of READ and the second specifier has an access type of neither WRITE, IMP_WRITE, nor is a write branch displacement, as detected by gates 394, 395 and 396.

The register flag for the second source operand is set when at least two specifiers have been decoded, the second specifier is neither a branch displacement nor an implied specifier as detected by a gate 397, and the second specifier may represent a valid register specifier, as determined by a gate 398. The valid data flag, the register flag and the register address for the second specifier are transmitted over a portion 400 of the TR bus and received in a latch 399 for use in the transmit unit (30 of FIG. 6) during the next cycle.

Figure 59:
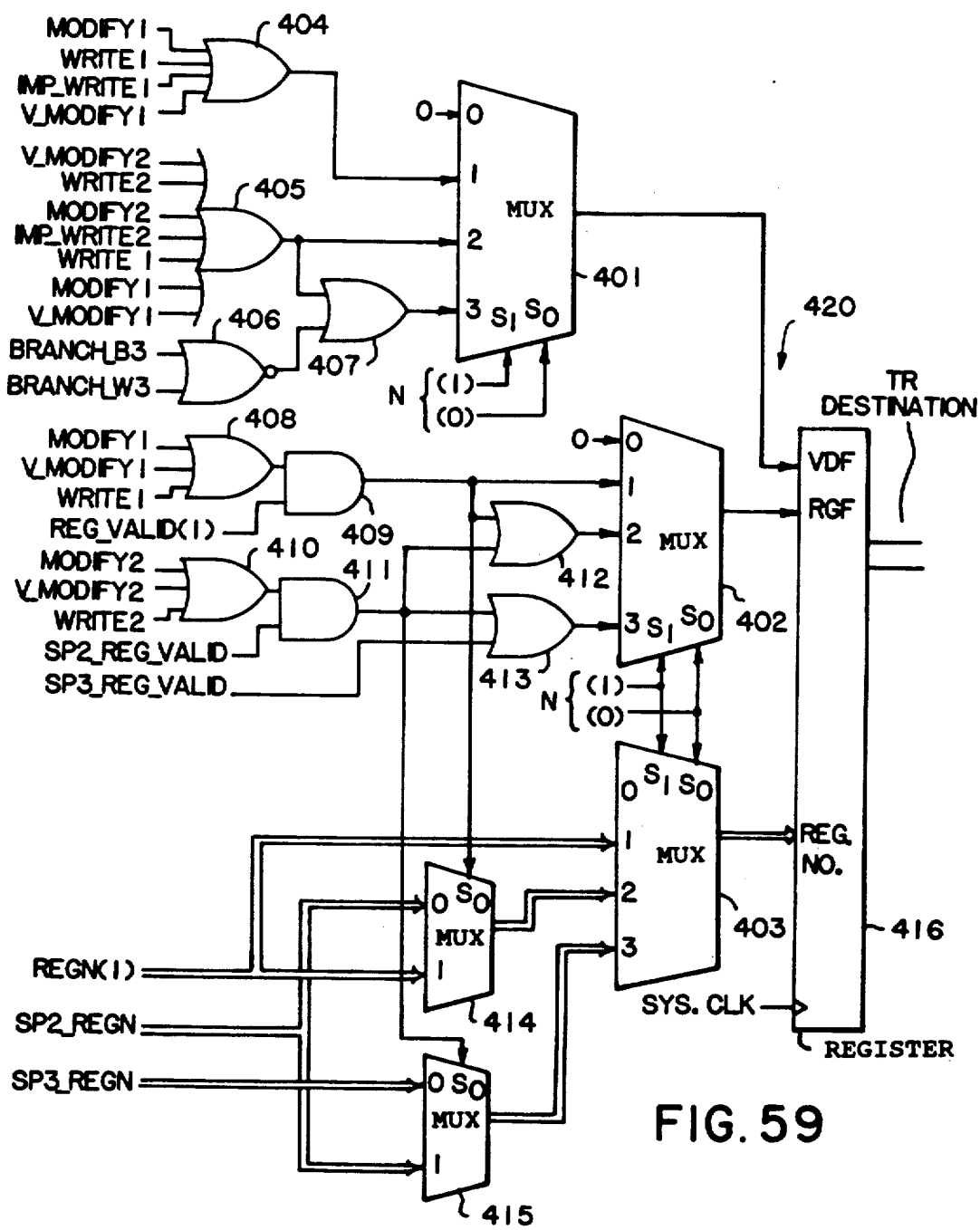
FIG. 59 is a schematic diagram of validation and selection logic for obtaining and transmitting a destination specifier from the instruction decoder to the operand unit.

Turning now to FIG. 59, there is shown the validation and multiplexing logic for selecting the destination operand. The destination operand could be specified by either the first, second or third specifier. The position of the destination specifier is primarily determined by the number of specifiers decoded, and therefore the valid data flag, register flag and register address for the destination operand are selected by respective multiplexers 401, 402 and 403 that are controlled by the number N of specifiers actually decoded during the current cycle. If no specifiers are decoded during the current cycle, then, of course, no destination operand is available and the valid data flag is cleared. If one specifier is decoded, then it is a destination specifier and the valid data flag is set if the access type of the first specifier decoded during the current cycle is either MODIFY, WRITE, IMP_WRITE or V_MODIFY, as detected by a gate 404. If two specifiers are decoded, then the second specifier specifies a valid destination operand when the access type of the second specifier being decoded is V_MODIFY, WRITE, MODIFY, IMP_WRITE or the first specifier being decoded has an access type of WRITE, MODIFY or V_MODIFY, as detected by a gate 405. If three specifiers are decoded, then the third specifier is a destination operand for these same conditions detected by gate 405 and, in addition, so long as the third specifier is not a branch displacement, as detected by gates 406 and 407.

If only one specifier is decoded, then it specifies a valid register destination if byte 1 in the instruction buffer is a valid register specifier and the access type of the first specifier is MODIFY, V_MODIFY or WRITE, as detected by gates 408 and 409. If two specifiers are decoded, then the register flag is set if gate 409 is active or if the second specifier is a valid register specifier specifying a destination operand, as detected by gates 410, 411 and 412. If three specifiers are decoded, then the register flag is set if gate 411 is active or the third specifier is a valid register specifier, as determined by gate 413.

If one specifier is decoded, then any register number is obtained from byte 1 in the instruction buffer. If two specifiers are decoded, then if the first is a valid register destination specifier, as detected by gate 409, then the register number is still obtained from byte 1 in the instruction buffer; otherwise, it is the register number of the second specifier as selected by a multiplexer 414. In a similar fashion, if three specifiers are decoded, then if the second specifier is a valid register destination specifier, the register number for the destination operand is the register number of the second specifier; otherwise, it is the register number of the third specifier, as selected by a multiplexer 415.

The valid data flag, register flag and any register number for the destination operand are transmitted over a portion 420 of the TR bus and are received in a latch or register 416 for use by the transfer unit (30 in FIG. 6) during the next cycle.

Figure 60:
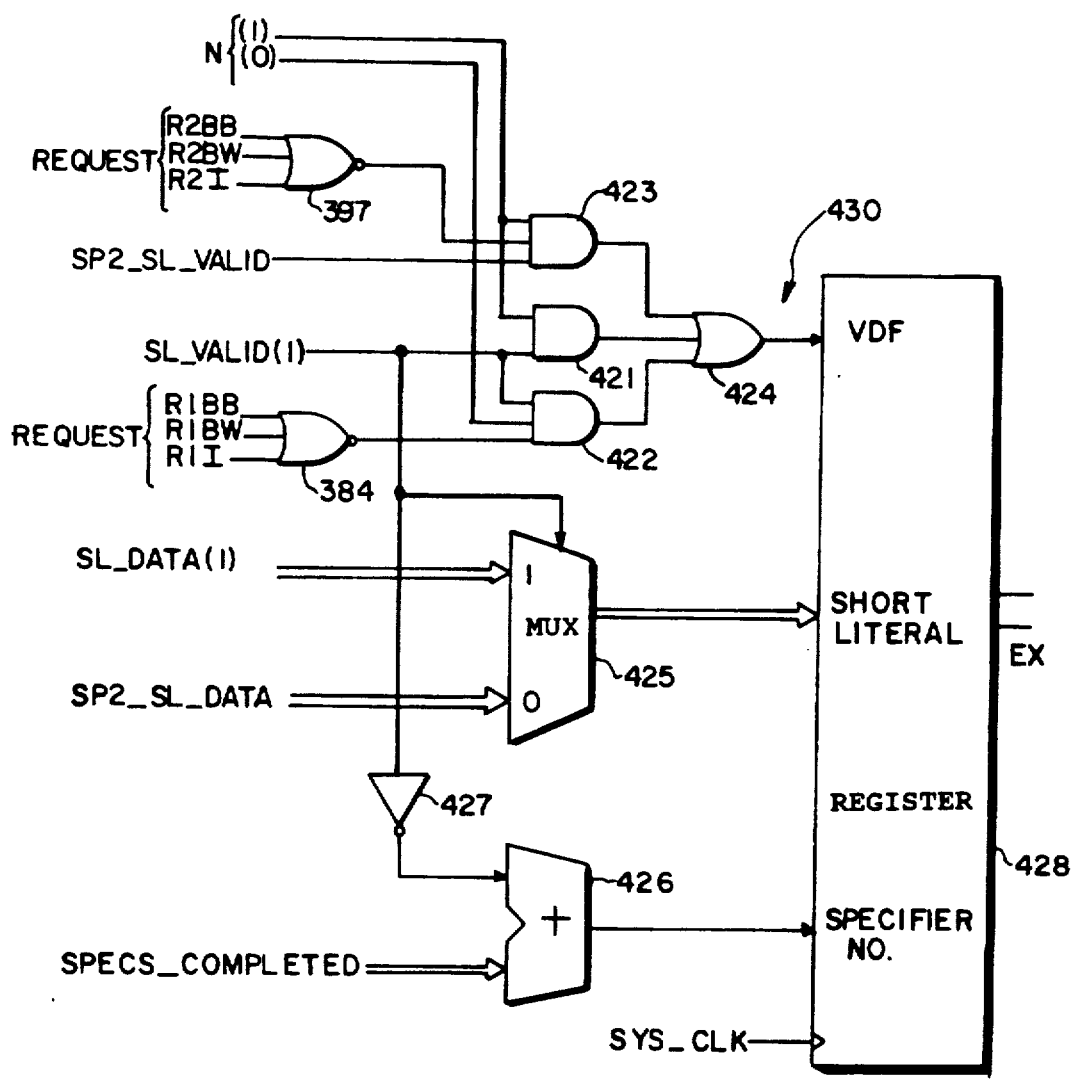
FIG. 60 is a schematic diagram of validation and selection logic for obtaining and transmitting short literal data from the instruction decoder to the operand unit.

Turning now to FIG. 60, there is shown a schematic diagram of the validation logic associated with the transmission of short literal information over the EX bus 430. A valid data flag for the short literal is obtained by combining the number of specifiers decoded with the short literal valid signals for byte 1 of the instruction decoder and the second specifier. In particular, if byte 1 in the instruction decoder is a valid short literal specifier, then the valid data flag is set if N is at least two as determined by a gate 421. If byte 1 in the instruction buffer is a valid short literal specifier but N is 1, then the valid data flag is set only if neither a branch displacement nor an implied specifier is requested, as determined by the gate 384 and a gate 422. In addition, the valid data flag is set if N is two or three, the second specifier is a valid short literal, and the second specifier is neither a branch displacement nor an implied specifier, as detected by the gate 397 and a gate 423. The outputs of the gates 421, 422 and 423 are combined in an OR gate 424 to provide the valid data flag.

If byte 1 in the instruction buffer is a valid short literal, then the short literal data is obtained from byte 1, and otherwise it is obtained from the short literal data for the second specifier, as selected by a multiplexer 425. The specifier number for the short literal is either the number of specifiers previously completed or decoded, in the event that the short literal specifier is the first specifier decoded in the current cycle, or is one greater than this, if the short literal is the second specifier decoded in the current cycle. This computation is performed by a three-bit binary adder 426 and an inverter 427. The valid data flag, short literal data and specifier number for the short literal operand are transmitted over the EX bus 430 and are latched in a latch or register 428 for use by the EX unit during the next cycle.

Figure 61:
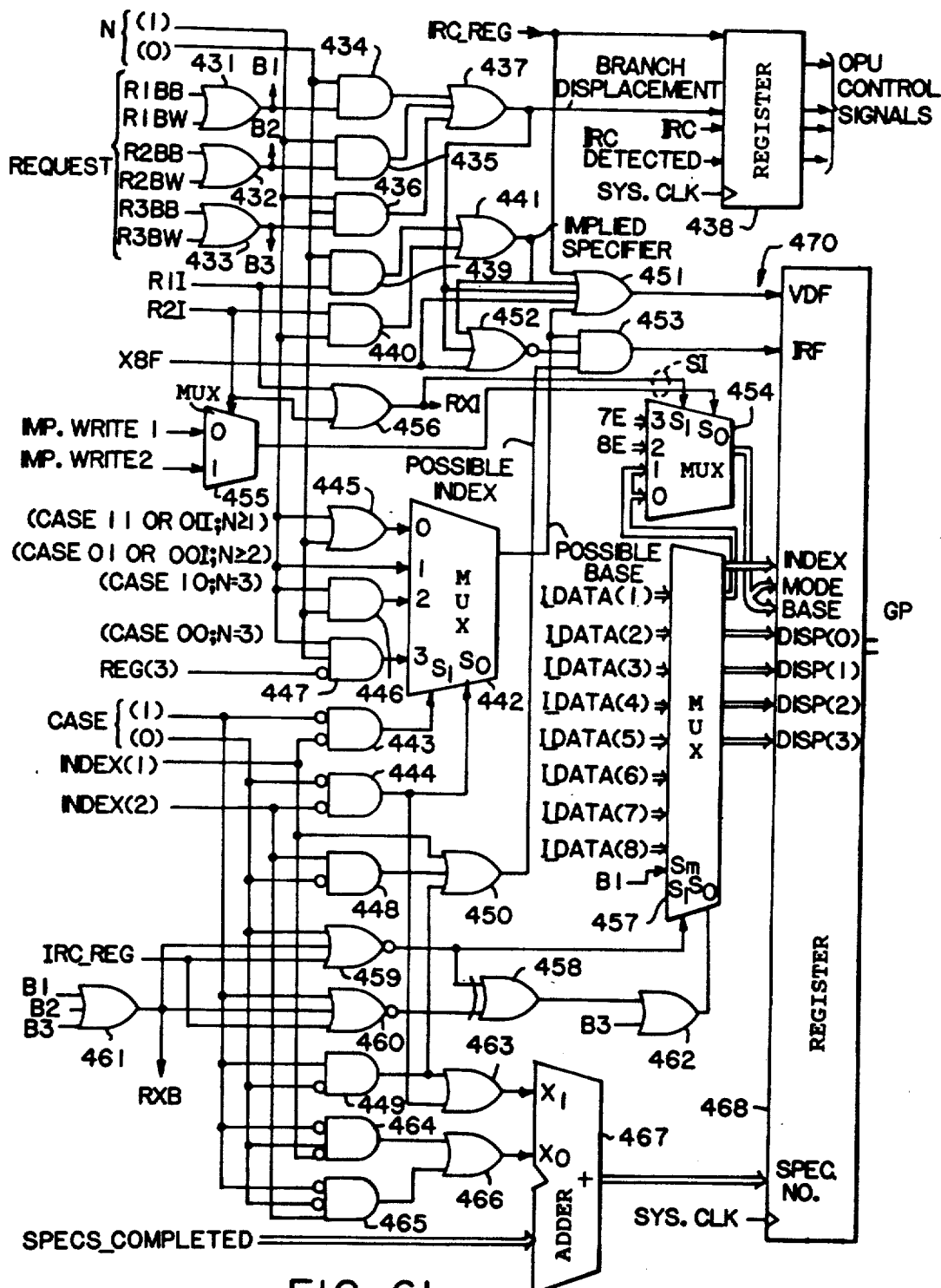
FIG. 61 is a schematic diagram of validation and selection logic for obtaining and transmitting a complex specifier or branch displacement information from the instruction decoder to the operand unit.

Turning now to FIG. 61, there is shown the validation and selection logic for transmitting operand data over the GP bus. Request signals from the request logic (114 in FIG. 12) determine whether a branch displacement or an implied specifier are placed on the GP bus 470. A branch displacement is placed on the GP bus if one specifier is decoded and the R1BB or the R1BW tree was selected, two specifiers were decoded and the R2BB or the R2BW tree was selected, or three specifiers were decoded and the R3BB or the R3BW tree was selected, as determined by gates 431 to 437. After transmission over the GP bus 470, a latch or register 438 latches a branch displacement signal from the gate 437 as well as the IRC_REG signal from FIG. 57 in order to provide special control signals to the operand processing unit (21 in FIG. 6). In the case of a branch displacement, the operand processing unit adds the branch displacement to the address of the next opcode being shifted into the byte 0 position of the instruction buffer in order to obtain the target address for the branch instruction. In response to the IRC_REG control signal, the operand processing unit obtains the number of the register specified by the base which is transmitted over the GP bus 470.

An implied specifier is transmitted over the GP bus 470 when the R11 tree is selected and one specifier is decoded, or the R2I tree is selected and two specifiers are decoded, as determined by gates 439, 440 and 441.

A multiplexer 442 determines whether a complex specifier can be decoded assuming that a branch, implied or extended immediate operand is not being decoded. The multiplexer 442 considers the four primary cases as well as whether byte 1 or byte 2 of the instruction buffer specifies an index register. Gates 443 and 444 combine the case with the index signals to detect whether the possible complex specifier is the first or second specifier or is the third specifier for $CASE_{10}$ or $CASE_{00}$. For $CASE_{01}$ or $CASE_{01}I$, the number of specifiers decoded must be greater or equal to one in order for a complex specifier to be decoded. An OR gate 445 determines whether N is greater or equal to one. For $CASE_{01}$ or $CASE_{00}I$, a complex specifier can possibly be decoded if N is greater or equal to two. For $CASE_{10}$, a complex specifier can possibly be decoded if N equals three, as detected by an AND gate 446. For $CASE_{00}$ (without an index register), a complex specifier is decoded so long as byte 3 in the instruction buffer does not designate a register specifier, as detected by a gate 447.

An index register is possibly designated if byte 1 in the instruction buffer designates an index register, byte 2 in the instruction buffer designates an index register, and $CASE_{01}$ or $CASE_{11}$ are not present, or $CASE_{10}$ is present, as detected by gates 448, 449 and 450.

The valid data flag for the GP bus is set when the IRC_REG signal is asserted, an implied specifier has been decoded, a branch displacement has been decoded, extended immediate data has been decoded, or it is possible to decode a complex specifier, as determined by an OR gate 451. The index register flag for the GP bus is set if it is possible to decode a complex specifier, it is possible to obtain the index specification, and so long as neither a branch displacement, an implied specifier, nor extended immediate data has been decoded, as detected by gates 452 and 453.

When an implied specifier is decoded, either a value of 7E hexadecimal or 8E hexadecimal is transmitted over the GP bus as the mode and base information. For this purpose, there is provided a multiplexer 454 which selects 7E when an implied specifier is requested and the access type of the requested implied specifier is IMP_WRITE, and is 8E when an implied specifier is requested and the access type of that specifier is not IMP_WRITE. The access type of the requested specifier is selected by a multiplexer 455, and an OR gate 456 determines whether an implied specifier is requested.

Except for the case of an implied specifier, the specifier information on the GP bus is obtained from a multiplexer 457 which essentially functions as a shifter and obtains the index, mode and base, and displacement at consecutive byte positions in the instruction buffer. The multiplexer 457 provides a selected one of five possible offsets between the instruction buffer and the GP bus 470. When one specifier is requested for a branch instruction, byte 0 of the displacement is obtained from byte 1 of the instruction buffer. When two specifiers are requested for a branch instruction, then byte 0 of the displacement is obtained from byte 2 of the instruction buffer. When three specifiers are requested for a branch instruction, byte 0 of the displacement is obtained from byte 3 of the instruction buffer. When an intra-instruction read conflict is detected and a register is transmitted over the GP bus 470, byte 0 of the displacement is aligned with byte 2 of the instruction buffer. In $CASE_{11}$, byte 0 of the displacement is also aligned with byte 2 of the instruction buffer. In $CASE_{01}$, byte 0 of the displacement is aligned with byte 3 of the instruction buffer. In $CASE_{00}$, byte 0 of the displacement is aligned with byte 4 of the instruction buffer. Finally, in $CASE_{10}$, byte 0 of the displacement is aligned with byte 5 of the instruction buffer.

The shifting of the multiplexer 457 is conveniently controlled by an input $S_m$ which aligns byte 0 of the displacement with byte 1 of the instruction buffer by a shift of minus one byte positions, and otherwise shifts in the other direction by a number of byte positions selected by the inputs $S_0$ and $S_1$. The input $S_m$ is asserted when one specifier is requested and it is a branch displacement. Therefore, the number of byte positions to shift is readily determined from the primary case by an exclusive OR gate 458 and NOR gates 459 and 460. An intra-instruction read conflict or a request for a branch displacement selects the same number of byte positions to shift as $CASE_{11}$. An OR gate 461 determines whether a branch displacement was requested. Finally, an OR gate 463 determines whether three specifiers were requested for a branch instruction.

The specifier number for a complex specifier on the GP bus is determined by the primary case and whether byte 1 or byte 2 in the instruction buffer designates an index register. This is done by determining which of up to three specifiers currently being decoded is a complex specifier. $X_1$ and $X_0$ designate whether the complex specifier is the first, second or third specifier currently being decoded. $X_1$ is determined by an OR gate 462 combining the outputs of the gate 444 and the gate 449. $X_0$ is determined by gates 464, 465 and 466. The two-bit binary number specified by $X_1X_0$ is added to the number of specifiers completed in an adder 467 to determine the specifier number for any complex specifier being decoded. The valid data flag, index register flag, index, mode, base, displacement and specifier number are transmitted over the GP bus 470 and are latched in a latch or register 468 for use by the general purpose unit (32 in FIG. 6) during the next cycle of the system clock.

Figure 62:
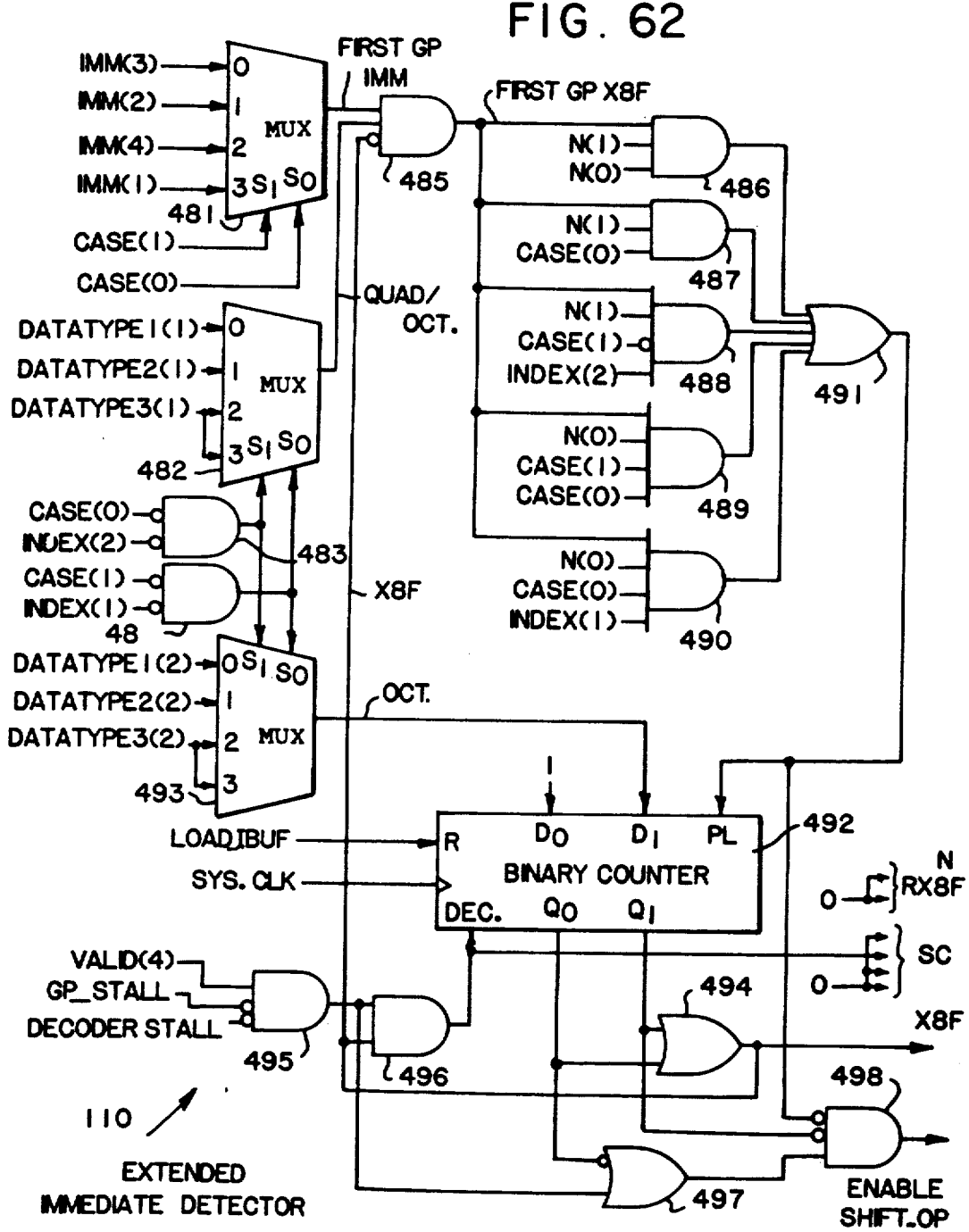
FIG. 62 is a schematic diagram of a circuit for detecting and decoding a complex specifier having an extended immediate mode.

Turning now to FIG. 62, there is shown a schematic diagram of the extended immediate detector 110 that was introduced in FIG. 12 and which performs steps 51 to 57 and 64 and 65 of the decoding procedure of FIG. 11.

In order to detect a complex specifier having an extended immediate mode, a multiplexer 481 determines whether the first complex specifier in the instruction buffer has an immediate mode, by selecting the immediate mode signal of the base position for the primary case. Any immediate mode is an extended immediate when bit 1 of the data type for the complex specifier is set. The data type for the complex specifier is selected by a multiplexer 482, controlled by gates 483 and 484 in response to the primary case and whether byte 1 and byte 2 in the instruction buffer designate index registers. A gate 485 combines the outputs of the multiplexers 481 and 482 to assert a signal when the first complex specifier found in the instruction buffer has an extended mode. In addition, the gate 485 is inhibited by the X8F signal so that it will not respond to any extended immediate data in the instruction buffer.

Even though one or more of the next three specifiers to be decoded has an extended immediate mode, it is possible that it will not be decoded during the current cycle. This depends upon the number N of specifiers decoded during the current cycle, and also the specifier position of the complex specifier which is a function of the primary case and whether byte 1 or byte 2 in the instruction buffer specifies an index register. These conditions are resolved by gates 486 to 491.

When the output of the gate 491 asserts that a complex specifier having an extended immediate mode is being decoded during the current cycle, a binary counter 492 is loaded with a longword count in accordance with the data type of the complex specifier, corresponding to steps 64 and 65 in FIG. 11. The longword count is set to three if the data type is an octaword, and otherwise is one for the case of a quadword. An octaword data type is detected by a multiplexer 493 which is controlled by gates 483 and 484. A gate 494 asserts the X8F signal whenever the binary counter 492 has a value other than zero. Whenever this occurs, the binary counter 492 is decremented so long as the valid data flag for byte 4 in the instruction buffer indicates that the extended immediate data is valid, the general purpose unit is not stalled and the decoder is not stalled. These conditions are detected by gates 495 and 496. The RX8F shift count is four when the binary counter 492 is decremented, and otherwise it is zero. The RX8F value for N is always zero. The extended immediate detector 110 enables the "shift op" signal when the immediate mode is not first detected, when the binary counter does not have a value of two or more, and when the binary counter does not have a value of one or the binary counter will be decremented. In other words, shifting of the operation code is disabled beginning when the extended immediate mode is detected and until the longword count is one and the binary counter is decremented to zero. These conditions are detected by gates 497 and 498.

Figure 63:
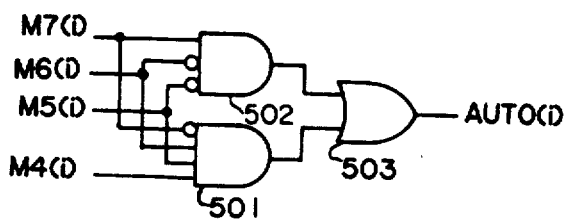
FIG. 63 is a schematic diagram of a decoder for detecting a complex specifier having an autoincrement or autodecrement mode.

Turning now to FIG. 63, there is shown a schematic diagram of a decoder for detecting an autoincrement or autodecrement mode. The autodecrement mode occurs when the register mode field (see FIG. 5) has a value of seven, as detected by a gate 501. An autoincrement occurs when the register mode field has a value of eight or nine, as detected by a gate 502. The outputs of gates 501 and 502 are combined in an OR gate 503 to provide a signal indicating an autoincrement or autodecrement mode.

It is important for the decoder to detect an autoincrement or autodecrement mode in order to detect intra-instruction read conflicts. Since the instruction decoder 20 is capable of simultaneously decoding a register specifier and an autoincrement or autodecrement specifier, there arises a possibility that the register specifier and the autoincrement or autodecrement specifier may reference the same register. Therefore, it is important to distinguish whether the value of the register specifier should be the initial value of the referenced register or the value after modification by the autoincrement or autodecrement. In a decoder which decodes a single specifier per cycle, the possibility does not arise because the register specifier will reference the initial value if the register specifier is decoded before the autoincrement or autodecrement specifier, and will reference the modified value if the register specifier occurs after the autoincrement or autodecrement specifier.

For the instruction decoder 20 as described above, it is desirable to pass register numbers over the TR bus when register specifiers are decoded, and to pre-process the autoincrement or autodecrement specifiers in the GP unit before the actual values of the register specifiers are obtained by the execution unit. Therefore, when the decoder as described above would simultaneously decode a register specifier and an autoincrement or autodecrement specifier which both reference the same register, the execution unit would naturally use the modified value of the referenced register for the register specifier. This natural mode of operation, however, would cause an invalid result when the register specifier occurs before the autoincrement or autodecrement specifier in the sequence of specifiers following the operation code for the instruction. For the instruction decoder 20, this possible incorrect result is avoided by treating it as a special case referred to as an "intra-instruction read conflict." In other words, there is said to be an intra-instruction read conflict whenever an autoincrement or autodecrement specifier specifies a base register which is referenced by a previous register specifier in the specifier sequence for the same instruction.

A register specifier references at least the register designated by the register address field of the specifier (see FIG. 5). If the register specifier has a quadword data type, the register specifier will in addition reference the register having a register number or address of one plus the register number (n) indicated in the register address field of the register specifier. A register specifier having an octaword data type will reference registers having register numbers n, n+1, n+2 and n+3.

The instruction decoder 20 preferably uses two different methods of detecting intra-instruction read conflicts. The first method is to generate a "read register mask" identifying the registers that are referenced by source register specifiers during previous decoding cycles for the current instruction being decoded. The second method is to generate an "IRC mask" which indicates for each data type combination whether an intra-instruction read conflict could occur. This second method is used to determine intra-instruction read conflicts between a register specifier and an autoincrement or autodecrement specifier being decoded simultaneously during the same cycle.

Figure 64:
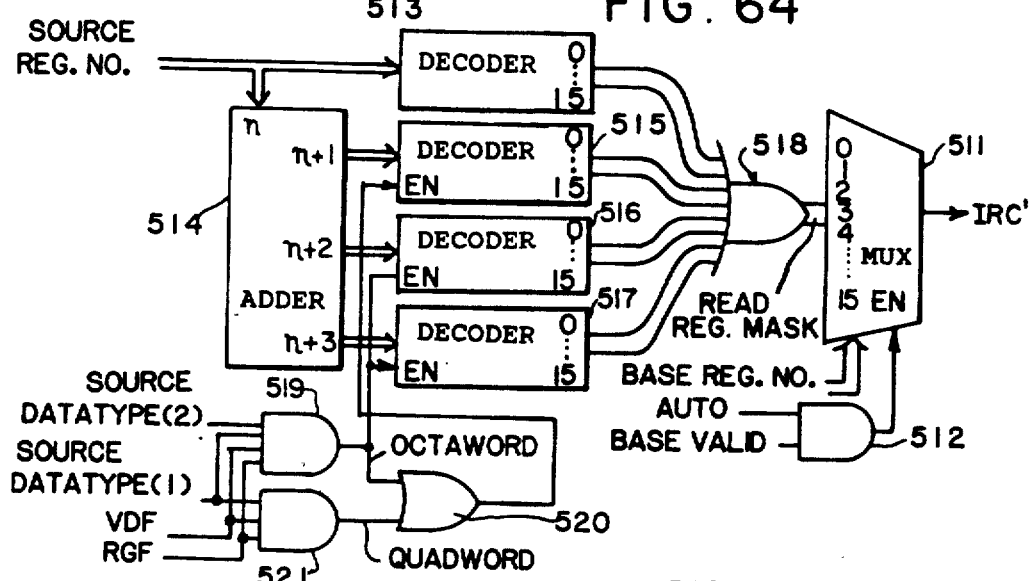
FIG. 64 is a schematic diagram illustrating how an intra-instruction read conflict is detected by inspecting a read register mask.

The use of a read register mask for detecting an intra-instruction read conflict is illustrated in FIG. 64. In order to determine whether there is a conflict between a source register specifier and a subsequently occurring autoincrement or autodecrement specifier included in the same instruction, a read register mask is generated having a respective bit position for each of the sixteen general purpose registers in the CPU. A multiplexer 511 selects the bit position of the read register mask corresponding to the base register number of the complex specifier. The selected bit of the read register mask is further qualified by the auto signal defined in FIG. 63 and a base valid signal which are combined in a gate 512 in order to enable the multiplexer 511. The output of the multiplexer 511 therefore provides a signal IRC' indicating the presence of an intra-instruction read conflict.

In order to generate the read register mask, the source register number n is fed to a decoder 513 which causes a bit to be set in the read register mask at a position corresponding to the read register number. Bits in other bit positions may need to be set depending upon the data type of the source register specifier. These positions occur at n+1, n+2 and n+3 as determined by an adder circuit 514. Bits are selectively set at these other bit positions by respective decoders 515, 516 and 517. Each of the decoders generates a respective mask, and the masks are logically OR'd by a set of sixteen four-input OR gates generally designated 518 to provide the read register mask.

Since bits in the read register mask are set at the n+2 and n+3 bit positions only for an octaword data type, the octaword data type is decoded by a gate 519 which supplies enable signals to the decoders 516 and 517. In a similar fashion, the decoder 515 is enabled by an OR gate 520 for the octaword and the quadword data types. A gate 521 qualifies with the valid data flag and register flag associated with the source register number. These flags also enable the gate 519 which detects the octaword data type.

As shown in FIG. 64, the read register mask is conveniently used for detecting an intra-instruction read conflict when the base register number occurs during a cycle subsequent to the cycle in which the source register specifier is decoded. If the base register is decoded during the same cycle as the source register specifier, the circuit of FIG. 64 has an excessive delay from the time that the source data type is available from the decode logic (105 in FIG. 12) to the time that the intra-instruction read conflict is detected by the multiplexer 511.

Figure 65:
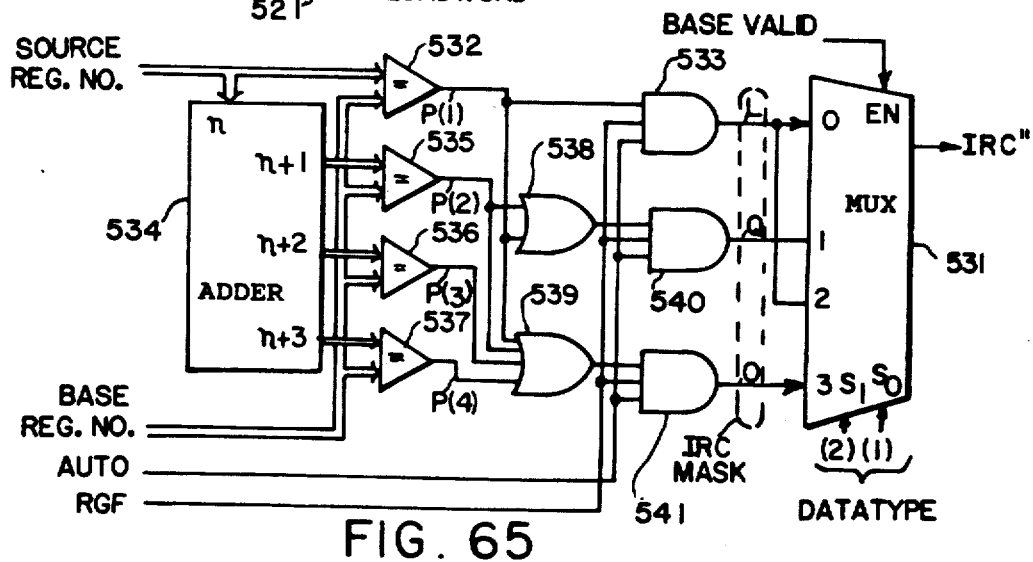
FIG. 65 is a schematic diagram illustrating how an intra-instruction read conflict is detected by inspecting an IRC mask.

In FIG. 65 there is shown an intra-instruction read conflict detection circuit which has a multiplexer 531 controlled by the data type of the source register specifier in order to eliminate the delay between the time that the data type is available and the intra-instruction read conflict is detected. The multiplexer 531 selects a respective bit position of an IRC mask corresponding to whether the data type designates a longword, quadword or octaword.

In order to generate the IRC mask, a comparator 532 compares the source register number to the base register number to determine whether there is a possible conflict if the data type specifies a longword. A gate 533 qualifies the output of the comparator 532 is qualified by the automatic mode signal for the base register and a register flag for the source specifier.

In order to determine the IRC mask bits for the possible quadword and octaword data types, the source register number n is fed to an adder 534 providing values of n+1, n+2 and n+3 to respective comparators 535, 536 and 537. A possible conflict occurs for a quadword data type if a match is indicated by either of the comparators 532 and 535, as detected by an OR gate 538. A possible conflict may occur for an octaword data type if a match is indicated by any of the comparators 532, 535, 536 or 537, as detected by an OR gate 539. The outputs of the gates 538, 539 are qualified by the register flag and the AUTO signal gates 540 and 541.

Figure 66:
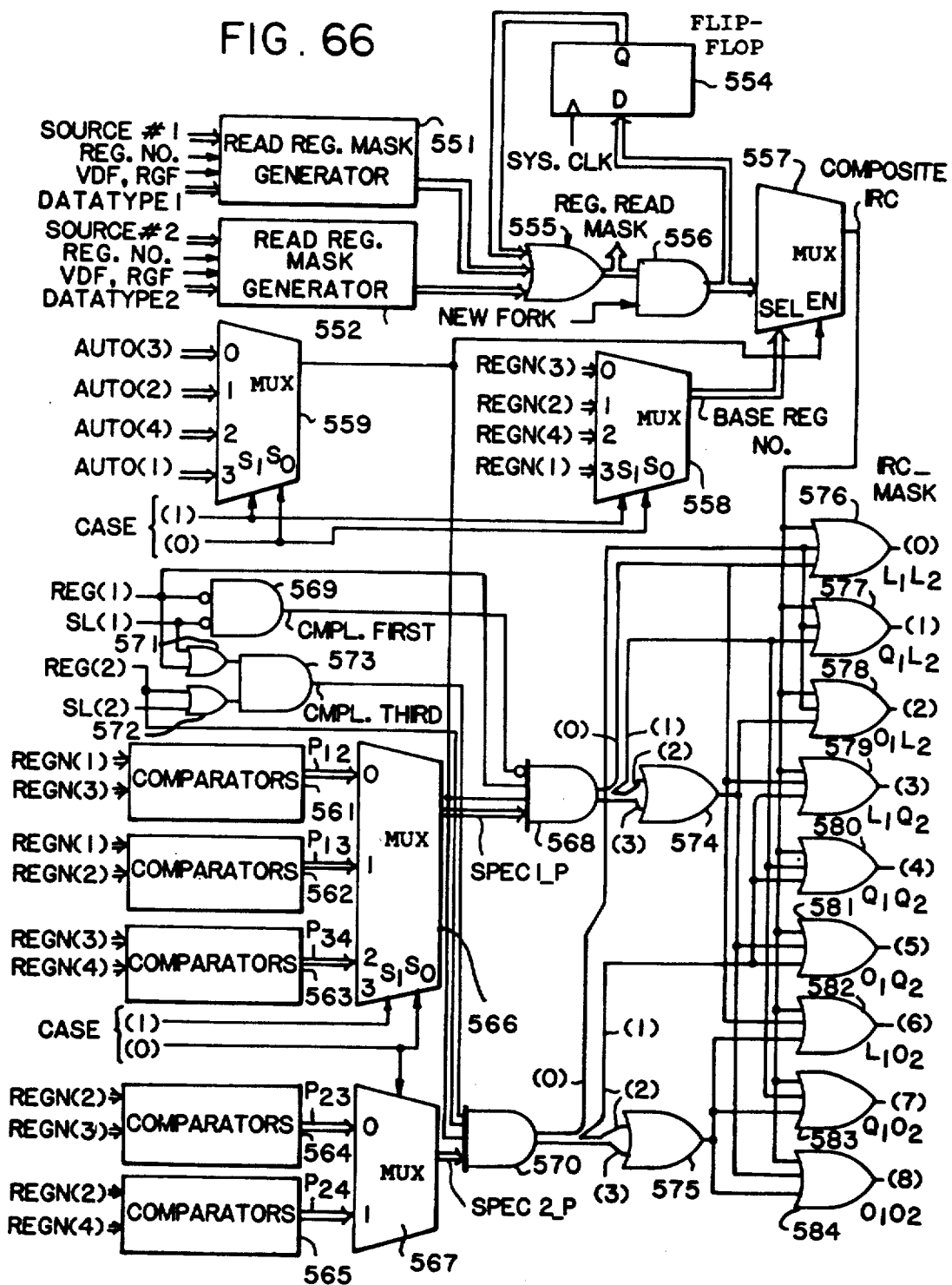
FIG. 66 is a schematic diagram of a circuit for generating an IRC mask including information about two specifiers currently being decoded and any number of previous specifiers having been decoded for the same instruction.

Turning now to FIG. 66, there is shown circuitry for generating a nine-bit IRC mask for detecting an intra-register conflict with up to two source register specifiers decoded simultaneously during a current cycle, and any number of source specifiers decoded during previous cycles for the current instruction. The circuit in FIG. 66 includes a read register mask generator and a composite IRC detector similar to the circuits shown in FIG. 64 for detecting an intra-instruction read conflict during the present cycle between a complex specifier decoded during the current cycle and any number of source and index register specifiers decoded during any previous cycles for the same instruction.

In order to generate the read register mask, latched values of the first source register number, valid data flag, register flag, and first specifier data type for the previous decoding cycle are fed to a read register mask generator 551. In a similar fashion, latched values of the second source register number, valid data flag, register flag and data type for the second specifier determined during the previous decoding cycle are fed to a read register mask generator 552. A set of sixteen three-input OR gates generally designated 555 combine the read register masks generated for the two source register numbers with a previously-generated read register mask from a latch or register 554 to obtain a read register mask for the current decoding cycle. This read register mask is qualified by the "new fork" signal in a gate 556 to provide the data input to the register 554. The register 554 therefore accumulates the read register information for previous decoding cycles for the current instruction, and the gate 556 in effect clears the register 554 at the end of decoding for the current instruction.

In order to determine whether there is a conflict between any autoincrement or autodecrement mode complex specifier decoded during the present cycle and any source specifiers decoded during a previous cycle for the same instruction, the output of the gate 556 is fed to a multiplexer 557 which selects a particular bit from the composite mask corresponding to the number of the base register for the complex specifier. This base register number is selected from the register address field in byte 1, 2, 3 or 4 in the instruction buffer by a multiplexer 558 controlled by the primary case. In a similar fashion, an autoincrement or autodecrement mode signal for the base register number is selected by a multiplexer 559 controlled by the primary case.

The composite IRC from the multiplexer 557 is logically OR'd into every position of the nine-bit IRC mask. Otherwise, the IRC mask indicates a possible conflict between up to two source register specifiers and an autoincrement or autodecrement mode complex specifier simultaneously decoded during the current cycle. The adder and comparators shown in FIG. 65 are replicated five times to provide respective comparators 561 to 564 for each possible combination of source register and base register that can be simultaneously decoded during the present cycle. Each one of these comparators provides four output bits.

The outputs from the comparators 561 to 563 are selected by a multiplexer 566 controlled by the primary case to obtain the comparator signals for a possible base register and a first preceding register specifier. Another multiplexer 567 is controlled by the CASE[0] signal to provide comparator signals between a possible base register and a second preceding register specifier. The comparator signals selected by the multiplexer 566 are further qualified in a gate 568 which inhibits the comparator signals when the first specifier being decoded is a complex specifier, as detected by a gate 569, and when the first specifier is not a register specifier. In a similar fashion, a gate 570 enables the comparator signals for the second specifier when the third specifier is complex, as detected by gates 571 to 573, the second specifier has a register mode, and the complex specifier has an autoincrement or autodecrement mode.

The qualified specifier signals from the gates 568 and 570 are combined by first and second levels of OR gates 574 to 584 to generate the nine-bit IRC mask.

Figure 67:
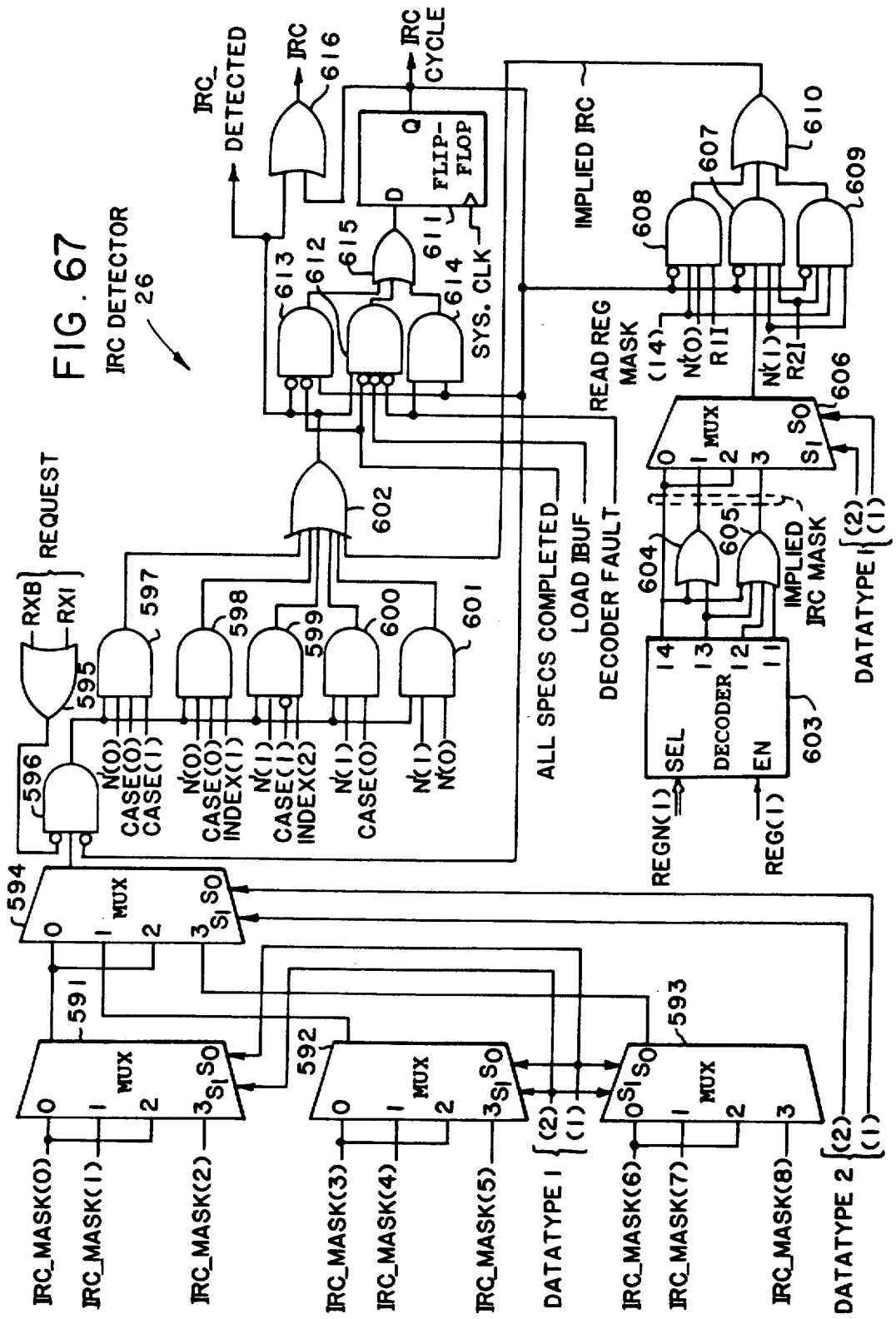
FIG. 67 is a schematic diagram of a circuit which inspects the IRC mask generated by the circuit in FIG. 66 and which also detects an implied intra-instruction read conflict.

Turning now to FIG. 67, there is shown a schematic diagram of the IRC detector 26 introduced in FIG. 12. The IRC mask is received in a first set of multiplexers 591, 592 and 593 to select three bits corresponding to the data type of the first specifier being decoded. A fourth multiplexer 594 is controlled by the data type of the second specifier being decoded to select a particular one of the nine bits of the IRC mask. The selected bit of the IRC mask, however, does not necessarily indicate the presence of an intra-instruction read conflict due to the fact that the detected mode might actually be a branch displacement, or there could be an implied specifier. In these cases, the output of the multiplexer 594 is inhibited by gates 595 and 596. Gate 596 is also inhibited if an intra-register conflict was detected during a previous decoding cycle for the same instruction. This is done so that the IRC detector may signal the operand processing unit when the IRC is first detected during the decoding of an instruction.

It is still possible that the output of the gate 596 might not signal an intra-instruction read conflict due to the fact that the auto mode complex specifier might not be decoded during the present cycle. Whether an auto mode specifier is actually decoded depends upon the initial number N' of specifiers being decoded during the present cycle, the primary case, and whether byte 1 or byte 2 in the instruction buffer designates an index register. These conditions are detected by AND gates 597 to 601 and an OR gate 602. The OR gate 602 also receives an implied IRC signal which is asserted whenever an implied specifier is decoded that conflicts with a previous register specifier or index register designation. An implied intra-instruction read conflict, for example, occurs for the instruction "PUSHL SP" since such an instruction should be interpreted as first obtaining the initial value of the stack pointer, then autodecrementing the stack pointer, and then pushing the initial value of the stack pointer onto the stack at an address given by the decremented value of the stack pointer. Therefore, the first explicit specifier is a source register specifier which conflicts with the following implied autodecrement of the same register.

In order to detect an intra-instruction read conflict between a source register specifier and an implied autoincrement or autodecrement specifier, the register number in byte 1 of the instruction buffer operates the select input of a decoder 603 which is enabled by the register mode of byte 1. For the implied specifiers shown in Appendix I, the implied specifier is always an autoincrement or autodecrement of the stack pointer which has a register number of fourteen. Therefore, decoder outputs 14, 13, 12 and 11 correspond to the comparator signals P[1], P[2], P[3] and P[4] of FIG. 65. OR gates 604 and 605 provide the quadword and octaword bits of the implied register mask. The appropriate bit of the implied IRC mask is selected by a multiplexer 606. The selection from the multiplexer 606 is further qualified in a gate 607 by the R2I request signal and N'[1] indicating that the implied specifier will be decoded.

It is also possible that an implied specifier currently being decoded will conflict with a source register specifier having been decoded during a previous decoding cycle for the same instruction. Such a conflict is detected by a gate 608 which selects bit 14 of the read register mask from gate 556 in FIG. 66 when one implied specifier was requested and one will be decoded, and by gate 609 when two specifiers including an implied specifier have been requested and two specifiers will be decoded. The various possible sources of conflict detected by the gates 607, 608 and 609 are combined by an OR gate 610 to detect an implied intra-instruction read conflict.

Once an expressed or implied intra-instruction read conflict is signaled by the gate 602, then the instruction is decoded by decoding only one specifier during each decoding cycle. Only one specifier will be decoded during the current cycle, and if there are any remaining specifiers to be decoded for the instruction, a latch 611 is set to signal that only one specifier will be decoded during each subsequent decoding cycle until the instruction is completely decoded. The end of decoding for the instruction is indicated by the "all specs completed" signal from FIG. 12. In addition, the latch 611 is not set when the instruction buffer is being initially loaded or when there is a decoder fault. Setting of the latch 611 in these cases is inhibited by a gate 612.

Once the latch 611 is set, a gate 613 assures that it remains set until the end of decoding for the current cycle. Another gate 614 assures that the state of the latch 611 will not change in the event of a decoder fault. The outputs of the gates 612, 613 and 614 are combined in an OR gate 615 and applied to the data input of the latch 611. An OR gate 616 combines the output of the latch 611 with an IRC_DETECTED signal from the gate 602 to provide the IRC signal which operates the multiplexer 126 in FIG. 12.

Figure 68:
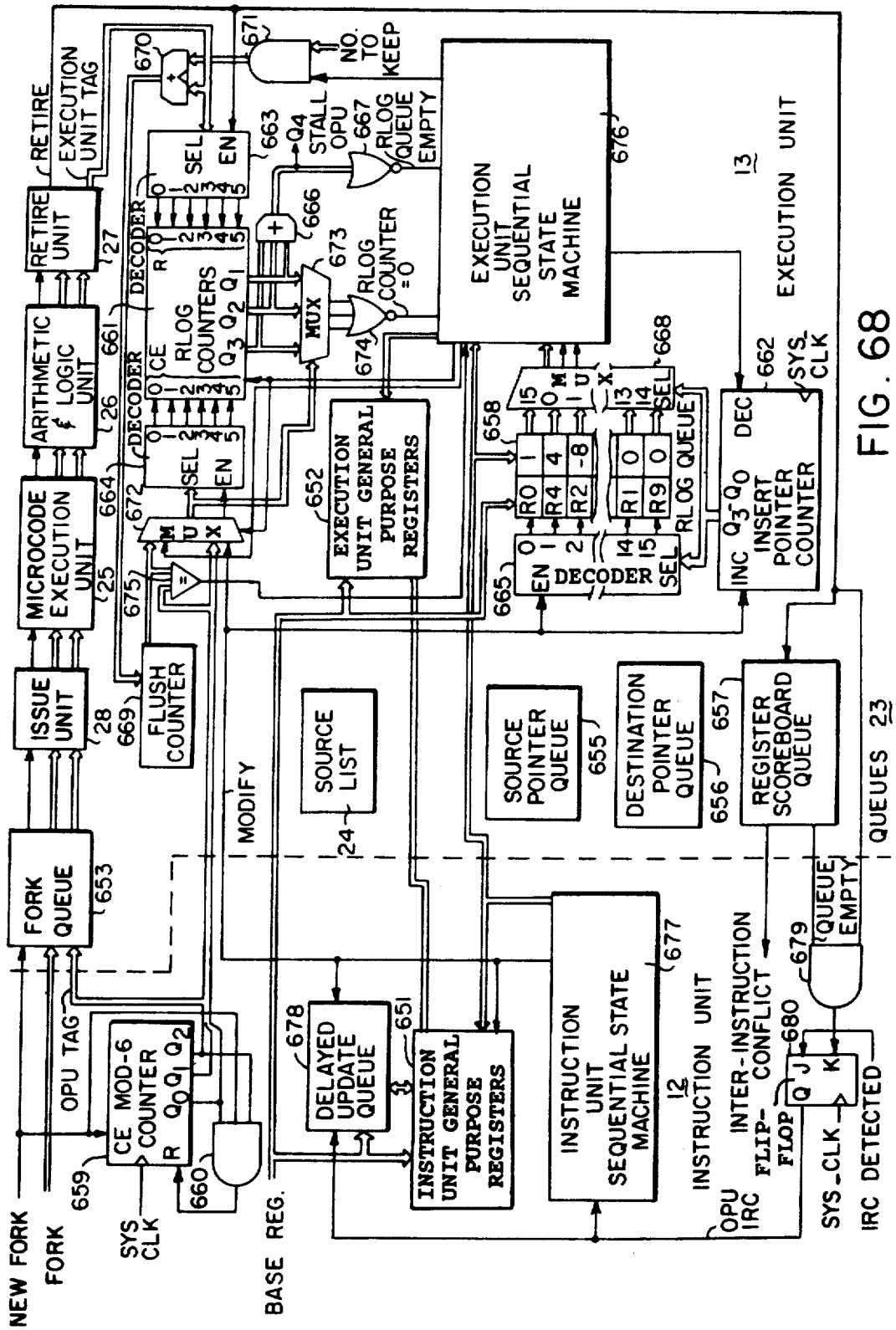
FIG. 68 is a schematic diagram of the circuits in the instruction unit and the execution unit which update respective sets of general purpose registers in the instruction unit and in the execution unit in response to an intra-instruction read conflict detected by the instruction decoder.

Turning now to FIG. 68, there is shown a schematic diagram of the circuits in the instruction unit 12 and the execution unit 13 which update general purpose registers 651 in the instruction unit and a corresponding set of general purpose registers 652 in the execution unit in response to an intra-instruction read conflict detected by the instruction decoder (20 in FIG. 1). As shown in FIG. 68, the data paths between the instruction unit 12 and the execution unit 13 include the source list 24 and a number of queues 23. These queues 23 more specifically include a fork queue 653 receiving the fork or microcode entry address for the instruction just having been decoded, a source pointer queue 655 for receiving register numbers or source list pointers to the source operands having been decoded by the instruction decoder, a destination pointer queue 656 for receiving the register number or address of a destination operand having been decoded by the instruction decoder, and a register scoreboard queue 657.

The register scoreboard queue 657 detects inter-instruction read conflicts between register source operands of previous pre-processed but not yet executed instructions and autoincrement or autodecrement specifiers of the current instruction. The register scoreboard queue 657 also detects inter-instruction conflicts between register destination operands of previous pre-processed but not yet executed instructions and register source operands of the current instruction. To detect any inter-instruction read conflict, the register scoreboard queue receives the composite register read mask generated by the set of gates 555 in FIG. 66 when the "new fork" signal is asserted. To detect any inter-instruction write conflict, the register scoreboard queue also receives a composite register write mask that is generated in a similar fashion to the composite register read mask except that the mask generator is responsive to the destination register information. The register scoreboard queue 657 further includes a set of OR gates for forming the logical OR of all of the masks in the queue to form composite register read and write masks.

The composite register read mask is compared to the base register number of any complex specifier having an autoincrement or autodecrement mode to detect an inter-instruction register read conflict. In a similar fashion, any source register numbers are compared to the composite write register mask to detect any inter-instruction write conflicts. In either case, the register scoreboard queue 657 signals the presence of any inter-instruction register conflict. The construction and operation of the register scoreboard queue 657 is further described in the above referenced Murray et al. U.S. patent application Ser. No. 07/306,793, filed Feb. 3, 1989, and entitled "Multiple Instruction Pre-Processing System With Data Dependency Resolution For Digital Computers," which is incorporated herein by reference.

The instruction unit 12 and the execution unit 13 include the duplicate sets of general purpose registers 651 and 652 so that the specifiers can be evaluated by the instruction unit before they are needed by the execution unit. When the execution unit modifies a general purpose register, the new data are sent to both the execution unit general purpose registers 652 and the instruction unit general purpose registers 651. In the typical case, when the instruction unit modifies a base register in response to evaluation of an autoincrement or autodecrement specifier, both the instruction unit general purpose registers 651 and the execution unit general purpose registers 652 are updated.

In the event of an exception or interrupt, the queues 23 must be flushed of information about instructions which have been decoded but not yet executed. If any of these decoded but not yet executed instructions contain a complex specifier having an autoincrement or autodecrement mode, the register having been modified must be returned to its original state. Therefore, it is desirable for the instruction unit or the execution unit to store information about the changes having been made to the general purpose registers when the registers have been modified by an autoincrement or autodecrement. For storing this information, the execution unit 13 of FIG. 68 is provided with an RLOG queue 658 for storing respective register numbers and the amount that they are modified by.

As shown in FIG. 68, the RLOG queue is full when it stores sixteen entries. Once an instruction having an autoincrement or autodecrement specifier is retired, its corresponding entry must be removed from the RLOG queue 658. Also, since an instruction can have multiple specifiers, each of which could be an autoincrement or autodecrement specifier, it is necessary to permit more than one entry in the RLOG queue to be associated with each instruction. For this purpose, the instruction unit 12 includes a modulo six counter that generates a three-bit tag (OPU TAG) which is appended to the fork for the instruction. A modulo six counter 659, for example, is provided by a three-bit binary counter having its clock enabled by the "new fork" signal, and having a gate 660 for resetting the counter in response to the "new fork" signal when the tag has a value of five. The tag points to one of six three-bit RLOG counters 661 located in the execution unit 13.

The RLOG queue 658 has a four-bit insert pointer counter 662 that is incremented as entries are added to the RLOG queue 658. Also, as an entry is added, the respective RLOG counter is incremented. When an instruction is retired, the RLOG counter corresponding to the tag of the retired instruction (the execution unit tag) is reset. This is done, for example, by a decoder 663 which has outputs connected to respective reset inputs of the RLOG counters 661, and which is enabled by a retire signal from the retire unit 27. In a similar fashion, an encoder 664 has outputs tied to respective clock enable inputs of the RLOG counters 661, and has a select input receiving the OPU tag and an enable input enabled by a MODIFY signal. The MODIFY signal enables a decoder 665 decoding the insert pointer from the insert pointer counter 662 to enable data enable inputs of respective ones of the sixteen data registers in the RLOG queue 658.

The number of valid entries in the RLOG queue is obtained by summing all of the values of the RLOG counters 661 in an adder 666. The most significant bit (Q4) of the sum indicates that there are sixteen entries in the RLOG queue 658, and therefore signals that the RLOG queue is about to overflow. Overflow is prevented by stalling the operand processing unit when the Q4 signal is active. The output bits of the adder 666 are combined in an NOR gate 667 to provide a signal indicating that the RLOG queue is empty.

When an execution or interrupt occur, the RLOG entries are unwound from the RLOG queue. This is done by accessing all of the valid entries in the RLOG queue. The entries can be successively obtained by a multiplexer 668 having a select input receiving the insert pointer counter, and successively decrementing the insert pointer counter. It is desirable in many instances, however, to only discard or flush the instruction and execution unit of data corresponding to a certain number of instructions that were just decoded. This is typically done to permit instructions following a branch instruction before the branch of the branch instruction is actually determined by the execution unit. If it is found that the program execution should have branched, or any prediction for the branch is found to be erroneous, the results of decoding the instructions following the branch must be flushed from the queues 23 and any general purpose registers having been modified by autoincrement or autodecrement specifiers in the instructions following the branch instruction must be returned to their original values. For this purpose, only a certain number of entries in the RLOG queue 658 are obtained from the multiplexer 668 while decrementing the insert pointer counter 662.

In order to determine the particular number of entries to be removed from the RLOG queue 658, there is provided a flush counter 669 which is set to the value of the execution unit tag plus a "number to keep" which specifies the number of instructions which have been correctly decoded and for which their results should be left in the queues 23. The computation is performed by an adder 670, and the number of entries to keep is fed to the adder through a set of gates 671 which are disabled when the queues 23 are to be entirely flushed. During the flushing process, a multiplexer 672 supplies the value of the flush counter to the select input of the decoder 664. Therefore, only the RLOG counters 661 corresponding to the instructions having information to be flushed and registers to be restored are accessed for flushing. In addition, the select input of the decoder 664 is fed to a multiplexer 673 for selecting the value of the respective counter; this value indicates how many entries are to be removed from the RLOG queue 658. The process of flushing and restoring the registers can be done sequentially by testing whether the value of the selected RLOG counter is equal to zero, as determined by a NOR gate 674, and by detecting that the flushing is complete when the value of the flush counter is equal to the value of the OPU tag, as indicated by a comparator 675. The particular steps in the flushing procedure are performed by a sequential state machine 676 in the execution unit. As is conventional, the sequential state machine includes combinational logic and a set of registers for holding the sequential state between cycles of the system clock. In a similar fashion, the instruction unit includes a sequential state machine 677 for updating the instruction unit general purpose registers 651 during the flushing procedure.

The restoration of the general purpose registers is complicated by the need to handle intra-instruction read conflicts. According to the preferred method, once an intra-instruction read conflict is detected, the autoincrement and autodecrement specifiers modify only the instruction unit general purpose registers 651 and the register specifiers are passed as data, instead of pointers, to the execution unit. The instruction unit general purpose registers 651, but not the execution unit general purpose registers 652, are modified during evaluation of the autoincrement and autodecrement specifiers. When the instruction having the intra-instruction register conflict is fully decoded, decoding of the next instruction is temporarily inhibited until the current instruction is retired and the execution unit general purpose registers 652 are updated. For this purpose, the numbers of the registers having been modified after the intra-instruction conflict is detected are stored in a "delayed update queue" 678. Once the instruction is retired, the values of the registers having their numbers stored in the delayed update queue 678 are transmitted to the execution unit general purpose registers 652. An AND gate 679 determines that the current instruction has been retired by qualifying the retire signal from the retire unit 27 with a signal indicating that the register scoreboard queue 657 is empty.

A flush may occur during the decoding of an instruction having an intra-instruction conflict. In order that the flushing procedure need not take into consideration the intra-instruction conflict, when the instruction unit general purpose registers 651 are being modified but the execution unit general purpose registers 652 are not, a modification value of zero is stored in the RLOG queue 658 each time that an instruction unit general purpose register 651 is modified. Therefore, if a flush occurs, the instruction unit general purpose registers 651 are restored to their initial unmodified values by being replaced with the unmodified values stored in the execution unit general purpose registers 652.

Turning now to FIG. 69, there is shown a flowchart of the control procedure executed by the sequential state machine 677 in the instruction unit. Preferably, this sequential state machine, as well as the instruction unit general purpose registers 651, are part of the operand unit (21 in FIG. 1). In a first step 681 of the control procedure, execution branches to step 682 when there is an interrupt, exception or flush. In step 682, the instruction unit general purpose registers 651 are restored with any values received from the execution unit, and the control sequence for the current cycle is finished.

If an interrupt, exception or flush is not pending, then in step 683 the instruction unit sequential state machine 677 checks the inter-instruction conflict signal from the register scoreboard queue 657 and stalls the operand processing unit in step 684 when there is an inter-instruction conflict.

If there is not an inter-instruction conflict, then in step 685 the sequential state machine 677 checks the latch 680 to determine whether there is an intra-instruction conflict pending. If there is an intra-instruction conflict, then in step 686 the OPU tests whether the current specifier is a register specifier. If so, then in step 687 the source list 24 is loaded with the unmodified value of any source register and the source pointer queue 654 is loaded with a pointer to that unmodified value. If the specifier is not a register specifier, then in step 688 the OPU tests whether the current specifier is an autoincrement or autodecrement mode specifier. If so, then in step 689 the instruction unit general purpose register 651 corresponding to the base register number is modified, but a zero modification value is transmitted to the RLOG queue 658 and the execution unit general purpose registers 652. The number of the base register having been modified is stored in the delayed update queue 678. If the current specifier is neither a register specifier nor an auto mode specifier, then in step 690 the OPU evaluates the specifier in the usual fashion as described above in connection with FIGS. 1 and 2.

In step 691, the sequential state machine 677 checks the "new fork" signal to determine whether the current instruction has been entirely decoded. If so, then in step 92 an instruction decoder stall flag is set in order to stall the instruction decoder until the current instruction has been retired and the execution unit general purpose registers are updated.

Once the current instruction is retired, the intra-instruction conflict will no longer be detected in step 685. Then in step 693 the sequential state machine 677 checks whether the delayed update queue is empty. If not, then it contains the numbers of the execution unit general purpose registers 652 that must be updated. In step 694, the next register number in the delayed update queue is obtained and the content of that register in the instruction unit general purpose registers 651 is transmitted to the corresponding execution unit general purpose register 652. In step 695, the sequential state machine 677 checks whether the content of the last general purpose register having been modified is being transmitted to the corresponding execution unit general purpose register 652. If so, then the execution unit general purpose registers will all be restored at the end of the current cycle and therefore in step 696 the flag stalling the instruction decoder is cleared.

If the delayed update queue is empty in step 693, then the operand processing unit operates in its normal fashion. In step 697, any source register numbers are loaded directly into the source list queue 655. In step 698, the instruction unit general purpose register designated by the base of any complex specifier having an autoincrement or autodecrement mode is modified, and the modification is transmitted to the RLOG queue 658 and the general purpose registers 652 in the execution unit 13.

Turning now to FIG. 70, there is shown a flowchart of the control procedure of the sequential state machine 676 in the execution unit. In a first step 711, the sequential state machine 676 checks whether there is an interrupt or exception. If so, then in step 712 the flush counter is set to the value of the execution unit tag. In a similar fashion, if a flush request is detected in step 713, then in step 714 the flush counter 669 is set to the value of the execution unit tag plus the number of decoded but not yet executed instructions to keep.

After step 712 or 714, the sequential state machine 676 checks the output of the gate 667 in order to test in step 715 whether the RLOG queue is empty. If so, then the current cycle of the control procedure in FIG. 70 is finished. Otherwise, at least one of the execution unit general purpose registers 652 has to be restored to a previous value. In step 716, the sequential state machine 676 checks the output of the gate 674 to determine whether the RLOG counter addressed by the flush tag from the flush counter 669 is equal to zero. If so, then the RLOG queue does not have any modification entries for the instruction corresponding to the selected RLOG counter, Therefore, in step 717, the sequential state machine 676 checks the output of the comparator 675 to determine whether the flush tag is equal to the OPU tag, and if so, all of the execution unit general purpose registers 652 have been restored to their previous values before the processing of the instructions being flushed. Otherwise, in step 718, the flush counter is incremented and execution branches back to step 716 to inspect the content of the next RLOG counter.

If in step 716 it is found that the value of the RLOG counter is not equal to zero, then there is at least one corresponding entry in the RLOG queue. In step 719 the RLOG counter is decremented and in step 720 the RLOG queue is read at the entry just before the entry indicated by the insert pointer, and the insert pointer is decremented. Next, in step 721, the value of the execution unit general purpose register addressed by the register number from the RLOG queue is read, and the modification read from the RLOG queue is added to that value of the execution unit register and the sum is stored back in the addressed execution unit general purpose register. The sum and the register number are also transmitted to the instruction unit general purpose registers 651 for restoration of the corresponding general purpose register in the instruction unit. Execution then branches back to step 715 to determine whether any additional general purpose registers must be restored.

If there is neither an interrupt, exception or flush, in step 722 the execution unit checks whether it is receiving register modification information sent by the instruction unit (this is done in steps 687 or 703 of FIG. 69). If register modification information is received, then in step 723 the register modification information is inserted in the RLOG queue, and the RLOG counter selected by the OPU tag is incremented. In step 724 the modification value is tested to determine if it is zero. If so, then the execution unit cycle is finished. Otherwise, in step 725 the execution unit general purpose register addressed by the OPU tag is modified in accordance with the modification information, and the control procedure performed by the sequential state machine 676 is finished.

In view of the above, there has been described an instruction decoder capable of simultaneously decoding two source specifiers and one destination specifier. All three of the specifiers can be register specifiers.. Any one of these specifiers can be a complex specifier designating an index register, a base register and a displacement.

Simultaneous decoding of multiple specifiers causes a peculiar problem of intra-instruction read conflicts. Circuitry for detecting an intra-instruction read conflict has been disclosed as well as an efficient method for handling interrupts, exceptions and flushes that may occur during the processing of an instruction having an intra-instruction read conflict.

APPENDIX I

VAX Instructions Having Implied Specifiers That Should Be Pre-Processed

Copyright © 1989 Digital Equipment Corporation

| MNEMONIC | DESCRIPTION | ARGUMENTS |
|---|---|---|
| BSBB | Branch to subroutine with byte displacement | displ.bb, [−(SP).w1], [Next__PC] |
| BSBW | Branch to subroutine with word displacement | displ.bw, [−(SP).w1], [Next__PC] |
| JSB | Jump to subroutine | dst.ab, [−(SP).w1], [Next__PC] |
| PSHAB | Push address of byte | src.ab, [−(SP).w1] |
| PUSHAD | Push address of double | src.aq, [−(SP).w1] |
| PUSHAF | Push address of floating | src.al, [−(SP).w1] |
| PUSHAL | Push address of long | src.al, [−(SP).w1] |
| PUSHAQ | Push address of quad | src.aq, [−(SP).w1] |
| PUSHAW | Push address of word | src.aw, [−(SP).w1] |
| PUSHL | Push long | src.rl, [−(SP).w1] |
| REI | Return from interrupt or exception | [(SP) + .rl], [(SP) + .rl] |
| RSB | Return from subroutine | [(SP) + .rl] |
| SVPCTX | Save process context | [(SP) + .rl], [(SP) + .rl] |

Note:
Arguments are in the form of a "name" followed by a period, a letter designating the specifier access type and a letter designating the specifier data type. The access types include address (a), branch displacement (b), read (r), and write (w). The data types include byte (b), long (l), word (w), and quad (q). Implied operands, that is, locations accessed by the instruction but not specified in the instruction, are enclosed in brackets. Implied operations that should be pre-processed are underlined.

APPENDIX II

Request Logic - Truth Table
Copyright © 1989 Digital Equipment Corporation

| N | SP3 | SP2 | SP1 | R4 | S4 | I4 | R3 | S3 | I3 | R2 | S2 | I2 | R1 | S1 | I1 | REQ. |
|---|-----|-----|-----|----|----|----|----|----|----|----|----|----|----|----|----|------|
| 0 | X | X | X | X | X | X | X | X | X | X | X | X | X | X | X | 0 |
| 1 | X | X | A | X | X | X | X | X | X | X | X | X | 0 | 0 | 0 | 1 |
|   |   |   |   | X | X | X | X | X | X | 0 | 0 | 0 | Z | Z | 1 | 1 |
|   |   |   |   | X | X | X | X | X | X | Z | Z | 1 | Z | Z | 1 | X |
|   |   |   |   | X | X | X | X | X | X | Z | 1 | Z | Z | Z | 1 | X |
|   |   |   |   | X | X | X | X | X | X | 1 | Z | Z | Z | Z | 1 | X |
|   |   |   |   | X | X | X | X | X | X | X | X | X | Z | 1 | Z | X |
|   |   |   |   | X | X | X | X | X | X | X | X | X | 1 | Z | Z | X |
| 1 | X | X | R | X | X | X | X | X | X | X | X | X | 0 | 0 | 0 | 1 |
|   |   |   |   | X | X | X | X | X | X | 0 | 0 | 0 | Z | Z | 1 | 1 |
|   |   |   |   | X | X | X | X | X | X | Z | Z | 1 | Z | Z | 1 | X |
|   |   |   |   | X | X | X | X | X | X | Z | 1 | Z | Z | Z | 1 | X |
|   |   |   |   | X | X | X | X | X | X | 1 | Z | Z | Z | Z | 1 | X |
|   |   |   |   | X | X | X | X | X | X | X | X | X | Z | 1 | Z | 1 |
|   |   |   |   | X | X | X | X | X | X | X | X | X | 1 | Z | Z | 1 |
| 1 | X | X | M | X | X | X | X | X | X | X | X | X | 0 | 0 | 0 | 1 |
|   |   |   |   | X | X | X | X | X | X | 0 | 0 | 0 | Z | Z | 1 | 1 |
|   |   |   |   | X | X | X | X | X | X | Z | Z | 1 | Z | Z | 1 | X |
|   |   |   |   | X | X | X | X | X | X | Z | 1 | Z | Z | Z | 1 | X |
|   |   |   |   | X | X | X | X | X | X | 1 | Z | Z | Z | Z | 1 | X |
|   |   |   |   | X | X | X | X | X | X | X | X | X | Z | 1 | Z | X |
|   |   |   |   | X | X | X | X | X | X | X | X | X | 1 | Z | Z | 1 |
| 1 | X | X | W | X | X | X | X | X | X | X | X | X | 0 | 0 | 0 | 1 |
|   |   |   |   | X | X | X | X | X | X | 0 | 0 | 0 | Z | Z | 1 | 1 |
|   |   |   |   | X | X | X | X | X | X | Z | Z | 1 | Z | Z | 1 | X |
|   |   |   |   | X | X | X | X | X | X | Z | 1 | Z | Z | Z | 1 | X |
|   |   |   |   | X | X | X | X | X | X | 1 | Z | Z | Z | Z | 1 | X |
|   |   |   |   | X | X | X | X | X | X | X | X | X | Z | 1 | Z | X |
|   |   |   |   | X | X | X | X | X | X | X | X | X | 1 | Z | Z | 1 |
| 1 | X | X | VR | X | X | X | X | X | X | X | X | X | 0 | 0 | 0 | 1 |
|   |   |   |   | X | X | X | X | X | X | 0 | 0 | 0 | Z | Z | 1 | 1 |
|   |   |   |   | X | X | X | X | X | X | Z | Z | 1 | Z | Z | 1 | X |
|   |   |   |   | X | X | X | X | X | X | Z | 1 | Z | Z | Z | 1 | X |
|   |   |   |   | X | X | X | X | X | X | 1 | Z | Z | Z | Z | 1 | X |
|   |   |   |   | X | X | X | X | X | X | X | X | X | Z | 1 | Z | X |
|   |   |   |   | X | X | X | X | X | X | X | X | X | 1 | Z | Z | 1 |
| 1 | X | X | VM | X | X | X | X | X | X | X | X | X | 0 | 0 | 0 | 1 |
|   |   |   |   | X | X | X | X | X | X | 0 | 0 | 0 | Z | Z | 1 | 1 |
|   |   |   |   | X | X | X | X | X | X | Z | Z | 1 | Z | Z | 1 | X |
|   |   |   |   | X | X | X | X | X | X | Z | 1 | Z | Z | Z | 1 | X |
|   |   |   |   | X | X | X | X | X | X | 1 | Z | Z | Z | Z | 1 | X |
|   |   |   |   | X | X | X | X | X | X | X | X | X | Z | 1 | Z | X |
|   |   |   |   | X | X | X | X | X | X | X | X | X | 1 | Z | Z | 1 |
| 1 | X | X | BB | X | X | X | X | X | X | X | X | X | X | X | X | 1BB |
| 1 | X | X | BW | X | X | X | X | X | X | X | X | X | X | X | X | 1BW |
| 1 | X | X | IR | X | X | X | X | X | X | X | X | X | X | X | X | 1I |
| 1 | X | X | IW | X | X | X | X | X | X | X | X | X | X | X | X | 1I |
| 2 | X | A | A | X | X | X | X | X | X | X | X | X | 0 | 0 | 0 | 1 |
|   |   |   |   | X | X | X | X | X | X | 0 | 0 | 0 | Z | Z | 1 | 1 |
|   |   |   |   | X | X | X | X | X | X | Z | Z | 1 | Z | Z | 1 | X |
|   |   |   |   | X | X | X | X | X | X | Z | 1 | Z | Z | Z | 1 | X |
|   |   |   |   | X | X | X | X | X | X | 1 | Z | Z | Z | Z | 1 | X |
|   |   |   |   | X | X | X | X | X | X | X | X | X | Z | 1 | Z | X |
|   |   |   |   | X | X | X | X | X | X | X | X | X | 1 | Z | Z | X |
| 2 | X | IR | A | X | X | X | X | X | X | X | X | X | 0 | 0 | 0 | 1 |
|   |   |   |   | X | X | X | X | X | X | 0 | 0 | 0 | Z | Z | 1 | 1 |
|   |   |   |   | X | X | X | X | X | X | Z | Z | 1 | Z | Z | 1 | X |
|   |   |   |   | X | X | X | X | X | X | Z | 1 | Z | Z | Z | 1 | X |
|   |   |   |   | X | X | X | X | X | X | 1 | Z | Z | Z | Z | 1 | X |
|   |   |   |   | X | X | X | X | X | X | X | X | X | Z | 1 | Z | X |
|   |   |   |   | X | X | X | X | X | X | X | X | X | 1 | Z | Z | X |
| 2 | X | IW | A | X | X | X | X | X | X | X | X | X | 0 | 0 | 0 | 1 |
|   |   |   |   | X | X | X | X | X | X | 0 | 0 | 0 | Z | Z | 1 | 1 |
|   |   |   |   | X | X | X | X | X | X | Z | Z | 1 | Z | Z | 1 | X |
|   |   |   |   | X | X | X | X | X | X | Z | 1 | Z | Z | Z | 1 | X |
|   |   |   |   | X | X | X | X | X | X | 1 | Z | Z | Z | Z | 1 | X |
|   |   |   |   | X | X | X | X | X | X | X | X | X | Z | 1 | Z | X |
|   |   |   |   | X | X | X | X | X | X | X | X | X | 1 | Z | Z | X |
| 2 | X | R | A | X | X | X | X | X | X | X | X | X | 0 | 0 | 0 | 2 |
|   |   |   |   | X | X | X | X | X | X | 0 | 0 | 0 | Z | Z | 1 | 2 |
|   |   |   |   | X | X | X | X | X | X | Z | Z | 1 | Z | Z | 1 | X |
|   |   |   |   | X | X | X | X | X | X | Z | 1 | Z | Z | Z | 1 | X |
|   |   |   |   | X | X | X | X | X | X | 1 | Z | Z | Z | Z | 1 | X |
|   |   |   |   | X | X | X | X | X | X | X | X | X | Z | 1 | Z | X |
|   |   |   |   | X | X | X | X | X | X | X | X | X | 1 | Z | Z | X |
| 2 | X | W | A | X | X | X | X | X | X | X | X | X | 0 | 0 | 0 | 2R |
|   |   |   |   | X | X | X | X | X | X | 0 | 0 | 0 | Z | Z | 1 | 2R |
|   |   |   |   | X | X | X | X | X | X | Z | Z | 1 | Z | Z | 1 | X |
|   |   |   |   | X | X | X | X | X | X | Z | 1 | Z | Z | Z | 1 | X |

APPENDIX II-continued

Request Logic - Truth Table
Copyright © 1989 Digital Equipment Corporation

| N | SP3 | SP2 | SP1 | R4 | S4 | I4 | R3 | S3 | I3 | R2 | S2 | I2 | R1 | S1 | I1 | REQ |
|---|-----|-----|-----|----|----|----|----|----|----|----|----|----|----|----|----|-----|
|   |     |     |     | X | X | X | X | X | X | 1 | Z | Z | Z | Z | 1 | X |
|   |     |     |     | X | X | X | X | X | X | X | X | X | Z | 1 | Z | X |
|   |     |     |     | X | X | X | X | X | X | X | X | X | 1 | Z | Z | X |
| 2 | X | VR | A | X | X | X | X | X | X | X | X | X | 0 | 0 | 0 | 2R |
|   |     |     |     | X | X | X | X | X | X | 0 | 0 | 0 | Z | Z | 1 | 2R |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | X | X | X | Z | 1 | Z | X |
|   |     |     |     | X | X | X | X | X | X | X | X | X | 1 | Z | Z | X |
| 2 | X | A | R | X | X | X | X | X | X | X | X | X | 0 | 0 | 0 | 1 |
|   |     |     |     | X | X | X | X | X | X | 0 | 0 | 0 | Z | Z | 1 | 1 |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 1 |
|   |     |     |     | X | X | X | X | X | X | 1 | Z | Z | Z | 1 | Z | 1 |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 1 |
|   |     |     |     | X | X | X | X | X | X | 1 | Z | Z | 1 | Z | Z | 1 |
| 2 | X | R | R | X | X | X | X | X | X | X | X | X | 0 | 0 | 0 | 2 |
|   |     |     |     | X | X | X | X | X | X | 0 | 0 | 0 | Z | Z | 1 | 2 |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 2 |
|   |     |     |     | X | X | X | X | X | X | 1 | Z | Z | Z | 1 | Z | 2 |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 2 |
|   |     |     |     | X | X | X | X | X | X | 1 | Z | Z | 1 | Z | Z | 2 |
| 2 | X | M | R | X | X | X | X | X | X | X | X | X | 0 | 0 | 0 | 2R |
|   |     |     |     | X | X | X | X | X | X | 0 | 0 | 0 | Z | Z | 1 | 2R |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 1 |
|   |     |     |     | X | X | X | X | X | X | 1 | Z | Z | Z | 1 | Z | 2 |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 1 |
|   |     |     |     | X | X | X | X | X | X | 1 | Z | Z | 1 | Z | Z | 2 |
| 2 | X | W | R | X | X | X | X | X | X | X | X | X | 0 | 0 | 0 | 2R |
|   |     |     |     | X | X | X | X | X | X | 0 | 0 | 0 | Z | Z | 1 | 2R |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 1 |
|   |     |     |     | X | X | X | X | X | X | 1 | Z | Z | Z | 1 | Z | 2 |

APPENDIX II-continued

Request Logic - Truth Table
Copyright © 1989 Digital Equipment Corporation

| N | SP3 | SP2 | SP1 | R4 | S4 | I4 | R3 | S3 | I3 | R2 | S2 | I2 | R1 | S1 | I1 | REQ |
|---|-----|-----|-----|----|----|----|----|----|----|----|----|----|----|----|----|-----|
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 1 |
|   |     |     |     | X | X | X | X | X | X | 1 | Z | Z | 1 | Z | Z | 2 |
| 2 | X | VR | R | X | X | X | X | X | X | X | X | X | 0 | 0 | 0 | 2R |
|   |     |     |     | X | X | X | X | X | X | 0 | 0 | 0 | Z | Z | 1 | 2R |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 1 |
|   |     |     |     | X | X | X | X | X | X | 1 | Z | Z | Z | 1 | Z | 2 |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 1 |
|   |     |     |     | X | X | X | X | X | X | 1 | Z | Z | 1 | Z | Z | 2 |
| 2 | X | VM | R | X | X | X | X | X | X | X | X | X | 0 | 0 | 0 | 2R |
|   |     |     |     | X | X | X | X | X | X | 0 | 0 | 0 | Z | Z | 1 | 2R |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 1 |
|   |     |     |     | X | X | X | X | X | X | 1 | Z | Z | Z | 1 | Z | 2 |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 1 |
|   |     |     |     | X | X | X | X | X | X | 1 | Z | Z | 1 | Z | Z | 2 |
| 2 | X | IR | R | X | X | X | X | X | X | X | X | X | 0 | 0 | 0 | 1 |
|   |     |     |     | X | X | X | X | X | X | 0 | 0 | 0 | Z | Z | 1 | 1 |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | X | X | X | Z | 1 | Z | 2I |
|   |     |     |     | X | X | X | X | X | X | X | X | X | 1 | Z | Z | 2I |
| 2 | X | IW | R | X | X | X | X | X | X | X | X | X | 0 | 0 | 0 | 1 |
|   |     |     |     | X | X | X | X | X | X | 0 | 0 | 0 | Z | Z | 1 | 1 |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | X | X | X | Z | 1 | Z | 2I |
|   |     |     |     | X | X | X | X | X | X | X | X | X | 1 | Z | Z | 2I |
| 2 | X | BB | R | X | X | X | X | X | X | X | X | X | 0 | 0 | 0 | 2 |
|   |     |     |     | X | X | X | X | X | X | 0 | 0 | 0 | Z | Z | 1 | 2 |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | X | X | X | Z | 1 | Z | 2BB |
|   |     |     |     | X | X | X | X | X | X | X | X | X | 1 | Z | Z | 2BB |
| 2 | X | BB | M | X | X | X | X | X | X | X | X | X | 0 | 0 | 0 | 1 |
|   |     |     |     | X | X | X | X | X | X | 0 | 0 | 0 | Z | Z | 1 | 1 |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | X | X | X | Z | 1 | Z | X |
|   |     |     |     | X | X | X | X | X | X | X | X | X | 1 | Z | Z | 2BB |
| 2 | X | BW | M | X | X | X | X | X | X | X | X | X | 0 | 0 | 0 | 1 |
|   |     |     |     | X | X | X | X | X | X | 0 | 0 | 0 | Z | Z | 1 | 1 |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | X | X | X | Z | 1 | Z | X |

APPENDIX II-continued

Request Logic - Truth Table
Copyright © 1989 Digital Equipment Corporation

| N | SP3 | SP2 | SP1 | R4 | S4 | I4 | R3 | S3 | I3 | R2 | S2 | I2 | R1 | S1 | I1 | REQ. |
|---|-----|-----|-----|----|----|----|----|----|----|----|----|----|----|----|----|------|
|   |     |     |     | X  | X  | X  | X  | X  | X  | X  | X  | X  | 1  | Z  | Z  | 2BW  |
| 2 | X   | M   | W   | X  | X  | X  | X  | X  | X  | X  | X  | X  | 0  | 0  | 0  | 1    |
|   |     |     |     | X  | X  | X  | X  | X  | X  | 0  | 0  | 0  | Z  | Z  | 1  | 1    |
|   |     |     |     | X  | X  | X  | X  | X  | X  | Z  | Z  | 1  | Z  | Z  | 1  | X    |
|   |     |     |     | X  | X  | X  | X  | X  | X  | Z  | 1  | Z  | Z  | Z  | 1  | X    |
|   |     |     |     | X  | X  | X  | X  | X  | X  | 1  | Z  | Z  | Z  | Z  | 1  | X    |
|   |     |     |     | X  | X  | X  | X  | X  | X  | X  | X  | X  | Z  | 1  | Z  | X    |
|   |     |     |     | X  | X  | X  | X  | X  | X  | X  | X  | X  | 1  | Z  | Z  | 1    |
| 2 | X   | R   | VR  | X  | X  | X  | X  | X  | X  | X  | X  | X  | 0  | 0  | 0  | 2    |
|   |     |     |     | X  | X  | X  | X  | X  | X  | 0  | 0  | 0  | Z  | Z  | 1  | 2    |
|   |     |     |     | X  | X  | X  | X  | X  | X  | Z  | Z  | 1  | Z  | Z  | 1  | X    |
|   |     |     |     | X  | X  | X  | X  | X  | X  | Z  | 1  | Z  | Z  | Z  | 1  | X    |
|   |     |     |     | X  | X  | X  | X  | X  | X  | 1  | Z  | Z  | Z  | Z  | 1  | X    |
|   |     |     |     | X  | X  | X  | X  | X  | X  | X  | X  | X  | Z  | 1  | Z  | X    |
|   |     |     |     | X  | X  | X  | X  | X  | X  | 0  | 0  | 0  | 1  | Z  | Z  | 2    |
|   |     |     |     | X  | X  | X  | 0  | 0  | 0  | Z  | Z  | 1  | 1  | Z  | Z  | 2    |
|   |     |     |     | X  | X  | X  | Z  | Z  | 1  | Z  | Z  | 1  | 1  | Z  | Z  | 1    |
|   |     |     |     | X  | X  | X  | Z  | 1  | Z  | Z  | Z  | 1  | 1  | Z  | Z  | 1    |
|   |     |     |     | X  | X  | X  | 1  | Z  | Z  | Z  | Z  | 1  | 1  | Z  | Z  | 1    |
|   |     |     |     | X  | X  | X  | X  | X  | X  | Z  | 1  | Z  | 1  | Z  | Z  | 2    |
|   |     |     |     | X  | X  | X  | X  | X  | X  | 1  | Z  | Z  | 1  | Z  | Z  | 2    |
| 2 | X   | W   | VR  | X  | X  | X  | X  | X  | X  | X  | X  | X  | 0  | 0  | 0  | 2R   |
|   |     |     |     | X  | X  | X  | X  | X  | X  | 0  | 0  | 0  | Z  | Z  | 1  | 2R   |
|   |     |     |     | X  | X  | X  | X  | X  | X  | Z  | Z  | 1  | Z  | Z  | 1  | X    |
|   |     |     |     | X  | X  | X  | X  | X  | X  | Z  | 1  | Z  | Z  | Z  | 1  | X    |
|   |     |     |     | X  | X  | X  | X  | X  | X  | 1  | Z  | Z  | Z  | Z  | 1  | X    |
|   |     |     |     | X  | X  | X  | X  | X  | X  | X  | X  | X  | Z  | 1  | Z  | X    |
|   |     |     |     | X  | X  | X  | X  | X  | X  | 0  | 0  | 0  | 1  | Z  | Z  | 2    |
|   |     |     |     | X  | X  | X  | 0  | 0  | 0  | Z  | Z  | 1  | 1  | Z  | Z  | 2    |
|   |     |     |     | X  | X  | X  | Z  | Z  | 1  | Z  | Z  | 1  | 1  | Z  | Z  | 1    |
|   |     |     |     | X  | X  | X  | Z  | 1  | Z  | Z  | Z  | 1  | 1  | Z  | Z  | 1    |
|   |     |     |     | X  | X  | X  | 1  | Z  | Z  | Z  | Z  | 1  | 1  | Z  | Z  | 1    |
|   |     |     |     | X  | X  | X  | X  | X  | X  | Z  | 1  | Z  | 1  | Z  | Z  | 1    |
|   |     |     |     | X  | X  | X  | X  | X  | X  | 1  | Z  | Z  | 1  | Z  | Z  | 2    |
| 2 | X   | BB  | VR  | X  | X  | X  | X  | X  | X  | X  | X  | X  | 0  | 0  | 0  | 1    |
|   |     |     |     | X  | X  | X  | X  | X  | X  | 0  | 0  | 0  | Z  | Z  | 1  | 1    |
|   |     |     |     | X  | X  | X  | X  | X  | X  | Z  | Z  | 1  | Z  | Z  | 1  | X    |
|   |     |     |     | X  | X  | X  | X  | X  | X  | Z  | 1  | Z  | Z  | Z  | 1  | X    |
|   |     |     |     | X  | X  | X  | X  | X  | X  | 1  | Z  | Z  | Z  | Z  | 1  | X    |
|   |     |     |     | X  | X  | X  | X  | X  | X  | X  | X  | X  | Z  | 1  | Z  | X    |
|   |     |     |     | X  | X  | X  | X  | X  | X  | X  | X  | X  | 1  | Z  | Z  | 2BB  |
| 2 | X   | BB  | VM  | X  | X  | X  | X  | X  | X  | X  | X  | X  | 0  | 0  | 0  | 1    |
|   |     |     |     | X  | X  | X  | X  | X  | X  | 0  | 0  | 0  | Z  | Z  | 1  | 1    |
|   |     |     |     | X  | X  | X  | X  | X  | X  | Z  | Z  | 1  | Z  | Z  | 1  | X    |
|   |     |     |     | X  | X  | X  | X  | X  | X  | Z  | 1  | Z  | Z  | Z  | 1  | X    |
|   |     |     |     | X  | X  | X  | X  | X  | X  | 1  | Z  | Z  | Z  | Z  | 1  | X    |
|   |     |     |     | X  | X  | X  | X  | X  | X  | X  | X  | X  | Z  | 1  | Z  | X    |
|   |     |     |     | X  | X  | X  | X  | X  | X  | X  | X  | X  | 1  | Z  | Z  | 2BB  |
| 2 | X   | X   | BB  | X  | X  | X  | X  | X  | X  | X  | X  | X  | X  | X  | X  | 1BB  |
| 2 | X   | X   | BW  | X  | X  | X  | X  | X  | X  | X  | X  | X  | X  | X  | X  | 1BW  |
| 2 | X   | X   | IR  | X  | X  | X  | X  | X  | X  | X  | X  | X  | X  | X  | X  | I1   |
| 2 | X   | X   | IW  | X  | X  | X  | X  | X  | X  | X  | X  | X  | X  | X  | X  | I1   |
| 3 | A   | A   | A   | X  | X  | X  | X  | X  | X  | X  | X  | X  | 0  | 0  | 0  | 1    |
|   |     |     |     | X  | X  | X  | X  | X  | X  | 0  | 0  | 0  | Z  | Z  | 1  | 1    |
|   |     |     |     | X  | X  | X  | X  | X  | X  | Z  | Z  | 1  | Z  | Z  | 1  | X    |
|   |     |     |     | X  | X  | X  | X  | X  | X  | Z  | 1  | Z  | Z  | Z  | 1  | X    |
|   |     |     |     | X  | X  | X  | X  | X  | X  | 1  | Z  | Z  | Z  | Z  | 1  | X    |
|   |     |     |     | X  | X  | X  | X  | X  | X  | X  | X  | X  | Z  | 1  | Z  | X    |
|   |     |     |     | X  | X  | X  | X  | X  | X  | X  | X  | X  | 1  | Z  | Z  | X    |
| 2 | R   | A   | A   | X  | X  | X  | X  | X  | X  | X  | X  | X  | 0  | 0  | 0  | 1    |
|   |     |     |     | X  | X  | X  | X  | X  | X  | 0  | 0  | 0  | Z  | Z  | 1  | 1    |
|   |     |     |     | X  | X  | X  | X  | X  | X  | Z  | Z  | 1  | Z  | Z  | 1  | X    |
|   |     |     |     | X  | X  | X  | X  | X  | X  | Z  | 1  | Z  | Z  | Z  | 1  | X    |
|   |     |     |     | X  | X  | X  | X  | X  | X  | 1  | Z  | Z  | Z  | Z  | 1  | X    |
|   |     |     |     | X  | X  | X  | X  | X  | X  | X  | X  | X  | Z  | 1  | Z  | X    |
|   |     |     |     | X  | X  | X  | X  | X  | X  | X  | X  | X  | 1  | Z  | Z  | X    |
| 3 | IR  | A   | A   | X  | X  | X  | X  | X  | X  | X  | X  | X  | 0  | 0  | 0  | 1    |
|   |     |     |     | X  | X  | X  | X  | X  | X  | 0  | 0  | 0  | Z  | Z  | 1  | 1    |
|   |     |     |     | X  | X  | X  | X  | X  | X  | Z  | Z  | 1  | Z  | Z  | 1  | X    |
|   |     |     |     | X  | X  | X  | X  | X  | X  | Z  | 1  | Z  | Z  | Z  | 1  | X    |
|   |     |     |     | X  | X  | X  | X  | X  | X  | 1  | Z  | Z  | Z  | Z  | 1  | X    |
|   |     |     |     | X  | X  | X  | X  | X  | X  | X  | X  | X  | Z  | 1  | Z  | X    |
|   |     |     |     | X  | X  | X  | X  | X  | X  | X  | X  | X  | 1  | Z  | Z  | X    |
| 3 | A   | R   | A   | X  | X  | X  | X  | X  | X  | X  | X  | X  | 0  | 0  | 0  | 2    |
|   |     |     |     | X  | X  | X  | X  | X  | X  | 0  | 0  | 0  | Z  | Z  | 1  | 2    |
|   |     |     |     | X  | X  | X  | X  | X  | X  | Z  | Z  | 1  | Z  | Z  | 1  | X    |
|   |     |     |     | X  | X  | X  | X  | X  | X  | Z  | 1  | Z  | Z  | Z  | 1  | X    |
|   |     |     |     | X  | X  | X  | X  | X  | X  | 1  | Z  | Z  | Z  | Z  | 1  | X    |
|   |     |     |     | X  | X  | X  | X  | X  | X  | X  | X  | X  | Z  | 1  | Z  | X    |

APPENDIX II-continued

Request Logic - Truth Table
Copyright © 1989 Digital Equipment Corporation

| N | SP3 | SP2 | SP1 | R4 | S4 | I4 | R3 | S3 | I3 | R2 | S2 | I2 | R1 | S1 | I1 | REQ. |
|---|-----|-----|-----|----|----|----|----|----|----|----|----|----|----|----|----|------|
|   |     |     |     | X  | X  | X  | X  | X  | X  | X  | X  | X  | 1  | Z  | Z  | X    |
| 3 | R   | R   | A   | X  | X  | X  | X  | X  | X  | X  | X  | X  | 0  | 0  | 0  | 2    |
|   |     |     |     | X  | X  | X  | X  | X  | X  | 0  | 0  | 0  | Z  | Z  | 1  | 2    |
|   |     |     |     | X  | X  | X  | X  | X  | X  | Z  | Z  | 1  | Z  | Z  | 1  | X    |
|   |     |     |     | X  | X  | X  | X  | X  | X  | Z  | 1  | Z  | Z  | Z  | 1  | X    |
|   |     |     |     | X  | X  | X  | X  | X  | X  | 1  | Z  | Z  | Z  | Z  | 1  | X    |
|   |     |     |     | X  | X  | X  | X  | X  | X  | X  | X  | X  | Z  | 1  | Z  | X    |
|   |     |     |     | X  | X  | X  | X  | X  | X  | X  | X  | X  | 1  | Z  | Z  | X    |
| 3 | IR  | IW  | A   | X  | X  | X  | X  | X  | X  | X  | X  | X  | 0  | 0  | 0  | 1    |
|   |     |     |     | X  | X  | X  | X  | X  | X  | 0  | 0  | 0  | Z  | Z  | 1  | 1    |
|   |     |     |     | X  | X  | X  | X  | X  | X  | Z  | Z  | 1  | Z  | Z  | 1  | X    |
|   |     |     |     | X  | X  | X  | X  | X  | X  | Z  | 1  | Z  | Z  | Z  | 1  | X    |
|   |     |     |     | X  | X  | X  | X  | X  | X  | 1  | Z  | Z  | Z  | Z  | 1  | X    |
|   |     |     |     | X  | X  | X  | X  | X  | X  | X  | X  | X  | Z  | 1  | Z  | X    |
|   |     |     |     | X  | X  | X  | X  | X  | X  | X  | X  | X  | 1  | Z  | Z  | X    |
| 3 | A   | A   | R   | X  | X  | X  | X  | X  | X  | X  | X  | X  | 0  | 0  | 0  | 1    |
|   |     |     |     | X  | X  | X  | X  | X  | X  | 0  | 0  | 0  | Z  | Z  | 1  | 1    |
|   |     |     |     | X  | X  | X  | X  | X  | X  | Z  | Z  | 1  | Z  | Z  | 1  | X    |
|   |     |     |     | X  | X  | X  | X  | X  | X  | Z  | 1  | Z  | Z  | Z  | 1  | X    |
|   |     |     |     | X  | X  | X  | X  | X  | X  | 1  | Z  | Z  | Z  | Z  | 1  | X    |
|   |     |     |     | X  | X  | X  | X  | X  | X  | 0  | 0  | 0  | Z  | 1  | Z  | 2    |
|   |     |     |     | X  | X  | X  | 0  | 0  | 0  | Z  | Z  | 1  | Z  | 1  | Z  | 2    |
|   |     |     |     | X  | X  | X  | Z  | Z  | 1  | Z  | Z  | 1  | Z  | 1  | Z  | 1    |
|   |     |     |     | X  | X  | X  | Z  | 1  | Z  | Z  | Z  | 1  | Z  | 1  | Z  | 1    |
|   |     |     |     | X  | X  | X  | 1  | Z  | Z  | Z  | Z  | 1  | Z  | 1  | Z  | 1    |
|   |     |     |     | X  | X  | X  | X  | X  | X  | Z  | 1  | Z  | Z  | 1  | Z  | 1    |
|   |     |     |     | X  | X  | X  | X  | X  | X  | 1  | Z  | Z  | Z  | 1  | Z  | 1    |
|   |     |     |     | X  | X  | X  | X  | X  | X  | 0  | 0  | 0  | 1  | Z  | Z  | 2    |
|   |     |     |     | X  | X  | X  | 0  | 0  | 0  | Z  | Z  | 1  | 1  | Z  | Z  | 2    |
|   |     |     |     | X  | X  | X  | Z  | Z  | 1  | Z  | Z  | 1  | 1  | Z  | Z  | 1    |
|   |     |     |     | X  | X  | X  | Z  | 1  | Z  | Z  | Z  | 1  | 1  | Z  | Z  | 1    |
|   |     |     |     | X  | X  | X  | 1  | Z  | Z  | Z  | Z  | 1  | 1  | Z  | Z  | 1    |
|   |     |     |     | X  | X  | X  | X  | X  | X  | Z  | 1  | Z  | 1  | Z  | Z  | 1    |
|   |     |     |     | X  | X  | X  | X  | X  | X  | 1  | Z  | Z  | 1  | Z  | Z  | 1    |
| 3 | R   | A   | R   | X  | X  | X  | X  | X  | X  | X  | X  | X  | 0  | 0  | 0  | 1    |
|   |     |     |     | X  | X  | X  | X  | X  | X  | 0  | 0  | 0  | Z  | Z  | 1  | 1    |
|   |     |     |     | X  | X  | X  | X  | X  | X  | Z  | Z  | 1  | Z  | Z  | 1  | X    |
|   |     |     |     | X  | X  | X  | X  | X  | X  | Z  | 1  | Z  | Z  | Z  | 1  | X    |
|   |     |     |     | X  | X  | X  | X  | X  | X  | 1  | Z  | Z  | Z  | Z  | 1  | X    |
|   |     |     |     | X  | X  | X  | X  | X  | X  | 0  | 0  | 0  | Z  | 1  | Z  | 2    |
|   |     |     |     | X  | X  | X  | 0  | 0  | 0  | Z  | Z  | 1  | Z  | 1  | Z  | 2    |
|   |     |     |     | X  | X  | X  | Z  | Z  | 1  | Z  | Z  | 1  | Z  | 1  | Z  | 1    |
|   |     |     |     | X  | X  | X  | Z  | 1  | Z  | Z  | Z  | 1  | Z  | 1  | Z  | 1    |
|   |     |     |     | X  | X  | X  | 1  | Z  | Z  | Z  | Z  | 1  | Z  | 1  | Z  | 1    |
|   |     |     |     | X  | X  | X  | X  | X  | X  | Z  | 1  | Z  | Z  | 1  | Z  | 1    |
|   |     |     |     | X  | X  | X  | X  | X  | X  | 1  | Z  | Z  | Z  | 1  | Z  | 1    |
|   |     |     |     | X  | X  | X  | X  | X  | X  | 0  | 0  | 0  | 1  | Z  | Z  | 2    |
|   |     |     |     | X  | X  | X  | 0  | 0  | 0  | Z  | Z  | 1  | 1  | Z  | Z  | 2    |
|   |     |     |     | X  | X  | X  | Z  | Z  | 1  | Z  | Z  | 1  | 1  | Z  | Z  | 1    |
|   |     |     |     | X  | X  | X  | Z  | 1  | Z  | Z  | Z  | 1  | 1  | Z  | Z  | 1    |
|   |     |     |     | X  | X  | X  | 1  | Z  | Z  | Z  | Z  | 1  | 1  | Z  | Z  | 1    |
|   |     |     |     | X  | X  | X  | X  | X  | X  | Z  | 1  | Z  | 1  | Z  | Z  | 1    |
|   |     |     |     | X  | X  | X  | X  | X  | X  | 1  | Z  | Z  | 1  | Z  | Z  | 1    |
| 3 | W   | A   | R   | X  | X  | X  | X  | X  | X  | X  | X  | X  | 0  | 0  | 0  | 1    |
|   |     |     |     | X  | X  | X  | X  | X  | X  | 0  | 0  | 0  | Z  | Z  | 1  | 1    |
|   |     |     |     | X  | X  | X  | X  | X  | X  | Z  | Z  | 1  | Z  | Z  | 1  | X    |
|   |     |     |     | X  | X  | X  | X  | X  | X  | Z  | 1  | Z  | Z  | 1  | X  |      |
|   |     |     |     | X  | X  | X  | X  | X  | X  | 1  | Z  | Z  | Z  | Z  | 1  | X    |
|   |     |     |     | X  | X  | X  | X  | X  | X  | 0  | 0  | 0  | Z  | 1  | Z  | 2    |
|   |     |     |     | X  | X  | X  | 0  | 0  | 0  | Z  | Z  | 1  | Z  | 1  | Z  | 2    |
|   |     |     |     | X  | X  | X  | Z  | Z  | 1  | Z  | Z  | 1  | Z  | 1  | Z  | 1    |
|   |     |     |     | X  | X  | X  | Z  | 1  | Z  | Z  | Z  | 1  | Z  | 1  | Z  | 1    |
|   |     |     |     | X  | X  | X  | 1  | Z  | Z  | Z  | Z  | 1  | Z  | 1  | Z  | 1    |
|   |     |     |     | X  | X  | X  | X  | X  | X  | Z  | 1  | Z  | Z  | 1  | Z  | 1    |
|   |     |     |     | X  | X  | X  | X  | X  | X  | 1  | Z  | Z  | Z  | 1  | Z  | 1    |
|   |     |     |     | X  | X  | X  | X  | X  | X  | 0  | 0  | 0  | 1  | Z  | Z  | 2    |
|   |     |     |     | X  | X  | X  | 0  | 0  | 0  | Z  | Z  | 1  | 1  | Z  | Z  | 2    |
|   |     |     |     | X  | X  | X  | Z  | Z  | 1  | Z  | Z  | 1  | 1  | Z  | Z  | 1    |
|   |     |     |     | X  | X  | X  | Z  | 1  | Z  | Z  | Z  | 1  | 1  | Z  | Z  | 1    |
|   |     |     |     | X  | X  | X  | 1  | Z  | Z  | Z  | Z  | 1  | 1  | Z  | Z  | 1    |
|   |     |     |     | X  | X  | X  | X  | X  | X  | Z  | 1  | Z  | 1  | Z  | Z  | 1    |
|   |     |     |     | X  | X  | X  | X  | X  | X  | 1  | Z  | Z  | 1  | Z  | Z  | 1    |
| 3 | IR  | A   | R   | X  | X  | X  | X  | X  | X  | X  | X  | X  | 0  | 0  | 0  | 1    |
|   |     |     |     | X  | X  | X  | X  | X  | X  | 0  | 0  | 0  | Z  | Z  | 1  | 1    |
|   |     |     |     | X  | X  | X  | X  | X  | X  | Z  | Z  | 1  | Z  | Z  | 1  | X    |
|   |     |     |     | X  | X  | X  | X  | X  | X  | Z  | 1  | Z  | Z  | Z  | 1  | X    |
|   |     |     |     | X  | X  | X  | X  | X  | X  | 1  | Z  | Z  | Z  | Z  | 1  | X    |
|   |     |     |     | X  | X  | X  | X  | X  | X  | 0  | 0  | 0  | Z  | 1  | Z  | 2    |
|   |     |     |     | X  | X  | X  | 0  | 0  | 0  | Z  | Z  | 1  | Z  | 1  | Z  | 2    |

APPENDIX II-continued

Request Logic - Truth Table
Copyright © 1989 Digital Equipment Corporation

| N | SP3 | SP2 | SP1 | R4 | S4 | I4 | R3 | S3 | I3 | R2 | S2 | I2 | R1 | S1 | I1 | REQ. |
|---|-----|-----|-----|----|----|----|----|----|----|----|----|----|----|----|----|------|
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 1 |
|   |     |     |     | X | X | X | X | X | X | 1 | Z | Z | Z | 1 | Z | 1 |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 1 |
|   |     |     |     | X | X | X | X | X | X | 1 | Z | Z | 1 | Z | Z | 1 |
| 3 | A | R | R | X | X | X | X | X | X | X | X | X | 0 | 0 | 0 | 2 |
|   |     |     |     | X | X | X | X | X | X | 0 | 0 | 0 | Z | Z | 1 | 2 |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 2 |
|   |     |     |     | X | X | X | X | X | X | 1 | Z | Z | Z | 1 | Z | 2 |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 2 |
|   |     |     |     | X | X | X | X | X | X | 1 | Z | Z | 1 | Z | Z | 2 |
| 3 | R | R | R | X | X | X | X | X | X | X | X | X | 0 | 0 | 0 | 2 |
|   |     |     |     | X | X | X | X | X | X | 0 | 0 | 0 | Z | Z | 1 | 2 |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 2 |
|   |     |     |     | X | X | X | X | X | X | 1 | Z | Z | Z | 1 | Z | 2 |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 2 |
|   |     |     |     | X | X | X | X | X | X | 1 | Z | Z | 1 | Z | Z | 2 |
| 3 | M | R | R | X | X | X | X | X | X | X | X | X | 0 | 0 | 0 | 2 |
|   |     |     |     | X | X | X | X | X | X | 0 | 0 | 0 | Z | Z | 1 | 2 |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 2 |
|   |     |     |     | X | X | X | X | X | X | 1 | Z | Z | Z | 1 | Z | 2 |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 2 |
|   |     |     |     | X | X | X | X | X | X | 1 | Z | Z | 1 | Z | Z | 2 |
| 3 | VR | R | R | X | X | X | X | X | X | X | X | X | 0 | 0 | 0 | 2 |
|   |     |     |     | X | X | X | X | X | X | 0 | 0 | 0 | Z | Z | 1 | 2 |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |

APPENDIX II-continued

Request Logic - Truth Table
Copyright © 1989 Digital Equipment Corporation

| N | SP3 | SP2 | SP1 | R4 | S4 | I4 | R3 | S3 | I3 | R2 | S2 | I2 | R1 | S1 | I1 | REQ. |
|---|-----|-----|-----|----|----|----|----|----|----|----|----|----|----|----|----|------|
|   |     |     |     | X | X | X | X | X | X | Z | 1 | Z | Z | 1 | Z | 2 |
|   |     |     |     | X | X | X | X | X | X | 1 | Z | Z | Z | 1 | Z | 2 |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 2 |
|   |     |     |     | X | X | X | X | X | X | 1 | Z | Z | 1 | Z | Z | 2 |
| 3 | VM  | R   | R   | X | X | X | X | X | X | X | X | X | 0 | 0 | 0 | 2 |
|   |     |     |     | X | X | X | X | X | X | 0 | 0 | 0 | Z | Z | 1 | 2 |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 2 |
|   |     |     |     | X | X | X | X | X | X | 1 | Z | Z | Z | 1 | Z | 2 |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 2 |
|   |     |     |     | X | X | X | X | X | X | 1 | Z | Z | 1 | Z | Z | 2 |
| 3 | IR  | R   | R   | X | X | X | X | X | X | X | X | X | 0 | 0 | 0 | 2 |
|   |     |     |     | X | X | X | X | X | X | 0 | 0 | 0 | Z | Z | 1 | 2 |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 2 |
|   |     |     |     | X | X | X | X | X | X | 1 | Z | Z | Z | 1 | Z | 2 |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 2 |
|   |     |     |     | X | X | X | X | X | X | 1 | Z | Z | 1 | Z | Z | 2 |
| 3 | W   | R   | R   | X | X | X | X | X | X | X | X | X | 0 | 0 | 0 | 3XR |
|   |     |     |     | X | X | X | X | X | X | 0 | 0 | 0 | Z | Z | 1 | 3XR |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 3XR |
|   |     |     |     | X | X | X | 0 | 0 | 0 | Z | Z | 1 | Z | 1 | Z | 3XR |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | Z | 1 | Z | Z | 1 | Z | 1 |
|   |     |     |     | X | X | X | 0 | 0 | 0 | 1 | Z | Z | Z | 1 | Z | 3 |
|   |     |     |     | 0 | 0 | 0 | Z | Z | 1 | 1 | Z | Z | Z | 1 | Z | 3 |
|   |     |     |     | Z | Z | 1 | Z | Z | 1 | 1 | Z | Z | Z | 1 | Z | 2* |
|   |     |     |     | Z | 1 | Z | Z | Z | 1 | 1 | Z | Z | Z | 1 | Z | 2* |
|   |     |     |     | 1 | Z | Z | Z | Z | 1 | 1 | Z | Z | Z | 1 | Z | 2* |
|   |     |     |     | X | X | X | Z | 1 | Z | 1 | Z | Z | Z | 1 | Z | 2* |
|   |     |     |     | X | X | X | 1 | Z | Z | 1 | Z | Z | Z | 1 | Z | 3 |
|   |     |     |     | X | X | X | X | X | X | 0 | 0 | 0 | 1 | Z | Z | 3XR |
|   |     |     |     | X | X | X | 0 | 0 | 0 | Z | Z | 1 | 1 | Z | Z | 3XR |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | 0 | 0 | 0 | Z | 1 | Z | 1 | Z | Z | 3 |
|   |     |     |     | 0 | 0 | 0 | Z | Z | 1 | Z | 1 | Z | 1 | Z | Z | 3 |
|   |     |     |     | Z | Z | 1 | Z | Z | 1 | Z | 1 | Z | 1 | Z | Z | 2* |
|   |     |     |     | Z | 1 | Z | Z | Z | 1 | Z | 1 | Z | 1 | Z | Z | 2* |
|   |     |     |     | 1 | Z | Z | Z | Z | 1 | Z | 1 | Z | 1 | Z | Z | 2* |
|   |     |     |     | X | X | X | Z | 1 | Z | Z | 1 | Z | 1 | Z | Z | 2* |
|   |     |     |     | X | X | X | 1 | Z | Z | Z | 1 | Z | 1 | Z | Z | 3 |
|   |     |     |     | X | X | X | 0 | 0 | 0 | 1 | Z | Z | 1 | Z | Z | 3 |
|   |     |     |     | 0 | 0 | 0 | Z | Z | 1 | 1 | Z | Z | 1 | Z | Z | 3 |

APPENDIX II-continued

Request Logic - Truth Table
Copyright © 1989 Digital Equipment Corporation

| N | SP3 | SP2 | SP1 | R4 | S4 | I4 | R3 | S3 | I3 | R2 | S2 | I2 | R1 | S1 | I1 | REQ. |
|---|-----|-----|-----|----|----|----|----|----|----|----|----|----|----|----|----|------|
|   |     |     |     | Z | Z | 1 | Z | Z | 1 | 1 | Z | Z | 1 | Z | Z | 2* |
|   |     |     |     | Z | 1 | Z | Z | Z | 1 | 1 | Z | Z | 1 | Z | Z | 2* |
|   |     |     |     | 1 | Z | Z | Z | Z | 1 | 1 | Z | Z | 1 | Z | Z | 2* |
|   |     |     |     | X | X | X | Z | 1 | Z | 1 | Z | Z | 1 | Z | Z | 2* |
|   |     |     |     | X | X | X | 1 | Z | Z | 1 | Z | Z | 1 | Z | Z | 3 |
| 3 | BB  | M   | R   | X | X | X | X | X | X | X | X | 0 | 0 | 0 | 0 | 2R |
|   |     |     |     | X | X | X | X | X | X | 0 | 0 | 0 | Z | Z | 1 | 2R |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 1 |
|   |     |     |     | X | X | X | X | X | X | 1 | Z | Z | Z | 1 | Z | 3BB |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 1 |
|   |     |     |     | X | X | X | X | X | X | 1 | Z | Z | 1 | Z | Z | 3BB |
| 3 | BW  | M   | R   | X | X | X | X | X | X | X | X | 0 | 0 | 0 | 0 | 2R |
|   |     |     |     | X | X | X | X | X | X | 0 | 0 | 0 | Z | Z | 1 | 2R |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 1 |
|   |     |     |     | X | X | X | X | X | X | 1 | Z | Z | Z | 1 | Z | 3BW |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 1 |
|   |     |     |     | X | X | X | X | X | X | 1 | Z | Z | 1 | Z | Z | 3BR |
| 3 | M   | W   | R   | X | X | X | X | X | X | X | X | 0 | 0 | 0 | 0 | 2R |
|   |     |     |     | X | X | X | X | X | X | 0 | 0 | 0 | Z | Z | 1 | 2R |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 1 |
|   |     |     |     | X | X | X | X | X | X | 1 | Z | Z | Z | 1 | Z | 2 |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 1 |
|   |     |     |     | X | X | X | X | X | X | 1 | Z | Z | 1 | Z | Z | 2 |
| 3 | R   | VR  | R   | X | X | X | X | X | X | X | X | 0 | 0 | 0 | 0 | 2R |
|   |     |     |     | X | X | X | X | X | X | 0 | 0 | 0 | Z | Z | 1 | 2R |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 1 |
|   |     |     |     | X | X | X | X | X | X | 1 | Z | Z | Z | 1 | Z | 2 |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |

APPENDIX II-continued

Request Logic - Truth Table
Copyright © 1989 Digital Equipment Corporation

| N | SP3 | SP2 | SP1 | R4 | S4 | I4 | R3 | S3 | I3 | R2 | S2 | I2 | R1 | S1 | I1 | REQ |
|---|-----|-----|-----|----|----|----|----|----|----|----|----|----|----|----|----|-----|
|   |     |     |     | X | X | X | X | X | X | Z | 1 | Z | 1 | Z | Z | 1 |
|   |     |     |     | X | X | X | X | X | X | 1 | Z | Z | 1 | Z | Z | 2 |
| 3 | W | VR | R | X | X | X | X | X | X | X | X | 0 | 0 | 0 | 3RR |
|   |     |     |     | X | X | X | X | X | 0 | 0 | 0 | Z | Z | 1 | 3RR |
|   |     |     |     | X | X | X | X | X | X | Z | 1 | Z | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 3XR |
|   |     |     |     | X | X | X | 0 | 0 | 0 | Z | Z | 1 | Z | 1 | Z | 3XR |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 1 |
|   |     |     |     | X | X | X | 0 | 0 | 0 | 1 | Z | Z | Z | 1 | Z | 3 |
|   |     |     |     | 0 | 0 | 0 | Z | Z | 1 | 1 | Z | Z | Z | 1 | Z | 3 |
|   |     |     |     | Z | Z | 1 | Z | Z | 1 | 1 | Z | Z | Z | 1 | Z | 2* |
|   |     |     |     | Z | 1 | Z | Z | Z | 1 | 1 | Z | Z | Z | 1 | Z | 2* |
|   |     |     |     | 1 | Z | Z | Z | Z | 1 | 1 | Z | Z | Z | 1 | Z | 2* |
|   |     |     |     | X | X | X | Z | 1 | Z | 1 | Z | Z | Z | 1 | Z | 2* |
|   |     |     |     | X | X | X | 1 | Z | Z | 1 | Z | Z | Z | 1 | Z | 3 |
|   |     |     |     | X | X | X | X | X | X | 0 | 0 | 0 | 1 | Z | Z | 3XR |
|   |     |     |     | X | X | X | 0 | 0 | 0 | Z | Z | 1 | 1 | Z | Z | 3XR |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 1 |
|   |     |     |     | X | X | X | 0 | 0 | 0 | 1 | Z | Z | 1 | Z | Z | 3 |
|   |     |     |     | 0 | 0 | 0 | Z | Z | 1 | 1 | Z | Z | 1 | Z | Z | 3 |
|   |     |     |     | Z | Z | 1 | Z | Z | 1 | 1 | Z | Z | 1 | Z | Z | 2* |
|   |     |     |     | Z | 1 | Z | Z | Z | 1 | 1 | Z | Z | 1 | Z | Z | 2* |
|   |     |     |     | 1 | Z | Z | Z | Z | 1 | 1 | Z | Z | 1 | Z | Z | 2* |
|   |     |     |     | X | X | X | Z | 1 | Z | 1 | Z | Z | 1 | Z | Z | 2* |
|   |     |     |     | X | X | X | 1 | Z | Z | 1 | Z | Z | 1 | Z | Z | 3 |
| 3 | BB | VR | R | X | X | X | X | X | X | X | X | 0 | 0 | 0 | 2R |
|   |     |     |     | X | X | X | X | X | X | 0 | 0 | 0 | Z | Z | 1 | 2R |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 1 |
|   |     |     |     | X | X | X | X | X | X | 1 | Z | Z | Z | 1 | Z | 3BB |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 1 |
|   |     |     |     | X | X | X | X | X | X | 1 | Z | Z | 1 | Z | Z | 3BB |
| 3 | BB | VR | R | X | X | X | X | X | X | X | X | 0 | 0 | 0 | 2R |
|   |     |     |     | X | X | X | X | X | X | 0 | 0 | 0 | Z | Z | 1 | 2R |
|   |     |     |     | X | X | X | X | X | X | Z | Z | 1 | Z | Z | 1 | X |
|   |     |     |     | X | X | X | X | X | X | Z | 1 | Z | Z | Z | 1 | X |
|   |     |     |     | X | X | X | X | X | X | 1 | Z | Z | Z | Z | 1 | X |
|   |     |     |     | X | X | X | X | X | X | 0 | 0 | 0 | Z | 1 | Z | 2 |
|   |     |     |     | X | X | X | 0 | 0 | 0 | Z | Z | 1 | Z | 1 | Z | 2 |
|   |     |     |     | X | X | X | Z | Z | 1 | Z | Z | 1 | Z | 1 | Z | 1 |
|   |     |     |     | X | X | X | Z | 1 | Z | Z | Z | 1 | Z | 1 | Z | 1 |
|   |     |     |     | X | X | X | 1 | Z | Z | Z | Z | 1 | Z | 1 | Z | 1 |
|   |     |     |     | X | X | X | X | X | X | Z | 1 | Z | Z | 1 | Z | 1 |
|   |     |     |     | X | X | X | X | X | X | 1 | Z | Z | Z | 1 | Z | 3BB |
|   |     |     |     | X | X | X | X | X | X | 0 | 0 | 0 | 1 | Z | Z | 2 |
|   |     |     |     | X | X | X | 0 | 0 | 0 | Z | Z | 1 | 1 | Z | Z | 2 |
|   |     |     |     | X | X | X | Z | Z | 1 | Z | Z | 1 | 1 | Z | Z | 1 |
|   |     |     |     | X | X | X | Z | 1 | Z | Z | Z | 1 | 1 | Z | Z | 1 |
|   |     |     |     | X | X | X | 1 | Z | Z | Z | Z | 1 | 1 | Z | Z | 1 |
|   |     |     |     | X | X | X | X | X | X | Z | 1 | Z | 1 | Z | Z | 1 |
|   |     |     |     | X | X | X | X | X | X | 1 | Z | Z | 1 | Z | Z | 3BB |
| 3 | X | X | BB | X | X | X | X | X | X | X | X | X | X | X | X | 1BB |
| 3 | X | X | BW | X | X | X | X | X | X | X | X | X | X | X | X | 1BW |
| 3 | X | X | IR | X | X | X | X | X | X | X | X | X | X | X | X | 1I |

APPENDIX II-continued

Request Logic - Truth Table
Copyright © 1989 Digital Equipment Corporation

| N | SP3 | SP2 | SP1 | R4 | S4 | I4 | R3 | S3 | I3 | R2 | S2 | I2 | R1 | S1 | I1 | REQ. |
|---|-----|-----|-----|----|----|----|----|----|----|----|----|----|----|----|----|------|
| 3 | X | X | IW | X | X | X | X | X | X | X | X | X | X | X | X | I1 |

Note:
N = Number of Specifiers Needed
SP3 = Access Type of Third Specifier Being Decoded
SP2 = Access Type of Second Specifier Being Decoded
SP1 = Access Type of First Specifier Being Decoded
R4 = REG[4]
S4 = SL[4]
I4 = INDEX[4]
R3 = REG[3]
S3 = SL[3]
I3 = INDEX[3]
R2 = REG[2]
S2 = SL[2]
I2 = INDEX[2]
R1 = REG[1]
S1 = SL[1]
I1 = INDEX[1]
REQ. = Request
(Addressing Fault when REQ. = X)

We claim:

1. In a pipelined processor, a method of decoding, preprocessing and executing instructions having an operation code, a first specifier and a following second specifier, said method comprising the steps of:
   detecting during decoding whether the preprocessing of the second specifier of each of said instructions modifies the value of a register specified by the first specifier of said each of said instructions, and
   when said detecting indicates that the preprocessing of the second specifier of said each of said instructions modifies the value of a register specified by the first specifier of said each of said instructions, decoding the first and second specifiers of said each of said instructions sequentially; and
   when said detecting indicates that the preprocessing of the second specifier of said each of said instructions does not modify the value of a register specified by the first specifier of said each of said instructions, decoding the first specifier and said second specifier of said each of said instructions simultaneously,
   wherein at least one of said instructions includes a first specifier that specifies a first register and a second specifier for which preprocessing modifies the value of a second register different from said first register,
   wherein said detecting for said at least one of said instructions detects that preprocessing of said second specifier of said at least one of said instructions modifies a register different from a register specified by the first specifier of said at least one of said instructions, and
   wherein said decoding for said at least one of said instructions includes the simultaneous decoding of the first specifier of said at least one of said instructions and the second specifier of said at least one of said instructions; and
   wherein at least another of said instructions includes a first specifier that specifies a third register and a second specifier for which preprocessing modifies the value of the same third register,
   wherein said detecting for said at least another of said instructions detects that preprocessing of said second specifier of said at least another of said instructions modifies a register that is the same as the register specified by the first specifier of said at least another of said instructions, and
   wherein said decoding for said at least another of said instructions includes the sequential decoding of the first specifier of said at least another of said instructions and then the second specifier of said at least another of said instructions.

2. The method as claimed in claim 1, wherein said decoding and said detecting are performed in an instruction decoding unit of said pipelined processor, and said executing of said instructions is performed in an execution unit of said pipelined processor, and wherein said method further comprises the steps of passing register pointers from said instruction unit to said execution unit for register specifiers that are decoded simultaneously, and passing register values from said instruction unit to said execution unit for register specifiers that are decoded sequentially.

3. A data processing unit for processing variable length instructions; said data processing unit having an instruction memory for storing said variable length instructions; said variable length instructions having respective operation codes and respective sequences of multiple specifiers, said operation codes defining operations upon operands including source operands which are read during an operation and destination operands that are changed by an operation, said specifiers providing information for locating said operands, said specifiers having operand addressing modes independent from the operation codes, said data processing unit comprising, in combination,
   a) instruction buffer means connected to said instruction memory for receiving from said instruction memory an operation code and a respective sequence of multiple specifiers to be simultaneously decoded,
   b) instruction decoding means connected to said instruction buffer means for simultaneously decoding a first operand specifier in said respective sequence of multiple specifiers to obtain information for locating a first source operand, a second operand specifier in said respective sequence of multiple specifiers to obtain information for locating a second source operand, and a third operand specifier in said respective sequence of multiple specifiers to obtain information for locating a destination operand, c) operand fetching means responsive to the information obtained by said instruction decoding means for fetching the first and second operands, and d) execution means for performing the operation indicated by the operation code received in said instruction buffer means upon the source operands fetched by said operand fetching means and changing the destination operand at the location specified by the information provided by the instruction decoding means, wherein said instruction decoding means includes conflict detecting means for detecting during decoding whether each of said instructions includes a first specifier followed by a second specifier for which the preprocessing of the second specifier changes the value of a register specified by the first specifier, and means responsive to said conflict detecting means for sequentially decoding said first specifier and said second specifier of said each of said instructions when said means for detecting detects that preprocessing for said second specifier of said each of said instructions changes the value of a register specified by the first specifier of said each of said instructions, and wherein said conflict detecting means includes means, operative when at least one of said instructions includes a first specifier that specifies a first register and a second specifier for which said preprocessing changes a value of a second register, for comparing said first register to said second register to determine that preprocessing of the second specifier of said one of said instructions changes the value of the first register when the first register is the same as the second register, and to determine that preprocessing of the second specifier of said one of said instructions does not change the value of the first register when the first register is not the same as the second register.

4. The data processing unit as claimed in claim 3, further comprising means for passing register pointers from said instruction decoding means to said execution means for register specifiers that are decoded simultaneously, and passing register values from said operand fetching means to said execution means for register specifiers that are decoded sequentially.

5. In a pipelined processor having an instruction decoding unit and an instruction execution unit; said instruction decoding unit including means for decoding and preprocessing instructions having an operation code, a first specifier, and a following second specifier, some of said instructions including specifiers that specify at least one of a plurality of general purpose registers, and some of said instructions including specifiers for which preprocessing modifies a value of at least one of said general purpose registers, a method comprising the steps of:

maintaining, during instruction decoding and execution, a first set of values for said general purpose registers in said instruction decoding unit and a second set of values for said general purpose registers in said instruction execution unit, detecting during decoding whether the preprocessing of the second specifier of each of said instructions modifies the value of a register specified by the first specifier of said each of said instructions, and when said detecting indicates that the preprocessing of the second specifier of said each of said instructions modifies the value of only general purpose registers different from a register specified by the first register specifier of said each of said instructions, simultaneously decoding said first specifier of said each of said instructions and said second specifier of said each of said instructions, and when preprocessing of said second specifier of said each of said instructions modifies a specified general purpose register, modifying the value of the specified general purpose register in both said instruction decoding unit and said instruction execution unit prior to execution of said each of said instructions, and when said detecting indicates that the preprocessing of the second specifier of said each of said instructions modifies the value of a register specified by said first specifier of said each of said instructions, sequentially decoding the first specifier and the second specifier of said each of said instructions, modifying the specified general purpose register value in said instruction decoding unit prior to execution of said each of said instructions, and modifying the value of the specified general purpose register in the instruction execution unit after execution of said each of said instructions.

6. The method as claimed in claim 5, further comprising the step of inhibiting the decoding of instructions following said each of said instruction instructions in which said detecting indicates that the preprocessing of the second specifier of said each of said instructions modifies the value of the register specified by said first specifier of said each of said instructions, said inhibiting occurring until the modification of said value of the specified general purpose register in said instruction execution unit.

7. The method as claimed in claim 5, further comprising the step of returning the general purpose register values in the instruction decoding unit to initial unmodified values of the general purpose registers in the instruction decoding unit by replacing the general purpose register values in the instruction decoding unit with the respective general purpose register values in the instruction execution unit.

8. The method as claimed in claim 5, further comprising the steps of passing register pointers from said instruction decoding unit to said instruction execution unit for register specifiers that are decoded simultaneously, and passing register values from the instruction decoding unit to the instruction execution unit for register specifiers that are decoded sequentially.

* * * * *